(12) United States Patent
Lee et al.

(10) Patent No.: US 9,867,189 B2
(45) Date of Patent: Jan. 9, 2018

(54) RESOURCE ALLOCATION INDICATION FOR MULTI-USER MULTIPLE-INPUT-MULTIPLE-OUTPUT (MU-MIMO) ORTHOGONAL FREQUENCY DIVISION MULTIPLE ACCESS (OFDMA) COMMUNICATION

(71) Applicant: NEWRACOM, INC., Irvine, CA (US)

(72) Inventors: Dae Won Lee, Irvine, CA (US); Yujin Noh, Irvine, CA (US); Sungho Moon, Irvine, CA (US); Young Hoon Kwon, Irvine, CA (US)

(73) Assignee: NEWRACOM, INC., Irvine, CA (US)

( * ) Notice: Subject to any disclaimer, the term of this patent is extended or adjusted under 35 U.S.C. 154(b) by 0 days.

(21) Appl. No.: 15/280,888

(22) Filed: Sep. 29, 2016

(65) Prior Publication Data

US 2017/0094664 A1 Mar. 30, 2017

Related U.S. Application Data

(60) Provisional application No. 62/250,950, filed on Nov. 4, 2015, provisional application No. 62/234,558, filed (Continued)

(51) Int. Cl.
*H04W 72/04* (2009.01)
*H04B 7/0452* (2017.01)
(Continued)

(52) U.S. Cl.
CPC ...... *H04W 72/0453* (2013.01); *H04B 7/0452* (2013.01); *H04L 27/2601* (2013.01); *H04W 72/042* (2013.01); *H04W 84/12* (2013.01)

(58) Field of Classification Search
CPC .............. H04W 72/0453; H04W 84/12; H04L 27/2601; H04B 7/0452
See application file for complete search history.

(56) References Cited

U.S. PATENT DOCUMENTS 5,886,995 A * 3/1999 Arsenault .......... H04B 7/18523
348/384.1
5,933,421 A * 8/1999 Alamouti ............. H04B 7/0837
370/203
(Continued)

OTHER PUBLICATIONS

Shahrnaz Azizi et al., "OFDMA Numerology and Structure", IEEE 802.11-15/0330r1, Mar. 9, 2015, https://mentor.ieee.org/802.11/dcn/15/11-15-0330-01-00ax-ofdma-numerology-and-structure.pptx.
(Continued)

*Primary Examiner* — Mounir Moutaouakil

(57) ABSTRACT

A wireless device receives a frame including a first Resource Unit (RU) allocation subfield including resource information for a first frequency area and indicating a first number of user fields in a first channel that correspond to the first frequency area, and a second RU allocation subfield including resource information for a second frequency area and indicating of a second number of user fields in a second channel that correspond to the second frequency area. When the first and second frequency areas are a same RU, the wireless device determines, using both the RU allocation subfields, a number of users allocated to the same RU. A wireless device generates and transmits a frame including first and second RU allocation subfields as described above. When the first and second frequency area are a same RU, both the RU allocation subfields indicates a number of users allocated to the same RU.

18 Claims, 52 Drawing Sheets

Related U.S. Application Data on Sep. 29, 2015, provisional application No. 62/251,554, filed on Nov. 5, 2015, provisional application No. 62/252,886, filed on Nov. 9, 2015, provisional application No. 62/344,158, filed on Jun. 1, 2016.

(51) Int. Cl.
*H04L 27/26* (2006.01)
*H04W 84/12* (2009.01)

(56) References Cited

U.S. PATENT DOCUMENTS

| | | | | |
|---|---|---|---|---|
| 6,671,284 | B1* | 12/2003 | Yonge, III | H04L 1/16 |
| | | | | 370/462 |
| 6,914,876 | B2* | 7/2005 | Rotstein | H04W 16/04 |
| | | | | 370/207 |
| 7,197,022 | B2* | 3/2007 | Stanwood | H04B 7/2615 |
| | | | | 370/337 |
| 7,391,774 | B2* | 6/2008 | Lim | H04L 1/0001 |
| | | | | 370/338 |
| 2007/0286066 | A1 | 12/2007 | Zhang et al. | |
| 2008/0240275 | A1 | 10/2008 | Cai | |
| 2009/0016295 | A1 | 1/2009 | Li et al. | |
| 2011/0070822 | A1 | 3/2011 | Schlee et al. | |
| 2011/0110343 | A1 | 5/2011 | Venkatachalam et al. | |
| 2012/0026954 | A1 | 2/2012 | Wang et al. | |
| 2013/0064196 | A1 | 3/2013 | Gao et al. | |
| 2013/0208362 | A1 | 8/2013 | Bohn et al. | |
| 2015/0009894 | A1 | 1/2015 | Vermani et al. | |
| 2015/0205126 | A1 | 7/2015 | Schowengerdt | |
| 2017/0105140 | A1* | 4/2017 | Chen | H04L 1/00 |
| 2017/0118000 | A1* | 4/2017 | Chu | H04L 5/0055 |
| 2017/0118676 | A1* | 4/2017 | Li | H04W 28/06 |
| 2017/0126447 | A1* | 5/2017 | Yang | H04L 27/2602 |
| 2017/0126456 | A1* | 5/2017 | Lee | H04L 1/0071 |
| 2017/0127269 | A1* | 5/2017 | Ryu | H04W 8/24 |

OTHER PUBLICATIONS

International Search Report and Written Opinion for International Patent Application No. PCT/US2016/054527 dated Dec. 13, 2016.

"Part 11: Wireless LAN Medium Access Control (MAC) and Physical Layer (PHY) Specifications", IEEE Standards 802.11™-2012 (Revision of IEEE Standard 802.11-2007), Mar. 29, 2012, pp. 1-2695, IEEE (The Institute of Electrical and Electronic Engineers, Inc.), New York, NY, USA.

"Part 11: Wireless LAN Medium Access Control (MAC) and Physical Layer (PHY) Specifications, Amendment 4: Enhancements for Very High Throughput for Operation in below 6 GHz", IEEE Standards 802.11ac™-2013, 2013, pp. 1-395, IEEE (The Institute of Electrical and Electronic Engineers, Inc.), New York, NY, USA.

"Part 11: Wireless LAN Medium Access Control (MAC) and Physical Layer (PHY) Specifications, Amendment 2: Sub 1 GHz License Exempt Operation", IEEE P802.11ah™/D5.0, Mar. 2015, pp. 1-604, IEEE (The Institute of Electrical and Electronic Engineers, Inc.), New York, NY, USA.

\* cited by examiner

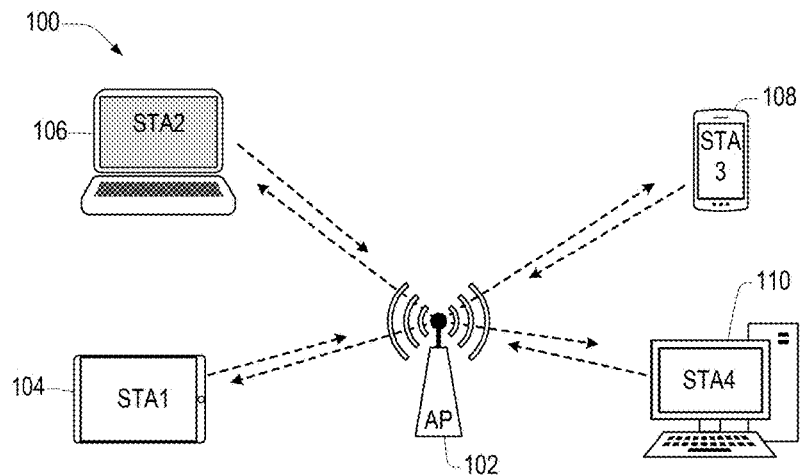
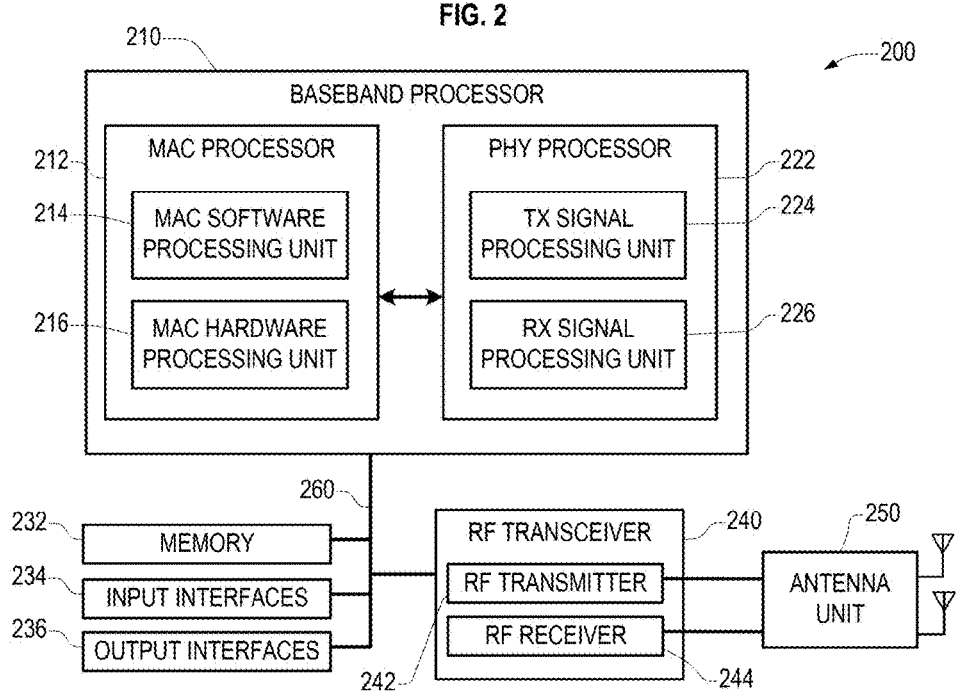

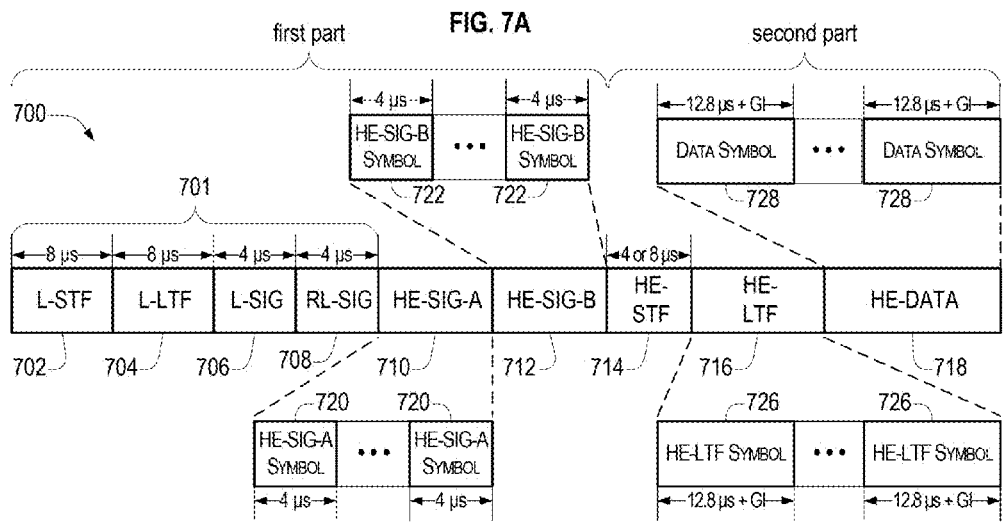

Table 1:

| Element | definition | duration | DFT period | GI | Subcarrier spacing |
|---|---|---|---|---|---|
| Legacy (L)-STF | Non-HT Short Training field | 8 μs | - | - | equiv. to 1,250 kHz |
| L-LTF | Non-HT Long Training field | 8 μs | 3.2 μs | 1.6 μs | 312.5 kHz |
| L-SIG | Non-HT Signal field | 4 μs | 3.2 μs | 0.8 μs | 312.5 kHz |
| RL-SIG | Repeated Non-HT SIGNAL field | 4 μs | 3.2 μs | 0.8 μs | 312.5 kHz |
| HE-SIG-A | HE SIGNAL A field | $N_{HESIGA}$ * 4 μs | 3.2 μs | 0.8 μs | 312.5 kHz |
| HE-SIG-B | HE SIGNAL B field | $N_{HESIGB}$ * 4 μs | 3.2 μs | 0.8 μs | 312.5 kHz |
| HE-STF | HE Short Training field | 4 or 8 μs | - | - | • non-trigger-based PPDU: (equiv. to) 1,250 kHz; • trigger-based PPDU: (equiv. to) 625 kHz |
| HE-LTF | HE Long Training field | $N_{HELTF}$ * (DFT period + GI)μs | 2xLTF: 6.4 μs 4xLTF: 12.8 μs | supports 0.8, 1.6, 3.2 μs | • 2xLTF: (equiv. to) 156.25 kHz; • 4xLTF: 78.125 kHz |
| HE-DATA | HE DATA field | $N_{DATA}$ * (DFT period + GI)μs | 12.8 μs | supports 0.8, 1.6, 3.2 μs | 78.125 kHz |

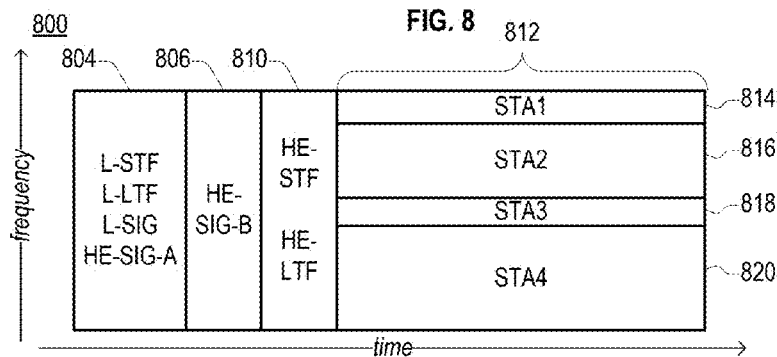
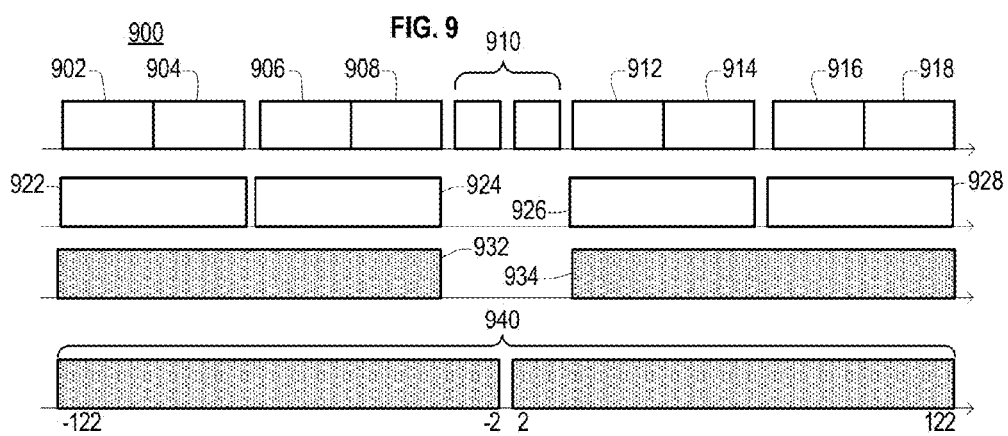
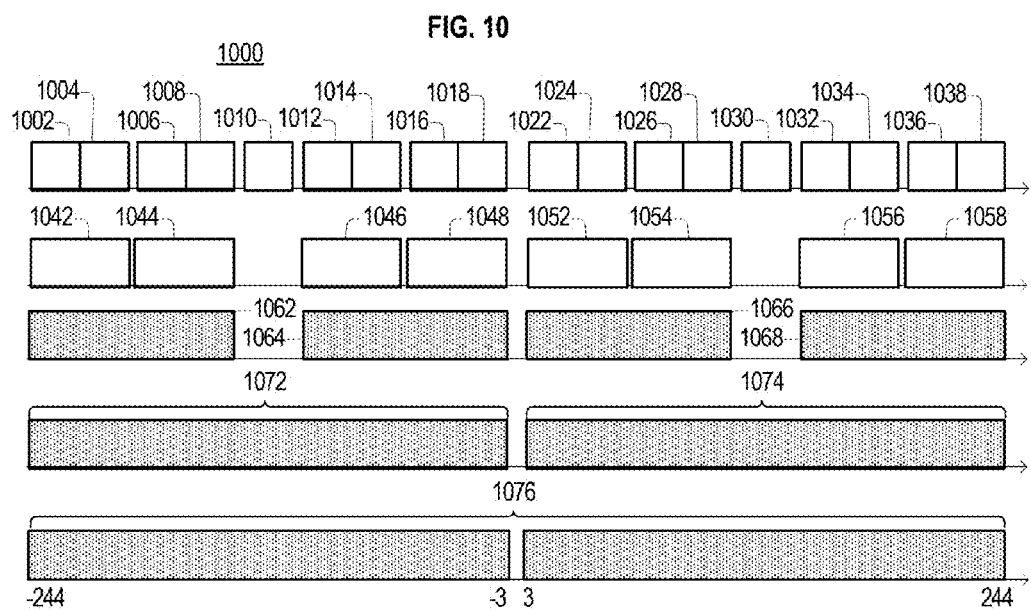

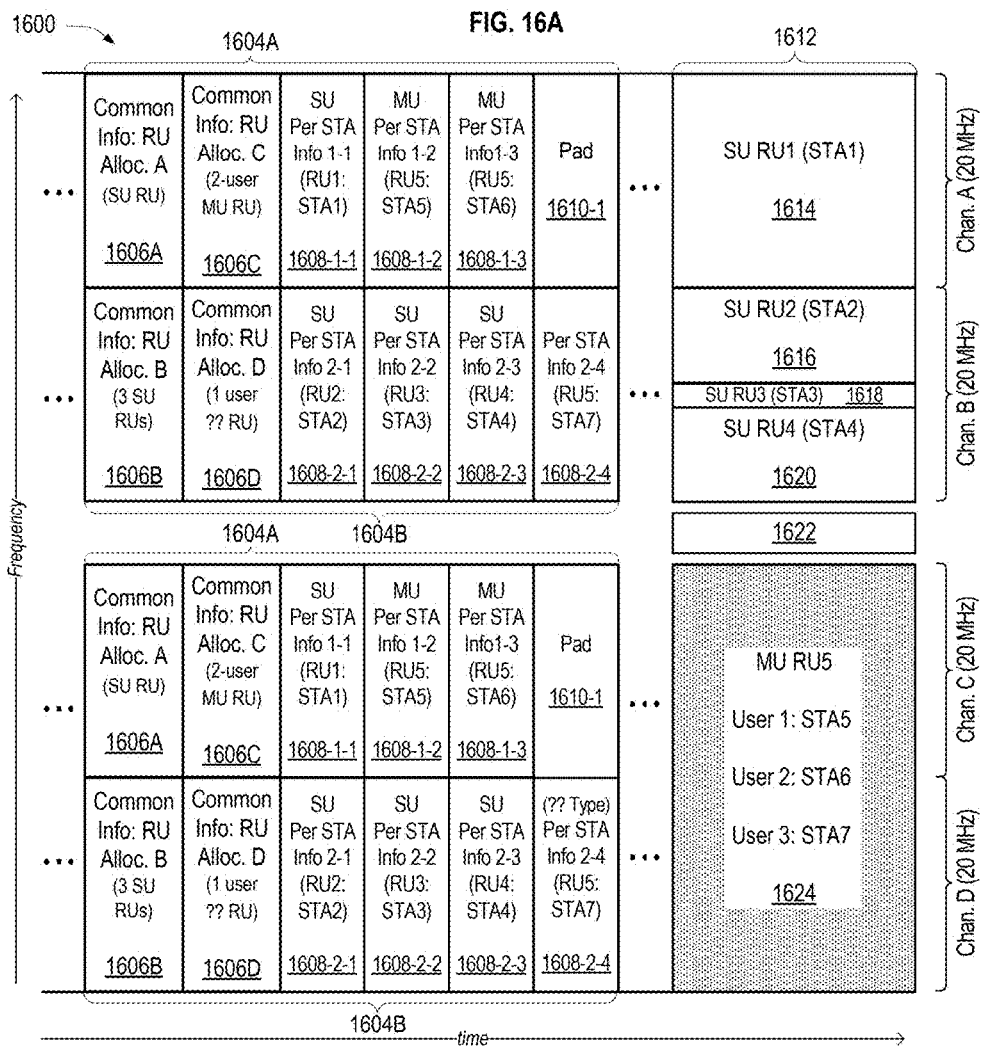
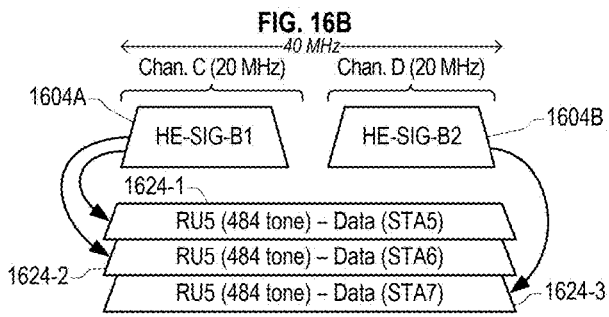

FIG. 18A

Table 1 (part 1 of 4)

| index | #1 | #2 | #3 | #4 | #5 | #6 | #7 | #8 | #9 |
|---|---|---|---|---|---|---|---|---|---|
| 0 | colspan="9" No STA assigned ||||||||||
| 1 | 26 SU | 26 SU | 26 SU | 26 SU | 26 SU | 26 SU | 26 SU | 26 SU | 26 SU |
| 2 | 52 SU | | 52 SU | | 26 SU | 52 SU | | 52 SU | |
| 3 | 52 SU | | 26 SU | 26 SU | 26 SU | 26 SU | 26 SU | 26 SU | 26 SU |
| 4 | 26 SU | 26 SU | 52 SU | | 26 SU | 26 SU | 26 SU | 26 SU | 26 SU |
| 5 | 26 SU | 26 SU | 26 SU | 26 SU | 26 SU | 52 SU | | 26 SU | 26 SU |
| 6 | 26 SU | 26 SU | 26 SU | 26 SU | 26 SU | 26 SU | 26 SU | 52 SU | |
| 7 | 52 SU | | 52 SU | | 26 SU | 26 SU | 26 SU | 26 SU | 26 SU |
| 8 | 52 SU | | 26 SU | 26 SU | 26 SU | 52 SU | | 26 SU | 26 SU |
| 9 | 52 SU | | 26 SU | 26 SU | 26 SU | 26 SU | 26 SU | 52 SU | |
| 10 | 26 SU | 26 SU | 52 SU | | 26 SU | 52 SU | | 26 SU | 26 SU |
| 11 | 26 SU | 26 SU | 52 SU | | 26 SU | 26 SU | 26 SU | 52 SU | |
| 12 | 26 SU | 26 SU | 26 SU | 26 SU | 26 SU | 52 SU | | 52 SU | |
| 13 | 52 SU | | 52 SU | | 26 SU | 52 SU | | 26 SU | 26 SU |
| 14 | 52 SU | | 52 SU | | 26 SU | 26 SU | 26 SU | 52 SU | |
| 15 | 52 SU | | 26 SU | 26 SU | 26 SU | 52 SU | | 52 SU | |
| 16 | 26 SU | 26 SU | 52 SU | | 26 SU | 52 SU | | 52 SU | |
| 17 | colspan="3" 106 SU ||| 26 SU | colspan="4" 106 SU |||| |
| 18 | colspan="3" 106 SU ||| 26 SU | colspan="4" 106 MU (2 STAs) |||| |
| 19 | colspan="3" 106 SU ||| 26 SU | colspan="4" 106 MU (3 STAs) |||| |
| 20 | colspan="3" 106 SU ||| 26 SU | colspan="4" 106 MU (4 STAs) |||| |
| 21 | colspan="3" 106 SU ||| 26 SU | colspan="4" 106 MU (5 STAs) |||| |
| 22 | colspan="3" 106 SU ||| 26 SU | colspan="4" 106 MU (6 STAs) |||| |
| 23 | colspan="3" 106 SU ||| 26 SU | colspan="4" 106 MU (7 STAs) |||| |
| 24 | colspan="3" 106 SU ||| 26 SU | colspan="4" 106 MU (8 STAs) |||| |
| 25 | colspan="3" 106 MU (2 STAs) ||| 26 SU | colspan="4" 106 SU |||| |
| 26 | colspan="3" 106 MU (2 STAs) ||| 26 SU | colspan="4" 106 MU (2 STAs) |||| |
| 27 | colspan="3" 106 MU (2 STAs) ||| 26 SU | colspan="4" 106 MU (3 STAs) |||| |
| 28 | colspan="3" 106 MU (2 STAs) ||| 26 SU | colspan="4" 106 MU (4 STAs) |||| |
| 29 | colspan="3" 106 MU (2 STAs) ||| 26 SU | colspan="4" 106 MU (5 STAs) |||| |
| 30 | colspan="3" 106 MU (2 STAs) ||| 26 SU | colspan="4" 106 MU (6 STAs) |||| |
| 31 | colspan="3" 106 MU (2 STAs) ||| 26 SU | colspan="4" 106 MU (7 STAs) |||| |
| 32 | colspan="3" 106 MU (2 STAs) ||| 26 SU | colspan="4" 106 MU (8 STAs) |||| |
| 33 | colspan="3" 106 MU (3 STAs) ||| 26 SU | colspan="4" 106 SU |||| |
| 34 | colspan="3" 106 MU (3 STAs) ||| 26 SU | colspan="4" 106 MU (2 STAs) |||| |
| 35 | colspan="3" 106 MU (3 STAs) ||| 26 SU | colspan="4" 106 MU (3 STAs) |||| |
| 36 | colspan="3" 106 MU (3 STAs) ||| 26 SU | colspan="4" 106 MU (4 STAs) |||| |
| 37 | colspan="3" 106 MU (3 STAs) ||| 26 SU | colspan="4" 106 MU (5 STAs) |||| |
| 38 | colspan="3" 106 MU (3 STAs) ||| 26 SU | colspan="4" 106 MU (6 STAs) |||| |
| 39 | colspan="3" 106 MU (3 STAs) ||| 26 SU | colspan="4" 106 MU (7 STAs) |||| |
| 40 | colspan="3" 106 MU (3 STAs) ||| 26 SU | colspan="4" 106 MU (8 STAs) |||| |
| 41 | colspan="3" 106 MU (4 STAs) ||| 26 SU | colspan="4" 106 SU |||| |
| 42 | colspan="3" 106 MU (4 STAs) ||| 26 SU | colspan="4" 106 MU (2 STAs) |||| |
| 43 | colspan="3" 106 MU (4 STAs) ||| 26 SU | colspan="4" 106 MU (3 STAs) |||| |
| 44 | colspan="3" 106 MU (4 STAs) ||| 26 SU | colspan="4" 106 MU (4 STAs) |||| |
| 45 | colspan="3" 106 MU (4 STAs) ||| 26 SU | colspan="4" 106 MU (5 STAs) |||| |
| 46 | colspan="3" 106 MU (4 STAs) ||| 26 SU | colspan="4" 106 MU (6 STAs) |||| |
| 47 | colspan="3" 106 MU (4 STAs) ||| 26 SU | colspan="4" 106 MU (7 STAs) |||| |
| 48 | colspan="3" 106 MU (4 STAs) ||| 26 SU | colspan="4" 106 MU (8 STAs) |||| |
| 49 | colspan="3" 106 MU (5 STAs) ||| 26 SU | colspan="4" 106 SU |||| |
| 50 | colspan="3" 106 MU (5 STAs) ||| 26 SU | colspan="4" 106 MU (2 STAs) |||| |
| 51 | colspan="3" 106 MU (5 STAs) ||| 26 SU | colspan="4" 106 MU (3 STAs) |||| |

FIG. 18B

Table 1 (part 2 of 4)

| index | #1 | #2 | #3 | #4 | #5 | #6 | #7 | #8 | #9 |
|---|---|---|---|---|---|---|---|---|---|
| 52 | | 106 MU (5 STAs) | | | 26 SU | | 106 MU (4 STAs) | | |
| 53 | | 106 MU (5 STAs) | | | 26 SU | | 106 MU (5 STAs) | | |
| 54 | | 106 MU (5 STAs) | | | 26 SU | | 106 MU (6 STAs) | | |
| 55 | | 106 MU (5 STAs) | | | 26 SU | | 106 MU (7 STAs) | | |
| 56 | | 106 MU (5 STAs) | | | 26 SU | | 106 MU (8 STAs) | | |
| 57 | | 106 MU (6 STAs) | | | 26 SU | | 106 SU | | |
| 58 | | 106 MU (6 STAs) | | | 26 SU | | 106 MU (2 STAs) | | |
| 59 | | 106 MU (6 STAs) | | | 26 SU | | 106 MU (3 STAs) | | |
| 60 | | 106 MU (6 STAs) | | | 26 SU | | 106 MU (4 STAs) | | |
| 61 | | 106 MU (6 STAs) | | | 26 SU | | 106 MU (5 STAs) | | |
| 62 | | 106 MU (6 STAs) | | | 26 SU | | 106 MU (6 STAs) | | |
| 63 | | 106 MU (6 STAs) | | | 26 SU | | 106 MU (7 STAs) | | |
| 64 | | 106 MU (6 STAs) | | | 26 SU | | 106 MU (8 STAs) | | |
| 65 | | 106 MU (7 STAs) | | | 26 SU | | 106 SU | | |
| 66 | | 106 MU (7 STAs) | | | 26 SU | | 106 MU (2 STAs) | | |
| 67 | | 106 MU (7 STAs) | | | 26 SU | | 106 MU (3 STAs) | | |
| 68 | | 106 MU (7 STAs) | | | 26 SU | | 106 MU (4 STAs) | | |
| 69 | | 106 MU (7 STAs) | | | 26 SU | | 106 MU (5 STAs) | | |
| 70 | | 106 MU (7 STAs) | | | 26 SU | | 106 MU (6 STAs) | | |
| 71 | | 106 MU (7 STAs) | | | 26 SU | | 106 MU (7 STAs) | | |
| 72 | | 106 MU (7 STAs) | | | 26 SU | | 106 MU (8 STAs) | | |
| 73 | | 106 MU (8 STAs) | | | 26 SU | | 106 SU | | |
| 74 | | 106 MU (8 STAs) | | | 26 SU | | 106 MU (2 STAs) | | |
| 75 | | 106 MU (8 STAs) | | | 26 SU | | 106 MU (3 STAs) | | |
| 76 | | 106 MU (8 STAs) | | | 26 SU | | 106 MU (4 STAs) | | |
| 77 | | 106 MU (8 STAs) | | | 26 SU | | 106 MU (5 STAs) | | |
| 78 | | 106 MU (8 STAs) | | | 26 SU | | 106 MU (6 STAs) | | |
| 79 | | 106 MU (8 STAs) | | | 26 SU | | 106 MU (7 STAs) | | |
| 80 | | 106 MU (8 STAs) | | | 26 SU | | 106 MU (8 STAs) | | |
| 81 | | 106 SU | | | 26 SU | 26 SU | 26 SU | 26 SU | 26 SU |
| 82 | | 106 MU (2 STAs) | | | 26 SU | 26 SU | 26 SU | 26 SU | 26 SU |
| 83 | | 106 MU (3 STAs) | | | 26 SU | 26 SU | 26 SU | 26 SU | 26 SU |
| 84 | | 106 MU (4 STAs) | | | 26 SU | 26 SU | 26 SU | 26 SU | 26 SU |
| 85 | | 106 MU (5 STAs) | | | 26 SU | 26 SU | 26 SU | 26 SU | 26 SU |
| 86 | | 106 MU (6 STAs) | | | 26 SU | 26 SU | 26 SU | 26 SU | 26 SU |
| 87 | | 106 MU (7 STAs) | | | 26 SU | 26 SU | 26 SU | 26 SU | 26 SU |
| 88 | | 106 MU (8 STAs) | | | 26 SU | 26 SU | 26 SU | 26 SU | 26 SU |
| 89 | | 106 SU | | | 26 SU | 26 SU | 26 SU | 52 SU | |
| 90 | | 106 MU (2 STAs) | | | 26 SU | 26 SU | 26 SU | 52 SU | |
| 91 | | 106 MU (3 STAs) | | | 26 SU | 26 SU | 26 SU | 52 SU | |
| 92 | | 106 MU (4 STAs) | | | 26 SU | 26 SU | 26 SU | 52 SU | |
| 93 | | 106 MU (5 STAs) | | | 26 SU | 26 SU | 26 SU | 52 SU | |
| 94 | | 106 MU (6 STAs) | | | 26 SU | 26 SU | 26 SU | 52 SU | |
| 95 | | 106 MU (7 STAs) | | | 26 SU | 26 SU | 26 SU | 52 SU | |
| 96 | | 106 MU (8 STAs) | | | 26 SU | 26 SU | 26 SU | 52 SU | |
| 97 | | 106 SU | | | 26 SU | 52 SU | | 26 SU | 26 SU |
| 98 | | 106 MU (2 STAs) | | | 26 SU | 52 SU | | 26 SU | 26 SU |
| 99 | | 106 MU (3 STAs) | | | 26 SU | 52 SU | | 26 SU | 26 SU |
| 100 | | 106 MU (4 STAs) | | | 26 SU | 52 SU | | 26 SU | 26 SU |
| 101 | | 106 MU (5 STAs) | | | 26 SU | 52 SU | | 26 SU | 26 SU |
| 102 | | 106 MU (6 STAs) | | | 26 SU | 52 SU | | 26 SU | 26 SU |
| 103 | | 106 MU (7 STAs) | | | 26 SU | 52 SU | | 26 SU | 26 SU |
| 104 | | 106 MU (8 STAs) | | | 26 SU | 52 SU | | 26 SU | 26 SU |

FIG. 18C

Table 1 (part 3 of 4)

| index | #1 | #2 | #3 | #4 | #5 | #6 | #7 | #8 | #9 |
|---|---|---|---|---|---|---|---|---|---|
| 105 | 106 SU | | | | 26 SU | 52 SU | | 52 SU | |
| 106 | 106 MU (2 STAs) | | | | 26 SU | 52 SU | | 52 SU | |
| 107 | 106 MU (3 STAs) | | | | 26 SU | 52 SU | | 52 SU | |
| 108 | 106 MU (4 STAs) | | | | 26 SU | 52 SU | | 52 SU | |
| 109 | 106 MU (5 STAs) | | | | 26 SU | 52 SU | | 52 SU | |
| 110 | 106 MU (6 STAs) | | | | 26 SU | 52 SU | | 52 SU | |
| 111 | 106 MU (7 STAs) | | | | 26 SU | 52 SU | | 52 SU | |
| 112 | 106 MU (8 STAs) | | | | 26 SU | 52 SU | | 52 SU | |
| 113 | 26 SU | 26 SU | 26 SU | 26 SU | 26 SU | 106 ( 1 STA) | | | |
| 114 | 26 SU | 26 SU | 26 SU | 26 SU | 26 SU | 106 MU (2 STAs) | | | |
| 115 | 26 SU | 26 SU | 26 SU | 26 SU | 26 SU | 106 MU (3 STAs) | | | |
| 116 | 26 SU | 26 SU | 26 SU | 26 SU | 26 SU | 106 MU (4 STAs) | | | |
| 117 | 26 SU | 26 SU | 26 SU | 26 SU | 26 SU | 106 MU (5 STAs) | | | |
| 118 | 26 SU | 26 SU | 26 SU | 26 SU | 26 SU | 106 MU (6 STAs) | | | |
| 119 | 26 SU | 26 SU | 26 SU | 26 SU | 26 SU | 106 MU (7 STAs) | | | |
| 120 | 26 SU | 26 SU | 26 SU | 26 SU | 26 SU | 106 MU (8 STAs) | | | |
| 121 | 26 SU | 26 SU | 52 SU | | 26 SU | 106 SU | | | |
| 122 | 26 SU | 26 SU | 52 SU | | 26 SU | 106 MU (2 STAs) | | | |
| 123 | 26 SU | 26 SU | 52 SU | | 26 SU | 106 MU (3 STAs) | | | |
| 124 | 26 SU | 26 SU | 52 SU | | 26 SU | 106 MU (4 STAs) | | | |
| 125 | 26 SU | 26 SU | 52 SU | | 26 SU | 106 MU (5 STAs) | | | |
| 126 | 26 SU | 26 SU | 52 SU | | 26 SU | 106 MU (6 STAs) | | | |
| 127 | 26 SU | 26 SU | 52 SU | | 26 SU | 106 MU (7 STAs) | | | |
| 128 | 26 SU | 26 SU | 52 SU | | 26 SU | 106 MU (8 STAs) | | | |
| 129 | 52 SU | | 26 SU | 26 SU | 26 SU | 106 SU | | | |
| 130 | 52 SU | | 26 SU | 26 SU | 26 SU | 106 MU (2 STAs) | | | |
| 131 | 52 SU | | 26 SU | 26 SU | 26 SU | 106 MU (3 STAs) | | | |
| 132 | 52 SU | | 26 SU | 26 SU | 26 SU | 106 MU (4 STAs) | | | |
| 133 | 52 SU | | 26 SU | 26 SU | 26 SU | 106 MU (5 STAs) | | | |
| 134 | 52 SU | | 26 SU | 26 SU | 26 SU | 106 MU (6 STAs) | | | |
| 135 | 52 SU | | 26 SU | 26 SU | 26 SU | 106 MU (7 STAs) | | | |
| 136 | 52 SU | | 26 SU | 26 SU | 26 SU | 106 MU (8 STAs) | | | |
| 137 | 52 SU | | 52 SU | | 26 SU | 106 SU | | | |
| 138 | 52 SU | | 52 SU | | 26 SU | 106 MU (2 STAs) | | | |
| 139 | 52 SU | | 52 SU | | 26 SU | 106 MU (3 STAs) | | | |
| 140 | 52 SU | | 52 SU | | 26 SU | 106 MU (4 STAs) | | | |
| 141 | 52 SU | | 52 SU | | 26 SU | 106 MU (5 STAs) | | | |
| 142 | 52 SU | | 52 SU | | 26 SU | 106 MU (6 STAs) | | | |
| 143 | 52 SU | | 52 SU | | 26 SU | 106 MU (7 STAs) | | | |
| 144 | 52 SU | | 52 SU | | 26 SU | 106 MU (8 STAs) | | | |
| 145 | 242 SU | | | | | | | | |
| 146 | 242 MU (2 STAs) | | | | | | | | |
| 147 | 242 MU (3 STAs) | | | | | | | | |
| 148 | 242 MU (4 STAs) | | | | | | | | |
| 149 | 242 MU (5 STAs) | | | | | | | | |
| 150 | 242 MU (6 STAs) | | | | | | | | |
| 151 | 242 MU (7 STAs) | | | | | | | | |
| 152 | 242 MU (8 STAs) | | | | | | | | |

FIG. 18D

Table 1 (part 4 of 4)

| index | #1 | #2 | #3 | #4 | #5 | #6 | #7 | #8 | #9 |
|---|---|---|---|---|---|---|---|---|---|
| 153 | 484 SU |||||||||
| 154 | 484 MU (1 STA) |||||||||
| 155 | 484 MU (2 STAs) |||||||||
| 156 | 484 MU (3 STAs) |||||||||
| 157 | 484 MU (4 STAs) |||||||||
| 158 | 484 MU (5 STAs) |||||||||
| 159 | 484 MU (6 STAs) |||||||||
| 160 | 484 MU (7 STAs) |||||||||
| 161 | 484 MU (8 STAs) |||||||||
| 162 | 996 SU |||||||||
| 163 | 996 MU (1 STA) |||||||||
| 164 | 996 MU (2 STAs) |||||||||
| 165 | 996 MU (3 STAs) |||||||||
| 166 | 996 MU (4 STAs) |||||||||
| 167 | 996 MU (5 STAs) |||||||||
| 168 | 996 MU (6 STAs) |||||||||
| 169 | 996 MU (7 STAs) |||||||||
| 170 | 996 MU (8 STAs) |||||||||
| 171 | 2*996 MU (1 STA) |||||||||
| 172 | 2*996 MU (2 STAs) |||||||||
| 173 | 2*996 MU (3 STAs) |||||||||
| 174 | 2*996 MU (4 STAs) |||||||||
| 175 | 2*996 MU (5 STAs) |||||||||
| 176 | 2*996 MU (6 STAs) |||||||||
| 177 | 2*996 MU (7 STAs) |||||||||
| 178 | 2*996 MU (8 STAs) |||||||||

FIG. 19A

Table 2 (part 1 of 4)

| Index | #1 | #2 | #3 | #4 | #5 | #6 | #7 | #8 | #9 | S-RU |
|---|---|---|---|---|---|---|---|---|---|---|
| 0 | No STA assigned ||||||||| NA |
| 1 | 26 SU | 26 SU | 26 SU | 26 SU | 26 SU | 26 SU | 26 SU | 26 SU | 26 SU | NA |
| 2 | 52 SU || 52 SU || 26 SU | 52 SU || 52 SU || NA |
| 3 | 52 SU || 26 SU | 26 SU | 26 SU | 26 SU | 26 SU | 26 SU | 26 SU | NA |
| 4 | 26 SU | 26 SU | 52 SU || 26 SU | 26 SU | 26 SU | 26 SU | 26 SU | NA |
| 5 | 26 SU | 26 SU | 26 SU | 26 SU | 26 SU | 52 SU || 26 SU | 26 SU | NA |
| 6 | 26 SU | 26 SU | 26 SU | 26 SU | 26 SU | 26 SU | 26 SU | 52 SU || NA |
| 7 | 52 SU || 52 SU || 26 SU | 26 SU | 26 SU | 26 SU | 26 SU | NA |
| 8 | 52 SU || 26 SU | 26 SU | 26 SU | 52 SU || 26 SU | 26 SU | NA |
| 9 | 52 SU || 26 SU | 26 SU | 26 SU | 26 SU | 26 SU | 52 SU || NA |
| 10 | 26 SU | 26 SU | 52 SU || 26 SU | 52 SU || 26 SU | 26 SU | NA |
| 11 | 26 SU | 26 SU | 52 SU || 26 SU | 26 SU | 26 SU | 52 SU || NA |
| 12 | 26 SU | 26 SU | 26 SU | 26 SU | 26 SU | 52 SU || 52 SU || NA |
| 13 | 52 SU || 52 SU || 26 SU | 52 SU || 26 SU | 26 SU | NA |
| 14 | 52 SU || 52 SU || 26 SU | 26 SU | 26 SU | 52 SU || NA |
| 15 | 52 SU || 26 SU | 26 SU | 26 SU | 52 SU || 52 SU || NA |
| 16 | 26 SU | 26 SU | 52 SU || 26 SU | 52 SU || 52 SU || NA |
| 17 | 106 SU |||| 26 SU | 106 SU |||| NA |
| 18 | 106 SU |||| 26 SU | 106 MU (2 STAs) |||| NA |
| 19 | 106 SU |||| 26 SU | 106 MU (3 STAs) |||| NA |
| 20 | 106 SU |||| 26 SU | 106 MU (4 STAs) |||| NA |
| 21 | 106 MU (2 STAs) |||| 26 SU | 106 SU |||| NA |
| 22 | 106 MU (2 STAs) |||| 26 SU | 106 MU (2 STAs) |||| NA |
| 23 | 106 MU (2 STAs) |||| 26 SU | 106 MU (3 STAs) |||| NA |
| 24 | 106 MU (2 STAs) |||| 26 SU | 106 MU (4 STAs) |||| NA |
| 25 | 106 MU (3 STAs) |||| 26 SU | 106 SU |||| NA |
| 26 | 106 MU (3 STAs) |||| 26 SU | 106 MU (2 STAs) |||| NA |
| 27 | 106 MU (3 STAs) |||| 26 SU | 106 MU (3 STAs) |||| NA |
| 28 | 106 MU (3 STAs) |||| 26 SU | 106 MU (4 STAs) |||| NA |
| 29 | 106 MU (4 STAs) |||| 26 SU | 106 SU |||| NA |
| 30 | 106 MU (4 STAs) |||| 26 SU | 106 MU (2 STAs) |||| NA |
| 31 | 106 MU (4 STAs) |||| 26 SU | 106 MU (3 STAs) |||| NA |
| 32 | 106 MU (4 STAs) |||| 26 SU | 106 MU (4 STAs) |||| NA |
| 33 | 106 SU |||| 26 SU | 26 SU | 26 SU | 26 SU | 26 SU | NA |
| 34 | 106 MU (2 STAs) |||| 26 SU | 26 SU | 26 SU | 26 SU | 26 SU | NA |
| 35 | 106 MU (3 STAs) |||| 26 SU | 26 SU | 26 SU | 26 SU | 26 SU | NA |
| 36 | 106 MU (4 STAs) |||| 26 SU | 26 SU | 26 SU | 26 SU | 26 SU | NA |
| 37 | 106 SU |||| 26 SU | 26 SU | 26 SU | 52 SU || NA |
| 38 | 106 MU (2 STAs) |||| 26 SU | 26 SU | 26 SU | 52 SU || NA |
| 39 | 106 MU (3 STAs) |||| 26 SU | 26 SU | 26 SU | 52 SU || NA |
| 40 | 106 MU (4 STAs) |||| 26 SU | 26 SU | 26 SU | 52 SU || NA |
| 41 | 106 SU |||| 26 SU | 52 SU || 26 SU | 26 SU | NA |
| 42 | 106 MU (2 STAs) |||| 26 SU | 52 SU || 26 SU | 26 SU | NA |
| 43 | 106 MU (3 STAs) |||| 26 SU | 52 SU || 26 SU | 26 SU | NA |
| 44 | 106 MU (4 STAs) |||| 26 SU | 52 SU || 26 SU | 26 SU | NA |
| 45 | 106 SU |||| 26 SU | 52 SU || 52 SU || NA |
| 46 | 106 MU (2 STAs) |||| 26 SU | 52 SU || 52 SU || NA |
| 47 | 106 MU (3 STAs) |||| 26 SU | 52 SU || 52 SU || NA |
| 48 | 106 MU (4 STAs) |||| 26 SU | 52 SU || 52 SU || NA |

FIG. 19B

Table 2 (part 2 of 4)

| index | #1 | #2 | #3 | #4 | #5 | #6 | #7 | #8 | #9 | S-RU |
|---|---|---|---|---|---|---|---|---|---|---|
| 49 | 26 SU | 26 SU | 26 SU | 26 SU | 26 SU | colspan=4 | 106 (1 STA) | | | NA |
| 50 | 26 SU | 26 SU | 26 SU | 26 SU | 26 SU | colspan=4 | 106 MU (2 STAs) | | | NA |
| 51 | 26 SU | 26 SU | 26 SU | 26 SU | 26 SU | colspan=4 | 106 MU (3 STAs) | | | NA |
| 52 | 26 SU | 26 SU | 26 SU | 26 SU | 26 SU | colspan=4 | 106 MU (4 STAs) | | | NA |
| 53 | 26 SU | 26 SU | 52 SU | | 26 SU | colspan=4 | 106 SU | | | NA |
| 54 | 26 SU | 26 SU | 52 SU | | 26 SU | colspan=4 | 106 MU (2 STAs) | | | NA |
| 55 | 26 SU | 26 SU | 52 SU | | 26 SU | colspan=4 | 106 MU (3 STAs) | | | NA |
| 56 | 26 SU | 26 SU | 52 SU | | 26 SU | colspan=4 | 106 MU (4 STAs) | | | NA |
| 57 | 52 SU | | 26 SU | 26 SU | 26 SU | colspan=4 | 106 SU | | | NA |
| 58 | 52 SU | | 26 SU | 26 SU | 26 SU | colspan=4 | 106 MU (2 STAs) | | | NA |
| 59 | 52 SU | | 26 SU | 26 SU | 26 SU | colspan=4 | 106 MU (3 STAs) | | | NA |
| 60 | 52 SU | | 26 SU | 26 SU | 26 SU | colspan=4 | 106 MU (4 STAs) | | | NA |
| 61 | 52 SU | | 52 SU | | 26 SU | colspan=4 | 106 SU | | | NA |
| 62 | 52 SU | | 52 SU | | 26 SU | colspan=4 | 106 MU (2 STAs) | | | NA |
| 63 | 52 SU | | 52 SU | | 26 SU | colspan=4 | 106 MU (3 STAs) | | | NA |
| 64 | 52 SU | | 52 SU | | 26 SU | colspan=4 | 106 MU (4 STAs) | | | NA |
| 65 | colspan=9 | 242 SU | | | | | | | | NA |
| 66 | colspan=9 | 242 MU (2 STAs) | | | | | | | | NA |
| 67 | colspan=9 | 242 MU (3 STAs) | | | | | | | | NA |
| 68 | colspan=9 | 242 MU (4 STAs) | | | | | | | | NA |
| 69 | colspan=9 | 242 MU (5 STAs) | | | | | | | | NA |
| 70 | colspan=9 | 242 MU (6 STAs) | | | | | | | | NA |
| 71 | colspan=9 | 242 MU (7 STAs) | | | | | | | | NA |
| 72 | colspan=9 | 242 MU (8 STAs) | | | | | | | | NA |
| 73 | colspan=9 | 484 SU | | | | | | | | NA |
| 74 | colspan=9 | 484 MU (1 STA) | | | | | | | | NA |
| 75 | colspan=9 | 484 MU (2 STAs) | | | | | | | | NA |
| 76 | colspan=9 | 484 MU (3 STAs) | | | | | | | | NA |
| 77 | colspan=9 | 484 MU (4 STAs) | | | | | | | | NA |
| 78 | colspan=9 | 484 MU (5 STAs) | | | | | | | | NA |
| 79 | colspan=9 | 484 MU (6 STAs) | | | | | | | | NA |
| 80 | colspan=9 | 484 MU (7 STAs) | | | | | | | | NA |
| 81 | colspan=9 | 484 MU (8 STAs) | | | | | | | | NA |
| 82 | colspan=9 | 996 SU | | | | | | | | NA |
| 83 | colspan=9 | 996 MU (1 STA) | | | | | | | | NA |
| 84 | colspan=9 | 996 MU (2 STAs) | | | | | | | | NA |
| 85 | colspan=9 | 996 MU (3 STAs) | | | | | | | | NA |
| 86 | colspan=9 | 996 MU (4 STAs) | | | | | | | | NA |
| 87 | colspan=9 | 996 MU (5 STAs) | | | | | | | | NA |
| 88 | colspan=9 | 996 MU (6 STAs) | | | | | | | | NA |
| 89 | colspan=9 | 996 MU (7 STAs) | | | | | | | | NA |
| 90 | colspan=9 | 996 MU (8 STAs) | | | | | | | | NA |
| 91 | colspan=9 | 2*996 MU (1 STA) | | | | | | | | NA |
| 92 | colspan=9 | 2*996 MU (2 STAs) | | | | | | | | NA |
| 93 | colspan=9 | 2*996 MU (3 STAs) | | | | | | | | NA |
| 94 | colspan=9 | 2*996 MU (4 STAs) | | | | | | | | NA |
| 95 | colspan=9 | 2*996 MU (5 STAs) | | | | | | | | NA |
| 96 | colspan=9 | 2*996 MU (6 STAs) | | | | | | | | NA |
| 97 | colspan=9 | 2*996 MU (7 STAs) | | | | | | | | NA |
| 98 | colspan=9 | 2*996 MU (8 STAs) | | | | | | | | NA |

FIG. 19C

Table 2 (part 3 of 4)

| index | #1 | #2 | #3 | #4 | #5 | #6 | #7 | #8 | #9 | S-RU |
|---|---|---|---|---|---|---|---|---|---|---|
| 99 | No STA assigned ||||||||| 26 SU |
| 100 | 26 SU | 26 SU | 26 SU | 26 SU | 26 SU | 26 SU | 26 SU | 26 SU | 26 SU | 26 SU |
| 101 | 52 SU || 52 SU || 26 SU | 52 SU || 52 SU || 26 SU |
| 102 | 52 SU || 26 SU | 26 SU | 26 SU | 26 SU | 26 SU | 26 SU | 26 SU | 26 SU |
| 103 | 26 SU | 26 SU | 52 SU || 26 SU | 26 SU | 26 SU | 26 SU | 26 SU | 26 SU |
| 104 | 26 SU | 26 SU | 26 SU | 26 SU | 26 SU | 52 SU || 26 SU | 26 SU | 26 SU |
| 105 | 26 SU | 26 SU | 26 SU | 26 SU | 26 SU | 26 SU | 26 SU | 52 SU || 26 SU |
| 106 | 52 SU || 52 SU || 26 SU | 26 SU | 26 SU | 26 SU | 26 SU | 26 SU |
| 107 | 52 SU || 26 SU | 26 SU | 26 SU | 52 SU || 26 SU | 26 SU | 26 SU |
| 108 | 52 SU || 26 SU | 26 SU | 26 SU | 26 SU | 26 SU | 52 SU || 26 SU |
| 109 | 26 SU | 26 SU | 52 SU || 26 SU | 52 SU || 26 SU | 26 SU | 26 SU |
| 110 | 26 SU | 26 SU | 52 SU || 26 SU | 26 SU | 26 SU | 52 SU || 26 SU |
| 111 | 26 SU | 26 SU | 26 SU | 26 SU | 26 SU | 52 SU || 52 SU || 26 SU |
| 112 | 52 SU || 52 SU || 26 SU | 52 SU || 26 SU | 26 SU | 26 SU |
| 113 | 52 SU || 52 SU || 26 SU | 26 SU | 26 SU | 52 SU || 26 SU |
| 114 | 52 SU || 26 SU | 26 SU | 26 SU | 52 SU || 52 SU || 26 SU |
| 115 | 26 SU | 26 SU | 52 SU || 26 SU | 52 SU || 52 SU || 26 SU |
| 116 | 106 SU |||| 26 SU | 106 SU |||| 26 SU |
| 117 | 106 SU |||| 26 SU | 106 MU (2 STAs) |||| 26 SU |
| 118 | 106 SU |||| 26 SU | 106 MU (3 STAs) |||| 26 SU |
| 119 | 106 SU |||| 26 SU | 106 MU (4 STAs) |||| 26 SU |
| 120 | 106 MU (2 STAs) |||| 26 SU | 106 SU |||| 26 SU |
| 121 | 106 MU (2 STAs) |||| 26 SU | 106 MU (2 STAs) |||| 26 SU |
| 122 | 106 MU (2 STAs) |||| 26 SU | 106 MU (3 STAs) |||| 26 SU |
| 123 | 106 MU (2 STAs) |||| 26 SU | 106 MU (4 STAs) |||| 26 SU |
| 124 | 106 MU (3 STAs) |||| 26 SU | 106 SU |||| 26 SU |
| 125 | 106 MU (3 STAs) |||| 26 SU | 106 MU (2 STAs) |||| 26 SU |
| 126 | 106 MU (3 STAs) |||| 26 SU | 106 MU (3 STAs) |||| 26 SU |
| 127 | 106 MU (3 STAs) |||| 26 SU | 106 MU (4 STAs) |||| 26 SU |
| 128 | 106 MU (4 STAs) |||| 26 SU | 106 SU |||| 26 SU |
| 129 | 106 MU (4 STAs) |||| 26 SU | 106 MU (2 STAs) |||| 26 SU |
| 130 | 106 MU (4 STAs) |||| 26 SU | 106 MU (3 STAs) |||| 26 SU |
| 131 | 106 MU (4 STAs) |||| 26 SU | 106 MU (4 STAs) |||| 26 SU |
| 132 | 106 SU |||| 26 SU | 26 SU | 26 SU | 26 SU | 26 SU | 26 SU |
| 133 | 106 MU (2 STAs) |||| 26 SU | 26 SU | 26 SU | 26 SU | 26 SU | 26 SU |
| 134 | 106 MU (3 STAs) |||| 26 SU | 26 SU | 26 SU | 26 SU | 26 SU | 26 SU |
| 135 | 106 MU (4 STAs) |||| 26 SU | 26 SU | 26 SU | 26 SU | 26 SU | 26 SU |
| 136 | 106 SU |||| 26 SU | 26 SU | 26 SU | 52 SU || 26 SU |
| 137 | 106 MU (2 STAs) |||| 26 SU | 26 SU | 26 SU | 52 SU || 26 SU |
| 138 | 106 MU (3 STAs) |||| 26 SU | 26 SU | 26 SU | 52 SU || 26 SU |
| 139 | 106 MU (4 STAs) |||| 26 SU | 26 SU | 26 SU | 52 SU || 26 SU |
| 140 | 106 SU |||| 26 SU | 52 SU || 26 SU | 26 SU | 26 SU |
| 141 | 106 MU (2 STAs) |||| 26 SU | 52 SU || 26 SU | 26 SU | 26 SU |
| 142 | 106 MU (3 STAs) |||| 26 SU | 52 SU || 26 SU | 26 SU | 26 SU |
| 143 | 106 MU (4 STAs) |||| 26 SU | 52 SU || 26 SU | 26 SU | 26 SU |
| 144 | 106 SU |||| 26 SU | 52 SU || 52 SU || 26 SU |
| 145 | 106 MU (2 STAs) |||| 26 SU | 52 SU || 52 SU || 26 SU |
| 146 | 106 MU (3 STAs) |||| 26 SU | 52 SU || 52 SU || 26 SU |
| 147 | 106 MU (4 STAs) |||| 26 SU | 52 SU || 52 SU || 26 SU |

FIG. 19D

Table 2 (part 4 of 4)

| index | #1 | #2 | #3 | #4 | #5 | #6 | #7 | #8 | #9 | S-RU |
|---|---|---|---|---|---|---|---|---|---|---|
| 148 | 26 SU | 26 SU | 26 SU | 26 SU | 26 SU | 106 ( 1 STA) | | | | 26 SU |
| 149 | 26 SU | 26 SU | 26 SU | 26 SU | 26 SU | 106 MU (2 STAs) | | | | 26 SU |
| 150 | 26 SU | 26 SU | 26 SU | 26 SU | 26 SU | 106 MU (3 STAs) | | | | 26 SU |
| 151 | 26 SU | 26 SU | 26 SU | 26 SU | 26 SU | 106 MU (4 STAs) | | | | 26 SU |
| 152 | 26 SU | 26 SU | 52 SU | | 26 SU | 106 SU | | | | 26 SU |
| 153 | 26 SU | 26 SU | 52 SU | | 26 SU | 106 MU (2 STAs) | | | | 26 SU |
| 154 | 26 SU | 26 SU | 52 SU | | 26 SU | 106 MU (3 STAs) | | | | 26 SU |
| 155 | 26 SU | 26 SU | 52 SU | | 26 SU | 106 MU (4 STAs) | | | | 26 SU |
| 156 | 52 SU | | 26 SU | 26 SU | 26 SU | 106 SU | | | | 26 SU |
| 157 | 52 SU | | 26 SU | 26 SU | 26 SU | 106 MU (2 STAs) | | | | 26 SU |
| 158 | 52 SU | | 26 SU | 26 SU | 26 SU | 106 MU (3 STAs) | | | | 26 SU |
| 159 | 52 SU | | 26 SU | 26 SU | 26 SU | 106 MU (4 STAs) | | | | 26 SU |
| 160 | 52 SU | | 52 SU | | 26 SU | 106 SU | | | | 26 SU |
| 161 | 52 SU | | 52 SU | | 26 SU | 106 MU (2 STAs) | | | | 26 SU |
| 162 | 52 SU | | 52 SU | | 26 SU | 106 MU (3 STAs) | | | | 26 SU |
| 163 | 52 SU | | 52 SU | | 26 SU | 106 MU (4 STAs) | | | | 26 SU |
| 164 | 242 SU | | | | | | | | | 26 SU |
| 165 | 242 MU (2 STAs) | | | | | | | | | 26 SU |
| 166 | 242 MU (3 STAs) | | | | | | | | | 26 SU |
| 167 | 242 MU (4 STAs) | | | | | | | | | 26 SU |
| 168 | 242 MU (5 STAs) | | | | | | | | | 26 SU |
| 169 | 242 MU (6 STAs) | | | | | | | | | 26 SU |
| 170 | 242 MU (7 STAs) | | | | | | | | | 26 SU |
| 171 | 242 MU (8 STAs) | | | | | | | | | 26 SU |
| 172 | 484 SU | | | | | | | | | 26 SU |
| 173 | 484 MU (1 STA) | | | | | | | | | 26 SU |
| 174 | 484 MU (2 STAs) | | | | | | | | | 26 SU |
| 175 | 484 MU (3 STAs) | | | | | | | | | 26 SU |
| 176 | 484 MU (4 STAs) | | | | | | | | | 26 SU |
| 177 | 484 MU (5 STAs) | | | | | | | | | 26 SU |
| 178 | 484 MU (6 STAs) | | | | | | | | | 26 SU |
| 179 | 484 MU (7 STAs) | | | | | | | | | 26 SU |
| 180 | 484 MU (8 STAs) | | | | | | | | | 26 SU |
| 181 | 996 SU | | | | | | | | | 26 SU |
| 182 | 996 MU (1 STA) | | | | | | | | | 26 SU |
| 183 | 996 MU (2 STAs) | | | | | | | | | 26 SU |
| 184 | 996 MU (3 STAs) | | | | | | | | | 26 SU |
| 185 | 996 MU (4 STAs) | | | | | | | | | 26 SU |
| 186 | 996 MU (5 STAs) | | | | | | | | | 26 SU |
| 187 | 996 MU (6 STAs) | | | | | | | | | 26 SU |
| 188 | 996 MU (7 STAs) | | | | | | | | | 26 SU |
| 189 | 996 MU (8 STAs) | | | | | | | | | 26 SU |
| 190 | 2*996 MU (1 STA) | | | | | | | | | 26 SU |
| 191 | 2*996 MU (2 STAs) | | | | | | | | | 26 SU |
| 192 | 2*996 MU (3 STAs) | | | | | | | | | 26 SU |
| 193 | 2*996 MU (4 STAs) | | | | | | | | | 26 SU |
| 194 | 2*996 MU (5 STAs) | | | | | | | | | 26 SU |
| 195 | 2*996 MU (6 STAs) | | | | | | | | | 26 SU |
| 196 | 2*996 MU (7 STAs) | | | | | | | | | 26 SU |
| 197 | 2*996 MU (8 STAs) | | | | | | | | | 26 SU |

FIG. 20A

Table 3 (part 1 of 4)

| Index | #1 | #2 | #3 | #4 | #5 | #6 | #7 | #8 | #9 | S-RU |
|---|---|---|---|---|---|---|---|---|---|---|
| 0 | No STA assigned | | | | | | | | | NA |
| 1 | 26 SU | 26 SU | 26 SU | 26 SU | 26 SU | 26 SU | 26 SU | 26 SU | 26 SU | NA |
| 2 | 52 SU | | 52 SU | | 26 SU | 52 SU | | 52 SU | | NA |
| 3 | 52 SU | | 26 SU | 26 SU | 26 SU | 26 SU | 26 SU | 26 SU | 26 SU | NA |
| 4 | 26 SU | 26 SU | 52 SU | | 26 SU | 26 SU | 26 SU | 26 SU | 26 SU | NA |
| 5 | 26 SU | 26 SU | 26 SU | 26 SU | 26 SU | 52 SU | | 26 SU | 26 SU | NA |
| 6 | 26 SU | 26 SU | 26 SU | 26 SU | 26 SU | 26 SU | 26 SU | 52 SU | | NA |
| 7 | 52 SU | | 52 SU | | 26 SU | 26 SU | 26 SU | 26 SU | 26 SU | NA |
| 8 | 52 SU | | 26 SU | 26 SU | 26 SU | 52 SU | | 26 SU | 26 SU | NA |
| 9 | 52 SU | | 26 SU | 26 SU | 26 SU | 26 SU | 26 SU | 52 SU | | NA |
| 10 | 26 SU | 26 SU | 52 SU | | 26 SU | 52 SU | | 26 SU | 26 SU | NA |
| 11 | 26 SU | 26 SU | 52 SU | | 26 SU | 26 SU | 26 SU | 52 SU | | NA |
| 12 | 26 SU | 26 SU | 26 SU | 26 SU | 26 SU | 52 SU | | 52 SU | | NA |
| 13 | 52 SU | | 52 SU | | 26 SU | 52 SU | | 26 SU | 26 SU | NA |
| 14 | 52 SU | | 52 SU | | 26 SU | 26 SU | 26 SU | 52 SU | | NA |
| 15 | 52 SU | | 26 SU | 26 SU | 26 SU | 52 SU | | 52 SU | | NA |
| 16 | 26 SU | 26 SU | 52 SU | | 26 SU | 52 SU | | 52 SU | | NA |
| 17 | 106 SU | | | | 26 SU | 106 SU | | | | NA |
| 18 | 106 SU | | | | 26 SU | 106 MU (2 STAs) | | | | NA |
| 19 | 106 SU | | | | 26 SU | 106 MU (3 STAs) | | | | NA |
| 20 | 106 SU | | | | 26 SU | 106 MU (4 STAs) | | | | NA |
| 21 | 106 MU (2 STAs) | | | | 26 SU | 106 SU | | | | NA |
| 22 | 106 MU (2 STAs) | | | | 26 SU | 106 MU (2 STAs) | | | | NA |
| 23 | 106 MU (2 STAs) | | | | 26 SU | 106 MU (3 STAs) | | | | NA |
| 24 | 106 MU (2 STAs) | | | | 26 SU | 106 MU (4 STAs) | | | | NA |
| 25 | 106 MU (3 STAs) | | | | 26 SU | 106 SU | | | | NA |
| 26 | 106 MU (3 STAs) | | | | 26 SU | 106 MU (2 STAs) | | | | NA |
| 27 | 106 MU (3 STAs) | | | | 26 SU | 106 MU (3 STAs) | | | | NA |
| 28 | 106 MU (3 STAs) | | | | 26 SU | 106 MU (4 STAs) | | | | NA |
| 29 | 106 MU (4 STAs) | | | | 26 SU | 106 SU | | | | NA |
| 30 | 106 MU (4 STAs) | | | | 26 SU | 106 MU (2 STAs) | | | | NA |
| 31 | 106 MU (4 STAs) | | | | 26 SU | 106 MU (3 STAs) | | | | NA |
| 32 | 106 MU (4 STAs) | | | | 26 SU | 106 MU (4 STAs) | | | | NA |
| 33 | 106 SU | | | | 26 SU | 26 SU | 26 SU | 26 SU | 26 SU | NA |
| 34 | 106 MU (2 STAs) | | | | 26 SU | 26 SU | 26 SU | 26 SU | 26 SU | NA |
| 35 | 106 MU (3 STAs) | | | | 26 SU | 26 SU | 26 SU | 26 SU | 26 SU | NA |
| 36 | 106 MU (4 STAs) | | | | 26 SU | 26 SU | 26 SU | 26 SU | 26 SU | NA |
| 37 | 106 SU | | | | 26 SU | 26 SU | 26 SU | 52 SU | | NA |
| 38 | 106 MU (2 STAs) | | | | 26 SU | 26 SU | 26 SU | 52 SU | | NA |
| 39 | 106 MU (3 STAs) | | | | 26 SU | 26 SU | 26 SU | 52 SU | | NA |
| 40 | 106 MU (4 STAs) | | | | 26 SU | 26 SU | 26 SU | 52 SU | | NA |
| 41 | 106 SU | | | | 26 SU | 52 SU | | 26 SU | 26 SU | NA |
| 42 | 106 MU (2 STAs) | | | | 26 SU | 52 SU | | 26 SU | 26 SU | NA |
| 43 | 106 MU (3 STAs) | | | | 26 SU | 52 SU | | 26 SU | 26 SU | NA |
| 44 | 106 MU (4 STAs) | | | | 26 SU | 52 SU | | 26 SU | 26 SU | NA |
| 45 | 106 SU | | | | 26 SU | 52 SU | | 52 SU | | NA |
| 46 | 106 MU (2 STAs) | | | | 26 SU | 52 SU | | 52 SU | | NA |
| 47 | 106 MU (3 STAs) | | | | 26 SU | 52 SU | | 52 SU | | NA |
| 48 | 106 MU (4 STAs) | | | | 26 SU | 52 SU | | 52 SU | | NA |

FIG. 20B
Table 3 (part 2 of 4)

| index | #1 | #2 | #3 | #4 | #5 | #6 | #7 | #8 | #9 | S-RU |
|---|---|---|---|---|---|---|---|---|---|---|
| 49 | 26 SU | 26 SU | 26 SU | 26 SU | 26 SU | 106 ( 1 STA) | | | | NA |
| 50 | 26 SU | 26 SU | 26 SU | 26 SU | 26 SU | 106 MU (2 STAs) | | | | NA |
| 51 | 26 SU | 26 SU | 26 SU | 26 SU | 26 SU | 106 MU (3 STAs) | | | | NA |
| 52 | 26 SU | 26 SU | 26 SU | 26 SU | 26 SU | 106 MU (4 STAs) | | | | NA |
| 53 | 26 SU | 26 SU | 52 SU | | 26 SU | 106 SU | | | | NA |
| 54 | 26 SU | 26 SU | 52 SU | | 26 SU | 106 MU (2 STAs) | | | | NA |
| 55 | 26 SU | 26 SU | 52 SU | | 26 SU | 106 MU (3 STAs) | | | | NA |
| 56 | 26 SU | 26 SU | 52 SU | | 26 SU | 106 MU (4 STAs) | | | | NA |
| 57 | 52 SU | | 26 SU | 26 SU | 26 SU | 106 SU | | | | NA |
| 58 | 52 SU | | 26 SU | 26 SU | 26 SU | 106 MU (2 STAs) | | | | NA |
| 59 | 52 SU | | 26 SU | 26 SU | 26 SU | 106 MU (3 STAs) | | | | NA |
| 60 | 52 SU | | 26 SU | 26 SU | 26 SU | 106 MU (4 STAs) | | | | NA |
| 61 | 52 SU | | 52 SU | | 26 SU | 106 SU | | | | NA |
| 62 | 52 SU | | 52 SU | | 26 SU | 106 MU (2 STAs) | | | | NA |
| 63 | 52 SU | | 52 SU | | 26 SU | 106 MU (3 STAs) | | | | NA |
| 64 | 52 SU | | 52 SU | | 26 SU | 106 MU (4 STAs) | | | | NA |
| 65 | 242 SU | | | | | | | | | NA |
| 66 | 242 MU (2 STAs) | | | | | | | | | NA |
| 67 | 242 MU (3 STAs) | | | | | | | | | NA |
| 68 | 242 MU (4 STAs) | | | | | | | | | NA |
| 69 | 484 SU | | | | | | | | | NA |
| 70 | 484 MU (1 STA) | | | | | | | | | NA |
| 71 | 484 MU (2 STAs) | | | | | | | | | NA |
| 72 | 484 MU (3 STAs) | | | | | | | | | NA |
| 73 | 484 MU (4 STAs) | | | | | | | | | NA |
| 74 | 996 SU | | | | | | | | | NA |
| 75 | 996 MU (1 STA) | | | | | | | | | NA |
| 76 | 996 MU (2 STAs) | | | | | | | | | NA |
| 77 | 996 MU (3 STAs) | | | | | | | | | NA |
| 78 | 996 MU (4 STAs) | | | | | | | | | NA |
| 79 | 2*996 MU (1 STA) | | | | | | | | | NA |
| 80 | 2*996 MU (2 STAs) | | | | | | | | | NA |
| 81 | 2*996 MU (3 STAs) | | | | | | | | | NA |
| 82 | 2*996 MU (4 STAs) | | | | | | | | | NA |
| 83 | No STA assigned | | | | | | | | | 26 SU |
| 84 | 26 SU | 26 SU | 26 SU | 26 SU | 26 SU | 26 SU | 26 SU | 26 SU | 26 SU | 26 SU |
| 85 | 52 SU | | 52 SU | | 26 SU | 52 SU | | 52 SU | | 26 SU |
| 86 | 52 SU | | 26 SU | 26 SU | 26 SU | 26 SU | 26 SU | 26 SU | 26 SU | 26 SU |
| 87 | 26 SU | 26 SU | 52 SU | | 26 SU | 26 SU | 26 SU | 26 SU | 26 SU | 26 SU |
| 88 | 26 SU | 26 SU | 26 SU | 26 SU | 26 SU | 52 SU | | 26 SU | 26 SU | 26 SU |
| 89 | 26 SU | 26 SU | 26 SU | 26 SU | 26 SU | 26 SU | 26 SU | 52 SU | | 26 SU |
| 90 | 52 SU | | 52 SU | | 26 SU | 26 SU | 26 SU | 26 SU | 26 SU | 26 SU |
| 91 | 52 SU | | 26 SU | 26 SU | 26 SU | 52 SU | | 26 SU | 26 SU | 26 SU |
| 92 | 52 SU | | 26 SU | 26 SU | 26 SU | 26 SU | 26 SU | 52 SU | | 26 SU |
| 93 | 26 SU | 26 SU | 52 SU | | 26 SU | 52 SU | | 26 SU | 26 SU | 26 SU |
| 94 | 26 SU | 26 SU | 52 SU | | 26 SU | 26 SU | 26 SU | 52 SU | | 26 SU |
| 95 | 26 SU | 26 SU | 26 SU | 26 SU | 26 SU | 52 SU | | 52 SU | | 26 SU |
| 96 | 52 SU | | 52 SU | | 26 SU | 52 SU | | 26 SU | 26 SU | 26 SU |
| 97 | 52 SU | | 52 SU | | 26 SU | 26 SU | 26 SU | 52 SU | | 26 SU |
| 98 | 52 SU | | 26 SU | 26 SU | 26 SU | 52 SU | | 52 SU | | 26 SU |
| 99 | 26 SU | 26 SU | 52 SU | | 26 SU | 52 SU | | 52 SU | | 26 SU |

FIG. 20C

Table 3 (part 3 of 4)

| index | #1 | #2 | #3 | #4 | #5 | #6 | #7 | #8 | #9 | S-RU |
|---|---|---|---|---|---|---|---|---|---|---|
| 100 | 106 SU | | | | 26 SU | 106 SU | | | | 26 SU |
| 101 | 106 SU | | | | 26 SU | 106 MU (2 STAs) | | | | 26 SU |
| 102 | 106 SU | | | | 26 SU | 106 MU (3 STAs) | | | | 26 SU |
| 103 | 106 SU | | | | 26 SU | 106 MU (4 STAs) | | | | 26 SU |
| 104 | 106 MU (2 STAs) | | | | 26 SU | 106 SU | | | | 26 SU |
| 105 | 106 MU (2 STAs) | | | | 26 SU | 106 MU (2 STAs) | | | | 26 SU |
| 106 | 106 MU (2 STAs) | | | | 26 SU | 106 MU (3 STAs) | | | | 26 SU |
| 107 | 106 MU (2 STAs) | | | | 26 SU | 106 MU (4 STAs) | | | | 26 SU |
| 108 | 106 MU (3 STAs) | | | | 26 SU | 106 SU | | | | 26 SU |
| 109 | 106 MU (3 STAs) | | | | 26 SU | 106 MU (2 STAs) | | | | 26 SU |
| 110 | 106 MU (3 STAs) | | | | 26 SU | 106 MU (3 STAs) | | | | 26 SU |
| 111 | 106 MU (3 STAs) | | | | 26 SU | 106 MU (4 STAs) | | | | 26 SU |
| 112 | 106 MU (4 STAs) | | | | 26 SU | 106 SU | | | | 26 SU |
| 113 | 106 MU (4 STAs) | | | | 26 SU | 106 MU (2 STAs) | | | | 26 SU |
| 114 | 106 MU (4 STAs) | | | | 26 SU | 106 MU (3 STAs) | | | | 26 SU |
| 115 | 106 MU (4 STAs) | | | | 26 SU | 106 MU (4 STAs) | | | | 26 SU |
| 116 | 106 SU | | | | 26 SU | 26 SU | 26 SU | 26 SU | 26 SU | 26 SU |
| 117 | 106 MU (2 STAs) | | | | 26 SU | 26 SU | 26 SU | 26 SU | 26 SU | 26 SU |
| 118 | 106 MU (3 STAs) | | | | 26 SU | 26 SU | 26 SU | 26 SU | 26 SU | 26 SU |
| 119 | 106 MU (4 STAs) | | | | 26 SU | 26 SU | 26 SU | 26 SU | 26 SU | 26 SU |
| 120 | 106 SU | | | | 26 SU | 26 SU | 26 SU | 52 SU | | 26 SU |
| 121 | 106 MU (2 STAs) | | | | 26 SU | 26 SU | 26 SU | 52 SU | | 26 SU |
| 122 | 106 MU (3 STAs) | | | | 26 SU | 26 SU | 26 SU | 52 SU | | 26 SU |
| 123 | 106 MU (4 STAs) | | | | 26 SU | 26 SU | 26 SU | 52 SU | | 26 SU |
| 124 | 106 SU | | | | 26 SU | 52 SU | | 26 SU | 26 SU | 26 SU |
| 125 | 106 MU (2 STAs) | | | | 26 SU | 52 SU | | 26 SU | 26 SU | 26 SU |
| 126 | 106 MU (3 STAs) | | | | 26 SU | 52 SU | | 26 SU | 26 SU | 26 SU |
| 127 | 106 MU (4 STAs) | | | | 26 SU | 52 SU | | 26 SU | 26 SU | 26 SU |
| 128 | 106 SU | | | | 26 SU | 52 SU | | 52 SU | | 26 SU |
| 129 | 106 MU (2 STAs) | | | | 26 SU | 52 SU | | 52 SU | | 26 SU |
| 130 | 106 MU (3 STAs) | | | | 26 SU | 52 SU | | 52 SU | | 26 SU |
| 131 | 106 MU (4 STAs) | | | | 26 SU | 52 SU | | 52 SU | | 26 SU |
| 132 | 26 SU | 26 SU | 26 SU | 26 SU | 26 SU | 106 ( 1 STA) | | | | 26 SU |
| 133 | 26 SU | 26 SU | 26 SU | 26 SU | 26 SU | 106 MU (2 STAs) | | | | 26 SU |
| 134 | 26 SU | 26 SU | 26 SU | 26 SU | 26 SU | 106 MU (3 STAs) | | | | 26 SU |
| 135 | 26 SU | 26 SU | 26 SU | 26 SU | 26 SU | 106 MU (4 STAs) | | | | 26 SU |
| 136 | 26 SU | 26 SU | 52 SU | | 26 SU | 106 SU | | | | 26 SU |
| 137 | 26 SU | 26 SU | 52 SU | | 26 SU | 106 MU (2 STAs) | | | | 26 SU |
| 138 | 26 SU | 26 SU | 52 SU | | 26 SU | 106 MU (3 STAs) | | | | 26 SU |
| 139 | 26 SU | 26 SU | 52 SU | | 26 SU | 106 MU (4 STAs) | | | | 26 SU |
| 140 | 52 SU | | 26 SU | 26 SU | 26 SU | 106 SU | | | | 26 SU |
| 141 | 52 SU | | 26 SU | 26 SU | 26 SU | 106 MU (2 STAs) | | | | 26 SU |
| 142 | 52 SU | | 26 SU | 26 SU | 26 SU | 106 MU (3 STAs) | | | | 26 SU |
| 143 | 52 SU | | 26 SU | 26 SU | 26 SU | 106 MU (4 STAs) | | | | 26 SU |
| 144 | 52 SU | | 52 SU | | 26 SU | 106 SU | | | | 26 SU |
| 145 | 52 SU | | 52 SU | | 26 SU | 106 MU (2 STAs) | | | | 26 SU |
| 146 | 52 SU | | 52 SU | | 26 SU | 106 MU (3 STAs) | | | | 26 SU |
| 147 | 52 SU | | 52 SU | | 26 SU | 106 MU (4 STAs) | | | | 26 SU |
| 148 | 242 SU | | | | | | | | | 26 SU |

FIG. 20D

Table 3 (part 4 of 4)

| index | #1 | #2 | #3 | #4 | #5 | #6 | #7 | #8 | #9 | S-RU |
|---|---|---|---|---|---|---|---|---|---|---|
| 149 | | | | 242 MU (2 STAs) | | | | | | 26 SU |
| 150 | | | | 242 MU (3 STAs) | | | | | | 26 SU |
| 151 | | | | 242 MU (4 STAs) | | | | | | 26 SU |
| 152 | | | | 484 SU | | | | | | 26 SU |
| 153 | | | | 484 MU (1 STA) | | | | | | 26 SU |
| 154 | | | | 484 MU (2 STAs) | | | | | | 26 SU |
| 155 | | | | 484 MU (3 STAs) | | | | | | 26 SU |
| 156 | | | | 484 MU (4 STAs) | | | | | | 26 SU |
| 157 | | | | 996 SU | | | | | | 26 SU |
| 158 | | | | 996 MU (1 STA) | | | | | | 26 SU |
| 159 | | | | 996 MU (2 STAs) | | | | | | 26 SU |
| 160 | | | | 996 MU (3 STAs) | | | | | | 26 SU |
| 161 | | | | 996 MU (4 STAs) | | | | | | 26 SU |
| 162 | | | | 2*996 MU (1 STA) | | | | | | 26 SU |
| 163 | | | | 2*996 MU (2 STAs) | | | | | | 26 SU |
| 164 | | | | 2*996 MU (3 STAs) | | | | | | 26 SU |
| 165 | | | | 2*996 MU (4 STAs) | | | | | | 26 SU |

FIG. 23

Table 4

| SU | 484 SU |
|---|---|
| 2 user MU | 484 MU (1 out of 2 STAs - 1st logical user) |
| | 484 MU (1 out of 2 STAs - 2nd logical user) |
| | 484 MU (2 out of 2 STAs - 1st, 2nd logical user) |
| 3 user MU | 484 MU (1 out of 3 STAs - 1st logical user) |
| | 484 MU (1 out of 3 STAs - 3rd logical user) |
| | 484 MU (2 out of 3 STAs - 1st, 2nd logical user) |
| | 484 MU (2 out of 3 STAs - 2nd, 3rd logical user) |
| | 484 MU (3 out of 3 STAs - 1st, 2nd, 3rd logical user) |
| 4 user MU | 484 MU (1 out of 4 STAs - 1st logical user) |
| | 484 MU (1 out of 4 STAs - 4th logical user) |
| | 484 MU (2 out of 4 STAs - 1st, 2nd logical user) |
| | 484 MU (2 out of 4 STAs - 3rd, 4th logical user) |
| | 484 MU (3 out of 4 STAs - 1st, 2nd, 3rd logical user) |
| | 484 MU (3 out of 4 STAs - 2nd, 3rd, 4th logical user) |
| | 484 MU (4 out of 4 STAs - 1st, 2nd, 3rd, 4th logical user) |
| 5 user MU | 484 MU (1 out of 5 STAs - 1st logical user) |
| | 484 MU (1 out of 5 STAs - 5th logical user) |
| | 484 MU (2 out of 5 STAs - 1st, 2nd logical user) |
| | 484 MU (2 out of 5 STAs - 4th, 5th logical user) |
| | 484 MU (3 out of 5 STAs - 1st, 2nd, 3rd logical user) |
| | 484 MU (3 out of 5 STAs - 3rd, 4th, 5th logical user) |
| | 484 MU (4 out of 5 STAs - 1st, 2nd, 3rd, 4th logical user) |
| | 484 MU (4 out of 5 STAs - 2nd, 3rd, 4th, 5th logical user) |
| | 484 MU (5 out of 5 STAs - 1st, 2nd, 3rd, 4th, 5th logical user) |
| 6 user MU | 484 MU (1 out of 6 STAs - 1st logical user) |
| | 484 MU (1 out of 6 STAs - 6th logical user) |
| | 484 MU (2 out of 6 STAs - 1st, 2nd logical user) |
| | 484 MU (2 out of 6 STAs - 5th, 6th logical user) |
| | 484 MU (3 out of 6 STAs - 1st, 2nd, 3rd logical user) |
| | 484 MU (3 out of 6 STAs - 4th, 5th, 6th logical user) |
| | 484 MU (4 out of 6 STAs - 1st, 2nd, 3rd, 4th logical user) |
| | 484 MU (4 out of 6 STAs - 3rd, 4th, 5th, 6th logical user) |
| | 484 MU (5 out of 6 STAs - 1st, 2nd, 3rd, 4th, 5th logical user) |
| | 484 MU (5 out of 6 STAs - 2nd, 3rd, 4th, 5th, 6th logical user) |
| | 484 MU (6 out of 6 STAs - 1st, 2nd, 3rd, 4th, 5th, 6th logical user) |
| 7 user MU | 484 MU (1 out of 7 STAs - 1st logical user) |
| | 484 MU (1 out of 7 STAs - 7th logical user) |
| | 484 MU (2 out of 7 STAs - 1st, 2nd logical user) |
| | 484 MU (2 out of 7 STAs - 6th, 7th logical user) |
| | 484 MU (3 out of 7 STAs - 1st, 2nd, 3rd logical user) |
| | 484 MU (3 out of 7 STAs - 5th, 6th, 7th logical user) |
| | 484 MU (4 out of 7 STAs - 1st, 2nd, 3rd, 4th logical user) |
| | 484 MU (4 out of 7 STAs - 4th, 5th, 6th, 7th logical user) |
| | 484 MU (5 out of 7 STAs - 1st, 2nd, 3rd, 4th, 5th logical user) |
| | 484 MU (5 out of 7 STAs - 3rd, 4th, 5th, 6th, 7th logical user) |
| | 484 MU (6 out of 7 STAs - 1st, 2nd, 3rd, 4th, 5th, 6th logical user) |
| | 484 MU (6 out of 7 STAs - 2nd, 3rd, 4th, 5th, 6th, 7th logical user) |
| | 484 MU (7 out of 7 STAs - 1st, 2nd, 3rd, 4th, 5th, 6th, 7th logical user) |
| 8 user MU | 484 MU (1 out of 7 STAs - 1st logical user) |
| | 484 MU (1 out of 8 STAs - 8th logical user) |
| | 484 MU (2 out of 8 STAs - 1st, 2nd logical user) |
| | 484 MU (2 out of 8 STAs - 7th, 8th logical user) |
| | 484 MU (3 out of 8 STAs - 1st, 2nd, 3rd logical user) |
| | 484 MU (3 out of 8 STAs - 6th, 7th, 8th logical user) |
| | 484 MU (4 out of 8 STAs - 1st, 2nd, 3rd, 4th logical user) |
| | 484 MU (4 out of 8 STAs - 5th, 6th, 7th, 8th logical user) |
| | 484 MU (5 out of 8 STAs - 1st, 2nd, 3rd, 4th, 5th logical user) |
| | 484 MU (5 out of 8 STAs - 4th, 5th, 6th, 7th, 8th logical user) |
| | 484 MU (6 out of 8 STAs - 1st, 2nd, 3rd, 4th, 5th, 6th logical user) |
| | 484 MU (6 out of 8 STAs - 3rd, 4th, 5th, 6th, 7th, 8th logical user) |
| | 484 MU (7 out of 8 STAs - 1st, 2nd, 3rd, 4th, 5th, 6th, 7th logical user) |
| | 484 MU (7 out of 8 STAs - 2nd, 3rd, 4th, 5th, 6th, 7th, 8th logical user) |
| | 484 MU (7 out of 8 STAs - 1st, 2nd, 3rd, 4th, 5th, 6th, 7th, 8th logical user) |

FIG. 24
Table 5

| SU | 484 SU |
|---|---|
| 2 user MU | 484 MU (1 out of 2 STAs - 1st logical user) |
| | 484 MU (1 out of 2 STAs - 2nd logical user) |
| | 484 MU (2 out of 2 STAs - 1st, 2nd logical user) |
| 3 user MU | 484 MU (1 out of 3 STAs - 1st logical user) |
| | 484 MU (1 out of 3 STAs - 3rd logical user) |
| | 484 MU (2 out of 3 STAs - 1st, 2nd logical user) |
| | 484 MU (2 out of 3 STAs - 2nd, 3rd logical user) |
| | 484 MU (3 out of 3 STAs - 1st, 2nd, 3rd logical user) |
| 4 user MU | 484 MU (1 out of 4 STAs - 1st logical user) |
| | 484 MU (1 out of 4 STAs - 4th logical user) |
| | 484 MU (2 out of 4 STAs - 1st, 2nd logical user) |
| | 484 MU (2 out of 4 STAs - 3rd, 4th logical user) |
| | 484 MU (3 out of 4 STAs - 1st, 2nd, 3rd logical user) |
| | 484 MU (3 out of 4 STAs - 2nd, 3rd, 4th logical user) |
| | 484 MU (4 out of 4 STAs - 1st, 2nd, 3rd, 4th logical user) |
| 5 user MU | 484 MU (1 out of 5 STAs - 1st logical user) |
| | 484 MU (1 out of 5 STAs - 5th logical user) |
| | 484 MU (2 out of 5 STAs - 1st, 2nd logical user) |
| | 484 MU (2 out of 5 STAs - 4th, 5th logical user) |
| | 484 MU (3 out of 5 STAs - 1st, 2nd, 3rd logical user) |
| | 484 MU (3 out of 5 STAs - 3rd, 4th, 5th logical user) |
| | 484 MU (4 out of 5 STAs - 1st, 2nd, 3rd, 4th logical user) |
| | 484 MU (4 out of 5 STAs - 2nd, 3rd, 4th, 5th logical user) |
| | 484 MU (5 out of 5 STAs - 1st, 2nd, 3rd, 4th, 5th logical user) |
| 6 user MU | 484 MU (1 out of 6 STAs - 1st logical user) |
| | 484 MU (1 out of 6 STAs - 6th logical user) |
| | 484 MU (2 out of 6 STAs - 1st, 2nd logical user) |
| | 484 MU (2 out of 6 STAs - 5th, 6th logical user) |
| | 484 MU (3 out of 6 STAs - 1st, 2nd, 3rd logical user) |
| | 484 MU (3 out of 6 STAs - 4th, 5th, 6th logical user) |
| | 484 MU (4 out of 6 STAs - 1st, 2nd, 3rd, 4th logical user) |
| | 484 MU (4 out of 6 STAs - 3rd, 4th, 5th, 6th logical user) |
| | 484 MU (5 out of 6 STAs - 1st, 2nd, 3rd, 4th, 5th logical user) |
| | 484 MU (5 out of 6 STAs - 2nd, 3rd, 4th, 5th, 6th logical user) |
| | 484 MU (6 out of 6 STAs - 1st, 2nd, 3rd, 4th, 5th, 6th logical user) |
| 7 user MU | 484 MU (1 out of 7 STAs - 1st logical user) |
| | 484 MU (1 out of 7 STAs - 7th logical user) |
| | 484 MU (2 out of 7 STAs - 1st, 2nd logical user) |
| | 484 MU (2 out of 7 STAs - 6th, 7th logical user) |
| | 484 MU (3 out of 7 STAs - 1st, 2nd, 3rd logical user) |
| | 484 MU (3 out of 7 STAs - 5th, 6th, 7th logical user) |
| | 484 MU (4 out of 7 STAs - 1st, 2nd, 3rd, 4th logical user) |
| | 484 MU (4 out of 7 STAs - 4th, 5th, 6th, 7th logical user) |
| | 484 MU (5 out of 7 STAs - 1st, 2nd, 3rd, 4th, 5th logical user) |
| | 484 MU (5 out of 7 STAs - 3rd, 4th, 5th, 6th, 7th logical user) |
| | 484 MU (6 out of 7 STAs - 1st, 2nd, 3rd, 4th, 5th, 6th logical user) |
| | 484 MU (6 out of 7 STAs - 2nd, 3rd, 4th, 5th, 6th, 7th logical user) |
| | 484 MU (7 out of 7 STAs - 1st, 2nd, 3rd, 4th, 5th, 6th, 7th logical user) |
| 8 User MU | 484 MU (1 out of 8 STAs - 1st or 8th logical user) |
| | 484 MU (2 out of 8 STAs - 1st, 2nd or 7th, 8th logical user) |
| | 484 MU (3 out of 8 STAs - 1st, 2nd, 3rd or 6th, 7th, 8th logical user) |
| | 484 MU (4 out of 8 STAs - 1st, 2nd, 3rd, 4th or 5th, 6th, 7th, 8th logical user) |
| | 484 MU (5 out of 8 STAs - 1st, 2nd, 3rd, 4th, 5th or 4th, 5th, 6th, 7th, 8th logical user) |
| | 484 MU (6 out of 8 STAs - 1st, 2nd, 3rd, 4th, 5th, 6th or 3rd, 4th, 5th, 6th, 7th, 8th logical user) |
| | 484 MU (7 out of 8 STAs - 1st, 2nd, 3rd, 4th, 5th, 6th, 7th or 2nd, 3rd, 4th, 5th, 6th, 7th, 8th logical user) |
| | 484 MU (8 out of 8 STAs - 1st, 2nd, 3rd, 4th, 5th, 6th, 7th, 8th logical user) |

FIG. 25A

Table 6 ( part 1 of 4)

| index | #1 | #2 | #3 | #4 | #5 | #6 | #7 | #8 | #9 |
|---|---|---|---|---|---|---|---|---|---|
| 0 | No STA assigned ||||||||| 
| 1 | 26 SU | 26 SU | 26 SU | 26 SU | 26 SU | 26 SU | 26 SU | 26 SU | 26 SU |
| 2 | 52 SU || 52 SU || 26 SU | 52 SU || 52 SU ||
| 3 | 52 SU || 26 SU | 26 SU | 26 SU | 26 SU | 26 SU | 26 SU | 26 SU |
| 4 | 26 SU | 26 SU | 52 SU || 26 SU | 26 SU | 26 SU | 26 SU | 26 SU |
| 5 | 26 SU | 26 SU | 26 SU | 26 SU | 26 SU | 52 SU || 26 SU | 26 SU |
| 6 | 26 SU | 26 SU | 26 SU | 26 SU | 26 SU | 26 SU | 26 SU | 52 SU ||
| 7 | 52 SU || 52 SU || 26 SU | 26 SU | 26 SU | 26 SU | 26 SU |
| 8 | 52 SU || 26 SU | 26 SU | 26 SU | 52 SU || 26 SU | 26 SU |
| 9 | 52 SU || 26 SU | 26 SU | 26 SU | 26 SU | 26 SU | 52 SU ||
| 10 | 26 SU | 26 SU | 52 SU || 26 SU | 52 SU || 26 SU | 26 SU |
| 11 | 26 SU | 26 SU | 52 SU || 26 SU | 26 SU | 26 SU | 52 SU ||
| 12 | 26 SU | 26 SU | 26 SU | 26 SU | 26 SU | 52 SU || 52 SU ||
| 13 | 52 SU || 52 SU || 26 SU | 52 SU || 26 SU | 26 SU |
| 14 | 52 SU || 52 SU || 26 SU | 26 SU | 26 SU | 52 SU ||
| 15 | 52 SU || 26 SU | 26 SU | 26 SU | 52 SU || 52 SU ||
| 16 | 26 SU | 26 SU | 52 SU || 26 SU | 52 SU || 52 SU ||
| 17 | 106 SU |||| 26 SU | 106 SU ||||
| 18-20 | 106 SU |||| 26 SU | 106 MU (2-4 STAs) ||||
| 21 | 106 MU (2 STAs) |||| 26 SU | 106 SU ||||
| 22-24 | 106 MU (2 STAs) |||| 26 SU | 106 MU (2-4 STAs) ||||
| 25 | 106 MU (3 STAs) |||| 26 SU | 106 SU ||||
| 26-28 | 106 MU (3 STAs) |||| 26 SU | 106 MU (2-4 STAs) ||||
| 29 | 106 MU (4 STAs) |||| 26 SU | 106 SU ||||
| 30-32 | 106 MU (4 STAs) |||| 26 SU | 106 MU (2-4 STAs) ||||
| 33 | 106 SU |||| 26 SU | 26 SU | 26 SU | 26 SU | 26 SU |
| 34 | 106 MU (2 STAs) |||| 26 SU | 26 SU | 26 SU | 26 SU | 26 SU |
| 35 | 106 MU (3 STAs) |||| 26 SU | 26 SU | 26 SU | 26 SU | 26 SU |
| 36 | 106 MU (4 STAs) |||| 26 SU | 26 SU | 26 SU | 26 SU | 26 SU |
| 37 | 106 SU |||| 26 SU | 26 SU | 26 SU | 52 SU ||
| 38 | 106 MU (2 STAs) |||| 26 SU | 26 SU | 26 SU | 52 SU ||
| 39 | 106 MU (3 STAs) |||| 26 SU | 26 SU | 26 SU | 52 SU ||
| 40 | 106 MU (4 STAs) |||| 26 SU | 26 SU | 26 SU | 52 SU ||
| 41 | 106 SU |||| 26 SU | 52 SU || 26 SU | 26 SU |
| 42 | 106 MU (2 STAs) |||| 26 SU | 52 SU || 26 SU | 26 SU |
| 43 | 106 MU (3 STAs) |||| 26 SU | 52 SU || 26 SU | 26 SU |
| 44 | 106 MU (4 STAs) |||| 26 SU | 52 SU || 26 SU | 26 SU |
| 45 | 106 SU |||| 26 SU | 52 SU || 52 SU ||
| 46 | 106 MU (2 STAs) |||| 26 SU | 52 SU || 52 SU ||
| 47 | 106 MU (3 STAs) |||| 26 SU | 52 SU || 52 SU ||
| 48 | 106 MU (4 STAs) |||| 26 SU | 52 SU || 52 SU ||
| 49 | 26 SU | 26 SU | 26 SU | 26 SU | 26 SU | 106 ( 1 STA) ||||
| 50-52 | 26 SU | 26 SU | 26 SU | 26 SU | 26 SU | 106 MU (2-4 STAs) ||||
| 53 | 26 SU | 26 SU | 52 SU || 26 SU | 106 SU ||||
| 54-56 | 26 SU | 26 SU | 52 SU || 26 SU | 106 MU (2-4 STAs) ||||
| 57 | 52 SU || 26 SU | 26 SU | 26 SU | 106 SU ||||
| 58-60 | 52 SU || 26 SU | 26 SU | 26 SU | 106 MU (2-4 STAs) ||||
| 61 | 52 SU || 52 SU || 26 SU | 106 SU ||||
| 62-64 | 52 SU || 52 SU || 26 SU | 106 MU (2-4 STAs) ||||
| 65 | 242 SU |||||||||
| 66 | 242 MU (2 STAs) |||||||||
| 67 | 242 MU (3 STAs) |||||||||
| 68 | 242 MU (4 STAs) |||||||||
| 69 | 242 MU (5 STAs) |||||||||
| 70 | 242 MU (6 STAs) |||||||||
| 71 | 242 MU (7 STAs) |||||||||
| 72 | 242 MU (8 STAs) |||||||||

FIG. 25B
Table 6 ( part 2 of 4)

| Index | #1 | #2 | #3 | #4 | #5 | #6 | #7 | #8 | #9 |
|---|---|---|---|---|---|---|---|---|---|
| 73 | 484 SU ||||||||||
| 74 | 484 MU (1 out of 2 STAs - 1st logical user) |||||||||
| 75 | 484 MU (1 out of 2 STAs - 2nd logical user) |||||||||
| 76 | 484 MU (2 out of 2 STAs - 1st, 2nd logical user) |||||||||
| 77 | 484 MU (1 out of 3 STAs - 1st logical user) |||||||||
| 78 | 484 MU (1 out of 3 STAs - 3rd logical user) |||||||||
| 79 | 484 MU (2 out of 3 STAs - 1st, 2nd logical user) |||||||||
| 80 | 484 MU (2 out of 3 STAs - 2nd, 3rd logical user) |||||||||
| 81 | 484 MU (3 out of 3 STAs - 1st, 2nd, 3rd logical user) |||||||||
| 82 | 484 MU (1 out of 4 STAs - 1st logical user) |||||||||
| 83 | 484 MU (1 out of 4 STAs - 4th logical user) |||||||||
| 84 | 484 MU (2 out of 4 STAs - 1st, 2nd logical user) |||||||||
| 85 | 484 MU (2 out of 4 STAs - 3rd, 4th logical user) |||||||||
| 86 | 484 MU (3 out of 4 STAs - 1st, 2nd, 3rd logical user) |||||||||
| 87 | 484 MU (3 out of 4 STAs - 2nd, 3rd, 4th logical user) |||||||||
| 88 | 484 MU (4 out of 4 STAs - 1st, 2nd, 3rd, 4th logical user) |||||||||
| 89 | 484 MU (1 out of 5 STAs - 1st logical user) |||||||||
| 90 | 484 MU (1 out of 5 STAs - 5th logical user) |||||||||
| 91 | 484 MU (2 out of 5 STAs - 1st, 2nd logical user) |||||||||
| 92 | 484 MU (2 out of 5 STAs - 4th, 5th logical user) |||||||||
| 93 | 484 MU (3 out of 5 STAs - 1st, 2nd, 3rd logical user) |||||||||
| 94 | 484 MU (3 out of 5 STAs - 3rd, 4th, 5th logical user) |||||||||
| 95 | 484 MU (4 out of 5 STAs - 1st, 2nd, 3rd, 4th logical user) |||||||||
| 96 | 484 MU (4 out of 5 STAs - 2nd, 3rd, 4th, 5th logical user) |||||||||
| 97 | 484 MU (5 out of 5 STAs - 1st, 2nd, 3rd, 4th, 5th logical user) |||||||||
| 98 | 484 MU (1 out of 6 STAs - 1st logical user) |||||||||
| 99 | 484 MU (1 out of 6 STAs - 6th logical user) |||||||||
| 100 | 484 MU (2 out of 6 STAs - 1st, 2nd logical user) |||||||||
| 101 | 484 MU (2 out of 6 STAs - 5th, 6th logical user) |||||||||
| 102 | 484 MU (3 out of 6 STAs - 1st, 2nd, 3rd logical user) |||||||||
| 103 | 484 MU (3 out of 6 STAs - 4th, 5th, 6th logical user) |||||||||
| 104 | 484 MU (4 out of 6 STAs - 1st, 2nd, 3rd, 4th logical user) |||||||||
| 105 | 484 MU (4 out of 6 STAs - 3rd, 4th, 5th 6th logical user) |||||||||
| 106 | 484 MU (5 out of 6 STAs - 1st, 2nd, 3rd, 4th, 5th logical user) |||||||||
| 107 | 484 MU (5 out of 6 STAs - 2nd, 3rd, 4th, 5th 6th logical user) |||||||||
| 108 | 484 MU (6 out of 6 STAs - 1st, 2nd, 3rd, 4th, 5th 6th logical user) |||||||||
| 109 | 484 MU (1 out of 7 STAs - 1st logical user) |||||||||
| 110 | 484 MU (1 out of 7 STAs - 7th logical user) |||||||||
| 111 | 484 MU (2 out of 7 STAs - 1st, 2nd logical user) |||||||||
| 112 | 484 MU (2 out of 7 STAs - 6th, 7th logical user) |||||||||
| 113 | 484 MU (3 out of 7 STAs - 1st, 2nd, 3rd logical user) |||||||||
| 114 | 484 MU (3 out of 7 STAs - 5th, 6th 7th logical user) |||||||||
| 115 | 484 MU (4 out of 7 STAs - 1st, 2nd, 3rd, 4th logical user) |||||||||
| 116 | 484 MU (4 out of 7 STAs - 4th, 5th 6th 7th logical user) |||||||||
| 117 | 484 MU (5 out of 7 STAs - 1st, 2nd, 3rd, 4th, 5th logical user) |||||||||
| 118 | 484 MU (5 out of 7 STAs - 3rd, 4th, 5th 6th 7th logical user) |||||||||
| 119 | 484 MU (6 out of 7 STAs - 1st, 2nd, 3rd, 4th, 5th 6th logical user) |||||||||
| 120 | 484 MU (6 out of 7 STAs - 2nd, 3rd, 4th, 5th 6th 7th logical user) |||||||||
| 121 | 484 MU (7 out of 7 STAs - 1st, 2nd, 3rd, 4th, 5th 6th 7th logical user) |||||||||
| 122 | 484 MU (1 out of 8 STAs - 1st or 8th logical user) |||||||||
| 123 | 484 MU (2 out of 8 STAs - 1st, 2nd or 7th, 8th logical user) |||||||||
| 124 | 484 MU (3 out of 8 STAs - 1st, 2nd, 3rd or 6th 7th 8th logical user) |||||||||
| 125 | 484 MU (4 out of 8 STAs - 1st, 2nd, 3rd, 4th or 5th 6th 7th 8 th logical user) |||||||||
| 126 | 484 MU (5 out of 8 STAs - 1st, 2nd, 3rd 4th, 5th or 4th 5th 6th 7th 8th logical user) |||||||||
| 127 | 484 MU (6 out of 8 STAs - 1st, 2nd, 3rd, 4th, 5th 6th or 3rd 4th 5th 6th 7th 8th logical user) |||||||||
| 128 | 484 MU (7 out of 8 STAs - 1st, 2nd, 3rd, 4th, 5th 6th 7th or 2nd 3rd 4th 5th 6th 7th 8th logical user) |||||||||
| 129 | 484 MU (8 out of 8 STAs - 1st, 2nd, 3rd, 4th, 5th 6th 7th 8th logical user) |||||||||

FIG. 25C

Table 6 ( part 3 of 4)

| index | #1 | #2 | #3 | #4 | #5 | #6 | #7 | #8 | #9 |
|---|---|---|---|---|---|---|---|---|---|
| 130 | 996 SU | | | | | | | | |
| 131 | 996 MU (1 out of 2 STAs - 1st logical user) | | | | | | | | |
| 132 | 996 MU (1 out of 2 STAs - 2nd logical user) | | | | | | | | |
| 133 | 996 MU (2 out of 2 STAs - 1st, 2nd logical user) | | | | | | | | |
| 134 | 996 MU (1 out of 3 STAs - 1st logical user) | | | | | | | | |
| 135 | 996 MU (1 out of 3 STAs - 3rd logical user) | | | | | | | | |
| 136 | 996 MU (2 out of 3 STAs - 1st, 2nd logical user) | | | | | | | | |
| 137 | 996 MU (2 out of 3 STAs - 2nd, 3rd logical user) | | | | | | | | |
| 138 | 996 MU (3 out of 3 STAs - 1st, 2nd, 3rd logical user) | | | | | | | | |
| 139 | 996 MU (1 out of 4 STAs - 1st logical user) | | | | | | | | |
| 140 | 996 MU (1 out of 4 STAs - 4th logical user) | | | | | | | | |
| 141 | 996 MU (2 out of 4 STAs - 1st, 2nd logical user) | | | | | | | | |
| 142 | 996 MU (2 out of 4 STAs - 3rd, 4th logical user) | | | | | | | | |
| 143 | 996 MU (3 out of 4 STAs - 1st, 2nd, 3rd logical user) | | | | | | | | |
| 144 | 996 MU (3 out of 4 STAs - 2nd, 3rd, 4th logical user) | | | | | | | | |
| 145 | 996 MU (4 out of 4 STAs - 1st, 2nd, 3rd, 4th logical user) | | | | | | | | |
| 146 | 996 MU (1 out of 5 STAs - 1st logical user) | | | | | | | | |
| 147 | 996 MU (1 out of 5 STAs - 5th logical user) | | | | | | | | |
| 148 | 996 MU (2 out of 5 STAs - 1st, 2nd logical user) | | | | | | | | |
| 149 | 996 MU (2 out of 5 STAs - 4th, 5th logical user) | | | | | | | | |
| 150 | 996 MU (3 out of 5 STAs - 1st, 2nd, 3rd logical user) | | | | | | | | |
| 151 | 996 MU (3 out of 5 STAs - 3rd, 4th, 5th logical user) | | | | | | | | |
| 152 | 996 MU (4 out of 5 STAs - 1st, 2nd, 3rd, 4th logical user) | | | | | | | | |
| 153 | 996 MU (4 out of 5 STAs - 2nd, 3rd, 4th, 5th logical user) | | | | | | | | |
| 154 | 996 MU (5 out of 5 STAs - 1st, 2nd, 3rd, 4th, 5th logical user) | | | | | | | | |
| 155 | 996 MU (1 out of 6 STAs - 1st logical user) | | | | | | | | |
| 156 | 996 MU (1 out of 6 STAs - 6th logical user) | | | | | | | | |
| 157 | 996 MU (2 out of 6 STAs - 1st, 2nd logical user) | | | | | | | | |
| 158 | 996 MU (2 out of 6 STAs - 5th, 6th logical user) | | | | | | | | |
| 159 | 996 MU (3 out of 6 STAs - 1st, 2nd, 3rd logical user) | | | | | | | | |
| 160 | 996 MU (3 out of 6 STAs - 4th, 5th, 6th logical user) | | | | | | | | |
| 161 | 996 MU (4 out of 6 STAs - 1st, 2nd, 3rd, 4th logical user) | | | | | | | | |
| 162 | 996 MU (4 out of 6 STAs - 3rd, 4th, 5th 6th logical user) | | | | | | | | |
| 163 | 996 MU (5 out of 6 STAs - 1st, 2nd, 3rd, 4th, 5th logical user) | | | | | | | | |
| 164 | 996 MU (5 out of 6 STAs - 2nd, 3rd, 4th, 5th 6th logical user) | | | | | | | | |
| 165 | 996 MU (6 out of 6 STAs - 1st, 2nd, 3rd, 4th, 5th 6th logical user) | | | | | | | | |
| 166 | 996 MU (1 out of 7 STAs - 1st logical user) | | | | | | | | |
| 167 | 996 MU (1 out of 7 STAs - 7th logical user) | | | | | | | | |
| 168 | 996 MU (2 out of 7 STAs - 1st, 2nd logical user) | | | | | | | | |
| 169 | 996 MU (2 out of 7 STAs - 6th, 7th logical user) | | | | | | | | |
| 170 | 996 MU (3 out of 7 STAs - 1st, 2nd, 3rd logical user) | | | | | | | | |
| 171 | 996 MU (3 out of 7 STAs - 5th, 6th 7th logical user) | | | | | | | | |
| 172 | 996 MU (4 out of 7 STAs - 1st, 2nd, 3rd, 4th logical user) | | | | | | | | |
| 173 | 996 MU (4 out of 7 STAs - 4th, 5th 6th 7th logical user) | | | | | | | | |
| 174 | 996 MU (5 out of 7 STAs - 1st, 2nd, 3rd, 4th, 5th logical user) | | | | | | | | |
| 175 | 996 MU (5 out of 7 STAs - 3rd, 4th, 5th 6th 7th logical user) | | | | | | | | |
| 176 | 996 MU (6 out of 7 STAs - 1st, 2nd, 3rd, 4th, 5th 6th logical user) | | | | | | | | |
| 177 | 996 MU (6 out of 7 STAs - 2nd, 3rd, 4th, 5th 6th 7th logical user) | | | | | | | | |
| 178 | 996 MU (7 out of 7 STAs - 1st, 2nd, 3rd, 4th, 5th 6th 7th logical user) | | | | | | | | |
| 179 | 996 MU (1 out of 8 STAs - 1st or 8th logical user) | | | | | | | | |
| 180 | 996 MU (2 out of 8 STAs - 1st, 2nd or 7th, 8th logical user) | | | | | | | | |
| 181 | 996 MU (3 out of 8 STAs - 1st, 2nd, 3rd or 6th 7th 8th logical user) | | | | | | | | |
| 182 | 996 MU (4 out of 8 STAs - 1st, 2nd, 3rd, 4th or 5th 6th 7th 8 th logical user) | | | | | | | | |
| 183 | 996 MU (5 out of 8 STAs - 1st, 2nd, 3rd, 4th, 5th or 4th 5th 6th 7th 8th logical user) | | | | | | | | |
| 184 | 996 MU (6 out of 8 STAs - 1st, 2nd, 3rd, 4th, 5th 6th or 3rd 4th 5th 6th 7th 8th logical user) | | | | | | | | |
| 185 | 996 MU (7 out of 8 STAs - 1st, 2nd, 3rd, 4th, 5th 6th 7th or 2nd 3rd 4th 5th 6th 7th 8th logical user) | | | | | | | | |
| 186 | 996 MU (8 out of 8 STAs - 1st, 2nd, 3rd, 4th, 5th 6th 7th 8th logical user) | | | | | | | | |

FIG. 25D
Table 6 (part 4 of 4)

| index | #1 | #2 | #3 | #4 | #5 | #6 | #7 | #8 | #9 |
|---|---|---|---|---|---|---|---|---|---|
| 187 | 2*996 MU (1 out of 2 STAs - 1st logical user) | | | | | | | | |
| 188 | 2*996 MU (1 out of 2 STAs - 2nd logical user) | | | | | | | | |
| 189 | 2*996 MU (2 out of 2 STAs - 1st, 2nd logical user) | | | | | | | | |
| 190 | 2*996 MU (1 out of 3 STAs - 1st logical user) | | | | | | | | |
| 191 | 2*996 MU (1 out of 3 STAs - 3rd logical user) | | | | | | | | |
| 192 | 2*996 MU (2 out of 3 STAs - 1st, 2nd logical user) | | | | | | | | |
| 193 | 2*996 MU (2 out of 3 STAs - 2nd, 3rd logical user) | | | | | | | | |
| 194 | 2*996 MU (3 out of 3 STAs - 1st, 2nd, 3rd logical user) | | | | | | | | |
| 195 | 2*996 MU (1 out of 4 STAs - 1st logical user) | | | | | | | | |
| 196 | 2*996 MU (1 out of 4 STAs - 4th logical user) | | | | | | | | |
| 197 | 2*996 MU (2 out of 4 STAs - 1st, 2nd logical user) | | | | | | | | |
| 198 | 2*996 MU (2 out of 4 STAs - 3rd, 4th logical user) | | | | | | | | |
| 199 | 2*996 MU (3 out of 4 STAs - 1st, 2nd, 3rd logical user) | | | | | | | | |
| 200 | 2*996 MU (3 out of 4 STAs - 2nd, 3rd, 4th logical user) | | | | | | | | |
| 201 | 2*996 MU (4 out of 4 STAs - 1st, 2nd, 3rd, 4th logical user) | | | | | | | | |
| 202 | 2*996 MU (1 out of 5 STAs - 1st logical user) | | | | | | | | |
| 203 | 2*996 MU (1 out of 5 STAs - 5th logical user) | | | | | | | | |
| 204 | 2*996 MU (2 out of 5 STAs - 1st, 2nd logical user) | | | | | | | | |
| 205 | 2*996 MU (2 out of 5 STAs - 4th, 5th logical user) | | | | | | | | |
| 206 | 2*996 MU (3 out of 5 STAs - 1st, 2nd, 3rd logical user) | | | | | | | | |
| 207 | 2*996 MU (3 out of 5 STAs - 3rd, 4th, 5th logical user) | | | | | | | | |
| 208 | 2*996 MU (4 out of 5 STAs - 1st, 2nd, 3rd, 4th logical user) | | | | | | | | |
| 209 | 2*996 MU (4 out of 5 STAs - 2nd, 3rd, 4th, 5th logical user) | | | | | | | | |
| 210 | 2*996 MU (5 out of 5 STAs - 1st, 2nd, 3rd, 4th, 5th logical user) | | | | | | | | |
| 211 | 2*996 MU (1 out of 6 STAs - 1st logical user) | | | | | | | | |
| 212 | 2*996 MU (1 out of 6 STAs - 6th logical user) | | | | | | | | |
| 213 | 2*996 MU (2 out of 6 STAs - 1st, 2nd logical user) | | | | | | | | |
| 214 | 2*996 MU (2 out of 6 STAs - 5th, 6th logical user) | | | | | | | | |
| 215 | 2*996 MU (3 out of 6 STAs - 1st, 2nd, 3rd logical user) | | | | | | | | |
| 216 | 2*996 MU (3 out of 6 STAs - 4th, 5th, 6th logical user) | | | | | | | | |
| 217 | 2*996 MU (4 out of 6 STAs - 1st, 2nd, 3rd, 4th logical user) | | | | | | | | |
| 218 | 2*996 MU (4 out of 6 STAs - 3rd, 4th, 5th 6th logical user) | | | | | | | | |
| 219 | 2*996 MU (5 out of 6 STAs - 1st, 2nd, 3rd, 4th, 5th logical user) | | | | | | | | |
| 220 | 2*996 MU (5 out of 6 STAs - 2nd, 3rd, 4th, 5th 6th logical user) | | | | | | | | |
| 221 | 2*996 MU (6 out of 6 STAs - 1st, 2nd, 3rd, 4th, 5th 6th logical user) | | | | | | | | |
| 222 | 2*996 MU (1 out of 7 STAs - 1st logical user) | | | | | | | | |
| 223 | 2*996 MU (1 out of 7 STAs - 7th logical user) | | | | | | | | |
| 224 | 2*996 MU (2 out of 7 STAs - 1st, 2nd logical user) | | | | | | | | |
| 225 | 2*996 MU (2 out of 7 STAs - 6th, 7th logical user) | | | | | | | | |
| 226 | 2*996 MU (3 out of 7 STAs - 1st, 2nd, 3rd logical user) | | | | | | | | |
| 227 | 2*996 MU (3 out of 7 STAs - 5th, 6th 7th logical user) | | | | | | | | |
| 228 | 2*996 MU (4 out of 7 STAs - 1st, 2nd, 3rd, 4th logical user) | | | | | | | | |
| 229 | 2*996 MU (4 out of 7 STAs - 4th, 5th 6th 7th logical user) | | | | | | | | |
| 230 | 2*996 MU (5 out of 7 STAs - 1st, 2nd, 3rd, 4th, 5th logical user) | | | | | | | | |
| 231 | 2*996 MU (5 out of 7 STAs - 3rd, 4th, 5th 6th 7th logical user) | | | | | | | | |
| 232 | 2*996 MU (6 out of 7 STAs - 1st, 2nd, 3rd, 4th, 5th 6th logical user) | | | | | | | | |
| 233 | 2*996 MU (6 out of 7 STAs - 2nd, 3rd, 4th, 5th 6th 7th logical user) | | | | | | | | |
| 234 | 2*996 MU (7 out of 7 STAs - 1st, 2nd, 3rd, 4th, 5th 6th 7th logical user) | | | | | | | | |
| 235 | 2*996 MU (1 out of 8 STAs - 1st or 8th logical user) | | | | | | | | |
| 236 | 2*996 MU (2 out of 8 STAs - 1st, 2nd or 7th, 8th logical user) | | | | | | | | |
| 237 | 2*996 MU (3 out of 8 STAs - 1st, 2nd, 3rd or 6th 7th 8th logical user) | | | | | | | | |
| 238 | 2*996 MU (4 out of 8 STAs - 1st, 2nd, 3rd, 4th or 5th 6th 7th 8 th logical user) | | | | | | | | |
| 239 | 2*996 MU (5 out of 8 STAs - 1st, 2nd, 3rd, 4th, 5th or 4th 5th 6th 7th 8th logical user) | | | | | | | | |
| 240 | 2*996 MU (6 out of 8 STAs - 1st, 2nd, 3rd, 4th, 5th 6th or 3rd 4th 5th 6th 7th 8th logical user) | | | | | | | | |
| 241 | 2*996 MU (7 out of 8 STAs - 1st, 2nd, 3rd, 4th, 5th 6th 7th or 2nd 3rd 4th 5th 6th 7th 8th logical user) | | | | | | | | |
| 242 | 2*996 MU (8 out of 8 STAs - 1st, 2nd, 3rd, 4th, 5th 6th 7th 8th logical user) | | | | | | | | |

FIG. 26
Table 7

| | |
|---|---|
| 2 user MU | 484 MU (1 out of 2 STAs - 1st logical user if SIG-B1, 2nd logical user if SIG-B2) |
| | 484 MU (2 out of 2 STAs - 1st, 2nd logical user) |
| 3 user MU | 484 MU (1 out of 3 STAs - 1st logical user if SIG-B1, 3rd logical user if SIG-B2) |
| | 484 MU (2 out of 3 STAs - 1st, 2nd logical user if SIG-B1, 2nd 3rd logical user if SIG-B2) |
| | 484 MU (3 out of 3 STAs - 1st, 2nd, 3rd logical user) |
| 4 user MU | 484 MU (1 out of 4 STAs - 1st logical user if SIG-B1, 4th logical user if SIG-B2) |
| | 484 MU (2 out of 4 STAs - 1st, 2nd logical user if SIG-B1, 3rd 4th logical user if SIG-B2) |
| | 484 MU (3 out of 4 STAs - 1st, 2nd 3rd logical user if SIG-B1, 2nd 3rd 4th logical user if SIG-B2) |
| | 484 MU (4 out of 4 STAs - 1st, 2nd, 3rd, 4th logical user) |
| 5 user MU | 484 MU (1 out of 5 STAs - 1st logical user if SIG-B1, 5th logical user if SIG-B2) |
| | 484 MU (2 out of 5 STAs - 1st, 2nd logical user if SIG-B1, 4th 5th logical user if SIG-B2) |
| | 484 MU (3 out of 5 STAs - 1st, 2nd 3rd logical user if SIG-B1, 3rd 4th 5th logical user if SIG-B2) |
| | 484 MU (4 out of 5 STAs - 1st, 2nd 3rd 4th logical user if SIG-B1, 2nd 3rd 4th 5th logical user if SIG-B2) |
| | 484 MU (5 out of 5 STAs - 1st, 2nd, 3rd, 4th, 5th logical user) |
| 6 user MU | 484 MU (1 out of 6 STAs - 1st logical user if SIG-B1, 6th logical user if SIG-B2) |
| | 484 MU (2 out of 6 STAs - 1st, 2nd logical user if SIG-B1, 5th 6th logical user if SIG-B2) |
| | 484 MU (3 out of 6 STAs - 1st, 2nd 3rd logical user if SIG-B1, 4th 5th 6th logical user if SIG-B2) |
| | 484 MU (4 out of 6 STAs - 1st, 2nd 3rd 4th logical user if SIG-B1, 3rd 4th 5th 6th logical user if SIG-B2) |
| | 484 MU (5 out of 6 STAs - 1st, 2nd 3rd 4th 5th logical user if SIG-B1, 2nd 3rd 4th 5th 6th logical user if SIG-B2) |
| | 484 MU (6 out of 6 STAs - 1st, 2nd, 3rd, 4th, 5th 6th logical user) |
| 7 user MU | 484 MU (1 out of 7 STAs - 1st logical user if SIG-B1, 7th logical user if SIG-B2) |
| | 484 MU (2 out of 7 STAs - 1st, 2nd logical user if SIG-B1, 6th 7th logical user if SIG-B2) |
| | 484 MU (3 out of 7 STAs - 1st, 2nd 3rd logical user if SIG-B1, 5th 6th 7th logical user if SIG-B2) |
| | 484 MU (4 out of 7 STAs - 1st, 2nd 3rd 4th logical user if SIG-B1, 4th 5th 6th 7th logical user if SIG-B2) |
| | 484 MU (5 out of 7 STAs - 1st, 2nd 3rd 4th 5th logical user if SIG-B1, 3rd 4th 5th 6th 7th logical user if SIG-B2) |
| | 484 MU (6 out of 7 STAs - 1st, 2nd 3rd 4th 5th 6th logical user if SIG-B1, 2nd 3rd 4th 5th 6th 7th logical user if SIG-B2) |
| | 484 MU (7 out of 7 STAs - 1st, 2nd, 3rd, 4th, 5th 6th 7th logical user) |
| 8 User MU | 484 MU (1 out of 8 STAs - 1st logical user if SIG-B1, 8th logical user if SIG-B2) |
| | 484 MU (2 out of 8 STAs - 1st, 2nd logical user if SIG-B1, 7th 8th logical user if SIG-B2) |
| | 484 MU (3 out of 8 STAs - 1st, 2nd 3rd logical user if SIG-B1, 6th 7th 8th logical user if SIG-B2) |
| | 484 MU (4 out of 8 STAs - 1st, 2nd 3rd 4th logical user if SIG-B1, 5th 6th 7th 8th logical user if SIG-B2) |
| | 484 MU (5 out of 8 STAs - 1st, 2nd 3rd 4th 5th logical user if SIG-B1, 4th 5th 6th 7th 8th logical user if SIG-B2) |
| | 484 MU (6 out of 8 STAs - 1st, 2nd 3rd 4th 5th 6th logical user if SIG-B1, 3rd 4th 5th 6th 7th 8th logical user if SIG-B2) |
| | 484 MU (7 out of 8 STAs - 1st, 2nd 3rd 4th 5th 6th 7th logical user if SIG-B1, 2nd 3rd 4th 5th 6th 7th 8th logical user if SIG-B2) |
| | 484 MU (8 out of 8 STAs - 1st, 2nd, 3rd, 4th, 5th 6th 7th 8th logical user) |

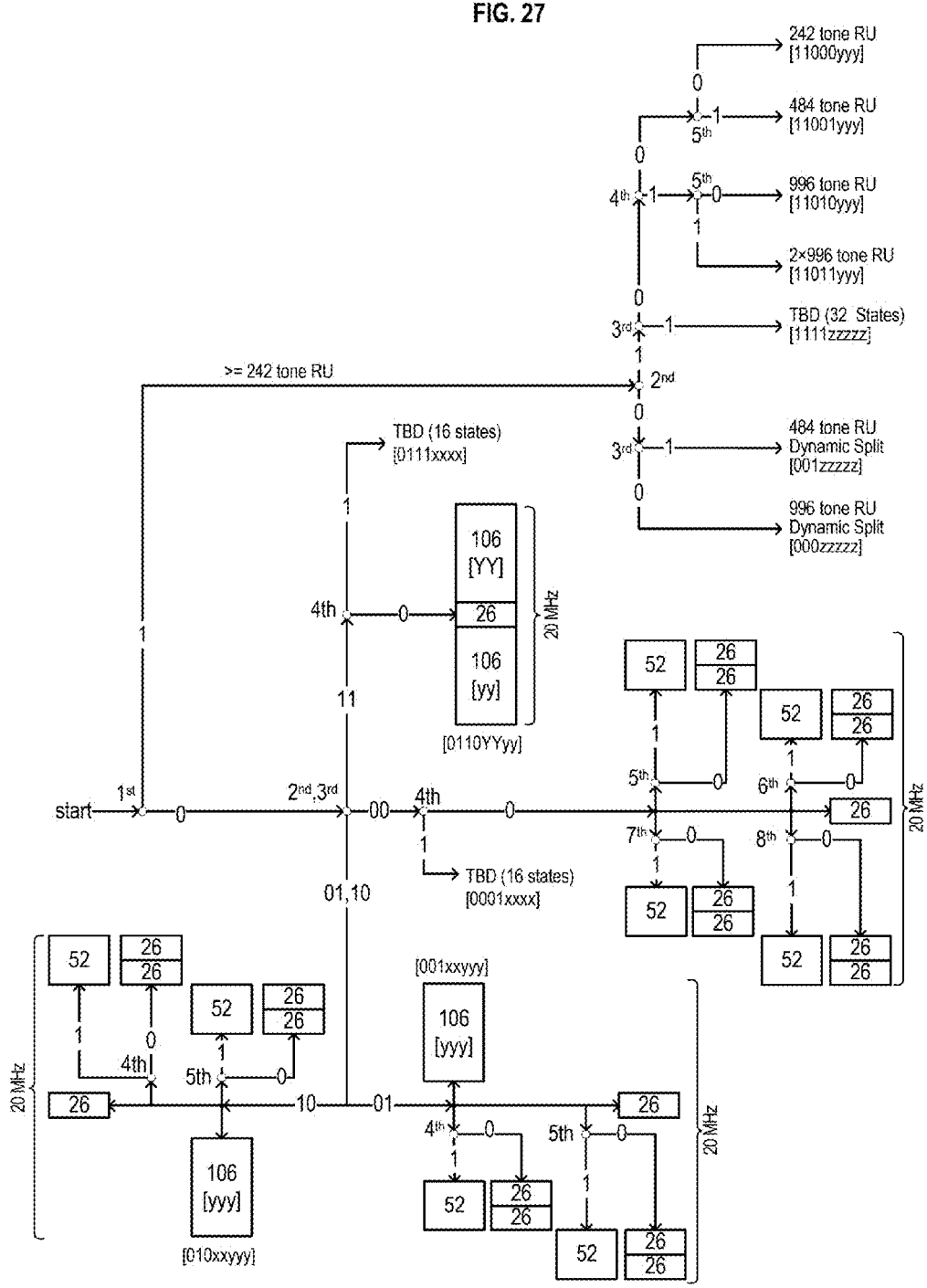

FIG. 29

Table 7

| 8 bits indices | #1 | #2 | #3 | #4 | #5 | #6 | #7 | #8 | #9 | Entries |
|---|---|---|---|---|---|---|---|---|---|---|
| 000 0 0000 | 26 | 26 | 26 | 26 | 26 | 26 | 26 | 26 | 26 | 1 |
| 000 0 0001 | 26 | 26 | 26 | 26 | 26 | 26 | 26 | 52 | | 1 |
| 000 0 0010 | 26 | 26 | 26 | 26 | 26 | 52 | | 26 | 26 | 1 |
| 000 0 0011 | 26 | 26 | 26 | 26 | 26 | 52 | | 52 | | 1 |
| 000 0 0100 | 26 | 26 | 52 | | 26 | 26 | 26 | 26 | 26 | 1 |
| 000 0 0101 | 26 | 26 | 52 | | 26 | 26 | 26 | 52 | | 1 |
| 000 0 0110 | 26 | 26 | 52 | | 26 | 52 | | 26 | 26 | 1 |
| 000 0 0111 | 26 | 26 | 52 | | 26 | 52 | | 52 | | 1 |
| 000 0 1000 | 52 | | 26 | 26 | 26 | 26 | 26 | 26 | 26 | 1 |
| 000 0 1001 | 52 | | 26 | 26 | 26 | 26 | 26 | 52 | | 1 |
| 000 0 1010 | 52 | | 26 | 26 | 26 | 52 | | 26 | 26 | 1 |
| 000 0 1011 | 52 | | 26 | 26 | 26 | 52 | | 52 | | 1 |
| 000 0 1100 | 52 | | 52 | | 26 | 26 | 26 | 26 | 26 | 1 |
| 000 0 1101 | 52 | | 52 | | 26 | 26 | 26 | 52 | | 1 |
| 000 0 1110 | 52 | | 52 | | 26 | 52 | | 26 | 26 | 1 |
| 000 0 1111 | 52 | | 52 | | 26 | 52 | | 52 | | 1 |
| 000 1 xxxx | reserved ||||||||| 16 |
| 00100 yyy | 26 | 26 | 26 | 26 | 26 | 106 (yyy indicates # of users. If 000 SU-MIMO, else MU-MIMO) |||| 8 |
| 00101 yyy | 26 | 26 | 52 | | 26 | 106 (yyy indicates # of users. If 000 SU-MIMO, else MU-MIMO) |||| 8 |
| 00110 yyy | 52 | | 26 | 26 | 26 | 106 (yyy indicates # of users. If 000 SU-MIMO, else MU-MIMO) |||| 8 |
| 00111 yyy | 52 | | 52 | | 26 | 106 (yyy indicates # of users. If 000 SU-MIMO, else MU-MIMO) |||| 8 |
| 01000 yyy | 106 (yyy indicates # of users. If 000 SU-MIMO, else MU-MIMO) |||| 26 | 26 | 26 | 26 | 26 | 8 |
| 01001 yyy | 106 (yyy indicates # of users. If 000 SU-MIMO, else MU-MIMO) |||| 26 | 26 | 26 | 52 | | 8 |
| 01010 yyy | 106 (yyy indicates # of users. If 000 SU-MIMO, else MU-MIMO) |||| 26 | 52 | | 26 | 26 | 8 |
| 01011 yyy | 106 (yyy indicates # of users. If 000 SU-MIMO, else MU-MIMO) |||| 26 | 52 | | 52 | | 8 |
| 011 xxxxx | reserved ||||||||| 32 |
| 10 yyy zzz | 106 (yyy indicates # of users. If 000 SU-MIMO, else MU-MIMO) |||| 26 | 106 (zzz indicates # of users. If 000 SU-MIMO, else MU-MIMO) |||| 64 |
| 11 0 00yyy | 242 (yyy indicates number of users. If 000 SU-MIMO, else MU-MIMO) ||||||||| 8 |
| 11 0 01yyy | 484 (yyy indicates number of users. If 000 SU-MIMO, else MU-MIMO) ||||||||| 8 |
| 11 0 10yyy | 996 (yyy indicates number of users. If 000 SU-MIMO, else MU-MIMO) ||||||||| 8 |
| 11 0 11yyy | 2*996 (yyy indicates number of users. If 000 SU-MIMO, else MU-MIMO) ||||||||| 8 |
| 11 1 xxxxx | reserved ||||||||| 32 |

FIG. 30

Table 8

484/996 tone RU MU-MIMO with and without load balancing

| # Users | Potential Distribution among HE-SIG-B: (HE-SIG-B1 or HE-SIG-B2) | | | | | | | |
|---|---|---|---|---|---|---|---|---|
| 2 | (2,0) | (1,1) | (0,2) | | | | | |
| 3 | (3,0) | (2,1) | (1,2) | (0,3) | | | | |
| 4 | (4,0) | (3,1) | (2,2) | (1,3) | (0,4) | | | |
| 5 | (5,0) | (4,1) | (3,2) | (2,3) | (1,4) | (5,0) | | |
| 6 | (6,0) | (5,1) | (4,2) | (3,3) | (2,4) | (1,5) | (0,6) | |
| 7 | (7,0) | (6,1) | (5,2) | (4,3) | (3,4) | (2,5) | (1,6) | (7,0) |
| 8 | (8,0) | (7,1) | (6,2) | (5,3) | (4,4) | (3,5) | (2,6) | (1,7) | (0,8) |

FIG. 31

Table 9

| 484/996 tone RU MU-MIMO with load balancing | | | | | | | |
|---|---|---|---|---|---|---|---|
| # Users | Potential Distribution among HE-SIG-B: (HE-SIG-B1 or HE-SIG-B2) | | | | | | |
| 2 | (1,1) | | | | | | |
| 3 | (2,1) | (1,2) | | | | | |
| 4 | (3,1) | (2,2) | (1,3) | | | | |
| 5 | (4,1) | (3,2) | (2,3) | (1,4) | | | |
| 6 | (5,1) | (4,2) | (3,3) | (2,4) | (1,5) | | |
| 7 | (6,1) | (5,2) | (4,3) | (3,4) | (2,5) | (1,6) | |
| 8 | (7,1) | (6,2) | (5,3) | (4,4) | (3,5) | (2,6) | (1,7) |

FIG. 32
Table 10

484/996 tone RU MU-MIMO with & without load balancing, Embodiment A

| # Users | Potential Distribution among HE-SIG-B: (HE-SIG-B1, HE-SIG-B2) | | | | | | | |
|---|---|---|---|---|---|---|---|---|
| 2 | (2,0) | (1,1) | (0,2) | | | | | |
| 3 | (3,0) | (2,1) | (1,2) | (0,3) | | | | |
| 4 | (4,0) | (3,1) | (2,2) | (1,3) | (0,4) | | | |
| 5 | (5,0) | (4,1) | (3,2) | (2,3) | (1,4) | (5,0) | | |
| 6 | (6,0) | (5,1) | (4,2) | (3,3) | (2,4) | (1,5) | (0,6) | |
| 7 | (7,0) | (6,1) | (5,2) | (4,3) | (3,4) | (2,5) | (1,6) | (7,0) |
| 8 | (8,0) | (7,1) | (6,2) | (5,3) | (4,4) | (3,5) | (2,6) | (1,7) | (0,8) |

FIG. 33A
Table 11, pt. 1

| Embodiment A (p. 1 of 2) | | | | | | | | | | |
|---|---|---|---|---|---|---|---|---|---|---|
| 8 bits indices | #1 | #2 | #3 | #4 | #5 | #6 | #7 | #8 | #9 | # Entries |
| 000 0 0000 | 26 | 26 | 26 | 26 | 26 | 26 | 26 | 26 | 26 | 1 |
| 000 0 0001 | 26 | 26 | 26 | 26 | 26 | 26 | 26 | 52 | | 1 |
| 000 0 0010 | 26 | 26 | 26 | 26 | 26 | 52 | 26 | 26 | | 1 |
| 000 0 0011 | 26 | 26 | 26 | 26 | 26 | 52 | 52 | | | 1 |
| 000 0 0100 | 26 | 26 | 52 | 26 | 26 | 26 | 26 | 26 | | 1 |
| 000 0 0101 | 26 | 26 | 52 | 26 | 26 | 26 | 52 | | | 1 |
| 000 0 0110 | 26 | 26 | 52 | 26 | 52 | 26 | 26 | | | 1 |
| 000 0 0111 | 26 | 26 | 52 | 26 | 52 | 52 | | | | 1 |
| 000 0 1000 | 52 | 26 | 26 | 26 | 26 | 26 | 26 | 26 | | 1 |
| 000 0 1001 | 52 | 26 | 26 | 26 | 26 | 26 | 52 | | | 1 |
| 000 0 1010 | 52 | 26 | 26 | 26 | 52 | 26 | 26 | | | 1 |
| 000 0 1011 | 52 | 26 | 26 | 26 | 52 | 52 | | | | 1 |
| 000 0 1100 | 52 | 52 | 26 | 26 | 26 | 26 | 26 | | | 1 |
| 000 0 1101 | 52 | 52 | 26 | 26 | 26 | 52 | | | | 1 |
| 000 0 1110 | 52 | 52 | 26 | 52 | 26 | 26 | | | | 1 |
| 000 0 1111 | 52 | 52 | 26 | 52 | 52 | | | | | 1 |
| 000 1 0yyy | 52 | 52 | - | 106 (yyy) | | | | | | 8 |
| 0001 1yyy | 106 (yyy) | | - | 52 | 52 | | | | | 8 |
| 00100 yyy | 26 | 26 | 26 | 26 | 106 (yyy) | | | | | 8 |
| 00101 yyy | 26 | 26 | 52 | 26 | 106 (yyy) | | | | | 8 |
| 00110 yyy | 52 | 26 | 26 | 26 | 106 (yyy) | | | | | 8 |
| 00111 yyy | 52 | 52 | 26 | 106 (yyy) | | | | | | 8 |
| 01000 yyy | 106 (yyy) | | 26 | 26 | 26 | 26 | 26 | | | 8 |
| 01001 yyy | 106 (yyy) | | 26 | 26 | 26 | 52 | | | | 8 |
| 01010 yyy | 106 (yyy) | | 26 | 52 | 26 | 26 | | | | 8 |
| 01011 yyy | 106 (yyy) | | 26 | 52 | 52 | | | | | 8 |
| 0110 YYyy | 106 (YY) | | - | 106 (yy) | | | | | | 16 |

FIG. 33B
Table 11, pt. 2

| | | | | | | |
|---|---|---|---|---|---|---|
| Embodiment A (p. 2 of 2) ||||||||
| 0111 0000 | 52 | 52 | - | 52 | 52 | 1 |
| 0111 0001 | 242-tone RU empty ||||| 1 |
| 0111 0010 | 484-tone RU empty ||||| 1 |
| 0111 0011 | 996-tone RU empty ||||| 1 |
| 0111 01xx | Definition TBD ||||| 4 |
| 0111 1000 | 484-tone MU RU, load balancing, 1 of 2 total users ||||| 1 |
| 0111 1001 | 484-tone MU RU, load balancing, 1 of 3 total users ||||| 1 |
| 0111 1010 | 484-tone MU RU, load balancing, 2 of 3 total users ||||| 1 |
| 0111 1011 | 484-tone MU RU, load balancing, 1 of 4 total users ||||| 1 |
| 0111 1100 | 996-tone MU RU, load balancing, 1 of 2 total users ||||| 1 |
| 0111 1101 | 996-tone MU RU, load balancing, 1 of 3 total users ||||| 1 |
| 0111 1110 | 996-tone MU RU, load balancing, 2 of 3 total users ||||| 1 |
| 0111 1111 | 996-tone MU RU, load balancing, 1 of 4 total users ||||| 1 |
| 10 YYY yyy | 106 (YYY) || 26 | 106 (yyy) || 64 |
| 11 0 00yyy | 242 (yyy) ||||| 8 |
| 11 0 01yyy | 484 (yyy) ||||| 8 |
| 11 0 10yyy | 996 (yyy) ||||| 8 |
| 11 0 11yyy | 2*996 (yyy) ||||| 8 |
| 11 1 0 0000 | 484-tone MU RU, load balancing, 2 of 4 total users ||||| 1 |
| 11 1 0 0001 | 484-tone MU RU, load balancing, 3 of 4 total users ||||| 1 |
| 11 1 0 0010 | 484-tone MU RU, load balancing, 1 of 5 total users ||||| 1 |
| 11 1 0 0011 | 484-tone MU RU, load balancing, 2 of 5 total users ||||| 1 |
| 11 1 0 0100 | 484-tone MU RU, load balancing, 3 of 5 total users ||||| 1 |
| 11 1 0 0101 | 484-tone MU RU, load balancing, 4 of 5 total users ||||| 1 |
| 11 1 0 0110 | 484-tone MU RU, load balancing, 2 of 6 total users ||||| 1 |
| 11 1 0 0111 | 484-tone MU RU, load balancing, 3 of 6 total users ||||| 1 |
| 11 1 0 1000 | 484-tone MU RU, load balancing, 4 of 6 total users ||||| 1 |
| 11 1 0 1001 | 484-tone MU RU, load balancing, 2 of 7 total users ||||| 1 |
| 11 1 0 1010 | 484-tone MU RU, load balancing, 3 of 7 total users ||||| 1 |
| 11 1 0 1011 | 484-tone MU RU, load balancing, 4 of 7 total users ||||| 1 |
| 11 1 0 1100 | 484-tone MU RU, load balancing, 5 of 7 total users ||||| 1 |
| 11 1 0 1101 | 484-tone MU RU, load balancing, 2 of 8 total users ||||| 1 |
| 11 1 0 1110 | 484-tone MU RU, load balancing, 4 of 8 total users ||||| 1 |
| 11 1 0 1111 | 484-tone MU RU, load balancing, 6 of 8 total users ||||| 1 |
| 11 1 1 0000 | 996-tone MU RU, load balancing, 2 of 4 total users ||||| 1 |
| 11 1 1 0001 | 996-tone MU RU, load balancing, 3 of 4 total users ||||| 1 |
| 11 1 1 0010 | 996-tone MU RU, load balancing, 1 of 5 total users ||||| 1 |
| 11 1 1 0011 | 996-tone MU RU, load balancing, 2 of 5 total users ||||| 1 |
| 11 1 1 0100 | 996-tone MU RU, load balancing, 3 of 5 total users ||||| 1 |
| 11 1 1 0101 | 996-tone MU RU, load balancing, 4 of 5 total users ||||| 1 |
| 11 1 1 0110 | 996-tone MU RU, load balancing, 2 of 6 total users ||||| 1 |
| 11 1 1 0111 | 996-tone MU RU, load balancing, 3 of 6 total users ||||| 1 |
| 11 1 1 1000 | 996-tone MU RU, load balancing, 4 of 6 total users ||||| 1 |
| 11 1 1 1001 | 996-tone MU RU, load balancing, 2 of 7 total users ||||| 1 |
| 11 1 1 1010 | 996-tone MU RU, load balancing, 3 of 7 total users ||||| 1 |
| 11 1 1 1011 | 996-tone MU RU, load balancing, 4 of 7 total users ||||| 1 |
| 11 1 1 1100 | 996-tone MU RU, load balancing, 5 of 7 total users ||||| 1 |
| 11 1 1 1101 | 996-tone MU RU, load balancing, 2 of 8 total users ||||| 1 |
| 11 1 1 1110 | 996-tone MU RU, load balancing, 4 of 8 total users ||||| 1 |
| 11 1 1 1111 | 996-tone MU RU, load balancing, 6 of 8 total users ||||| 1 |

FIG. 34

Table 12

484/996 tone RU MU-MIMO with & without load balancing, reduced Embodiment B

| # Users | Potential Distribution among HE-SIG-B: (HE-SIG-B1, HE-SIG-B2) | | | | | | |
|---|---|---|---|---|---|---|---|
| 2 | (2,0) | (1,1) | (0,2) | | | | |
| 3 | (3,0) | (2,1) | (1,2) | (0,3) | | | |
| 4 | (4,0) | ~~(3,1)~~ | (2,2) | ~~(1,3)~~ | (0,4) | | |
| 5 | (5,0) | (4,1) | (3,2) | (2,3) | (1,4) | (5,0) | |
| 6 | (6,0) | ~~(5,1)~~ | (4,2) | (3,3) | (2,4) | ~~(1,5)~~ | (0,6) |
| 7 | (7,0) | ~~(6,1)~~ | (5,2) | (4,3) | (3,4) | (2,5) | ~~(1,6)~~ | (7,0) |
| 8 | (8,0) | ~~(7,1)~~ | (6,2) | ~~(5,3)~~ | (4,4) | ~~(3,5)~~ | (2,6) | ~~(1,7)~~ | (0,8) |

FIG. 35

Table 13

484/996 tone RU MU-MIMO with & without load balancing, reduced Embodiment C

| # Users | Potential Distribution among HE-SIG-B: (HE-SIG-B1, HE-SIG-B2) | | | | | | |
|---|---|---|---|---|---|---|---|
| 2 | (2,0) | (1,1) | (0,2) | | | | |
| 3 | (3,0) | (2,1) | (1,2) | (0,3) | | | |
| 4 | (4,0) | (3,1) | (2,2) | (1,3) | (0,4) | | |
| 5 | (5,0) | ~~(4,1)~~ | (3,2) | (2,3) | ~~(1,4)~~ | (5,0) | |
| 6 | (6,0) | ~~(5,1)~~ | (4,2) | (3,3) | (2,4) | ~~(1,5)~~ | (0,6) |
| 7 | (7,0) | ~~(6,1)~~ | (5,2) | (4,3) | (3,4) | (2,5) | ~~(1,6)~~ | (7,0) |
| 8 | (8,0) | ~~(7,1)~~ | (6,2) | ~~(5,3)~~ | (4,4) | ~~(3,5)~~ | (2,6) | ~~(1,7)~~ | (0,8) |

FIG. 36

Table 14

484/996 tone RU MU-MIMO with & without load balancing, reduced Embodiment D

| # Users | Potential Distribution among HE-SIG-B: (HE-SIG-B1, HE-SIG-B2) | | | | | | |
|---|---|---|---|---|---|---|---|
| 2 | (2,0) | (1,1) | (0,2) | | | | |
| 3 | (3,0) | (2,1) | (1,2) | (0,3) | | | |
| 4 | (4,0) | (3,1) | (2,2) | (1,3) | (0,4) | | |
| 5 | (5,0) | ~~(4,1)~~ | (3,2) | (2,3) | ~~(1,4)~~ | (5,0) | |
| 6 | (6,0) | ~~(5,1)~~ | (4,2) | (3,3) | (2,4) | ~~(1,5)~~ | (0,6) |
| 7 | (7,0) | ~~(6,1)~~ | (5,2) | ~~(4,3)~~ | ~~(3,4)~~ | (2,5) | ~~(1,6)~~ | (7,0) |
| 8 | (8,0) | ~~(7,1)~~ | (6,2) | ~~(5,3)~~ | (4,4) | ~~(3,5)~~ | (2,6) | ~~(1,7)~~ | (0,8) |

FIG. 37A

Table 15, pt. 1

| Embodiment D (p. 1 of 2) | | | | | | | | | | |
|---|---|---|---|---|---|---|---|---|---|---|
| 8 bits indices | #1 | #2 | #3 | #4 | #5 | #6 | #7 | #8 | #9 | # Entries |
| 000 0 0000 | 26 | 26 | 26 | 26 | 26 | 26 | 26 | 26 | 26 | 1 |
| 000 0 0001 | 26 | 26 | 26 | 26 | 26 | 26 | 26 | 52 | | 1 |
| 000 0 0010 | 26 | 26 | 26 | 26 | 26 | 52 | | 26 | 26 | 1 |
| 000 0 0011 | 26 | 26 | 26 | 26 | 26 | 52 | | 52 | | 1 |
| 000 0 0100 | 26 | 26 | 52 | | 26 | 26 | 26 | 26 | 26 | 1 |
| 000 0 0101 | 26 | 26 | 52 | | 26 | 26 | 26 | 52 | | 1 |
| 000 0 0110 | 26 | 26 | 52 | | 26 | 52 | | 26 | 26 | 1 |
| 000 0 0111 | 26 | 26 | 52 | | 26 | 52 | | 52 | | 1 |
| 000 0 1000 | 52 | | 26 | 26 | 26 | 26 | 26 | 26 | 26 | 1 |
| 000 0 1001 | 52 | | 26 | 26 | 26 | 26 | 26 | 52 | | 1 |
| 000 0 1010 | 52 | | 26 | 26 | 26 | 52 | | 26 | 26 | 1 |
| 000 0 1011 | 52 | | 26 | 26 | 26 | 52 | | 52 | | 1 |
| 000 0 1100 | 52 | | 52 | | 26 | 26 | 26 | 26 | 26 | 1 |
| 000 0 1101 | 52 | | 52 | | 26 | 26 | 26 | 52 | | 1 |
| 000 0 1110 | 52 | | 52 | | 26 | 52 | | 26 | 26 | 1 |
| 000 0 1111 | 52 | | 52 | | 26 | 52 | | 52 | | 1 |
| 000 1 0yyy | 52 | | 52 | | - | 106 (yyy) | | | | 8 |
| 0001 1yyy | 106 (yyy) | | | | - | 52 | | 52 | | 8 |
| 00100 yyy | 26 | 26 | 26 | 26 | 26 | 106 (yyy) | | | | 8 |
| 00101 yyy | 26 | 26 | 52 | | 26 | 106 (yyy) | | | | 8 |
| 00110 yyy | 52 | | 26 | 26 | 26 | 106 (yyy) | | | | 8 |
| 00111 yyy | 52 | | 52 | | 26 | 106 (yyy) | | | | 8 |
| 01000 yyy | 106 (yyy) | | | | 26 | 26 | 26 | 26 | 26 | 8 |
| 01001 yyy | 106 (yyy) | | | | 26 | 26 | 26 | 52 | | 8 |
| 01010 yyy | 106 (yyy) | | | | 26 | 52 | | 26 | 26 | 8 |
| 01011 yyy | 106 (yyy) | | | | 26 | 52 | | 52 | | 8 |
| 0110 YYyy | 106 (YY) | | | | - | 106 (yy) | | | | 16 |
| 0111 0000 | 52 | | 52 | | - | 52 | | 52 | | 1 |
| 0111 0001 | 242-tone RU empty | | | | | | | | | 1 |
| 0111 0010 | 484-tone RU empty | | | | | | | | | 1 |
| 0111 0011 | 996-tone RU empty | | | | | | | | | 1 |
| 0111 01xx | Definition TBD | | | | | | | | | 4 |
| 0111 1xxx | Definition TBD | | | | | | | | | 8 |
| 10 YYY yyy | 106 (YYY) | | | | 26 | 106 (yyy) | | | | 64 |
| 11 0 00yyy | 242 (yyy) | | | | | | | | | 8 |
| 11 0 01yyy | 484 (yyy) | | | | | | | | | 8 |
| 11 0 10yyy | 996 (yyy) | | | | | | | | | 8 |
| 11 0 11yyy | 2*996 (yyy) | | | | | | | | | 8 |

FIG. 37B
Table 15, pt. 2

| 8 bits indices | Embodiment D (p. 2 of 2) | # Entries |
|---|---|---|
| | #1 #2 #3 #4 #5 #6 #7 #8 #9 | |
| 11 1 0 0000 | 484-tone MU RU, load balancing, 1 of 2 total users | 1 |
| 11 1 0 0001 | 484-tone MU RU, load balancing, 1 of 3 total users | 1 |
| 11 1 0 0010 | 484-tone MU RU, load balancing, 2 of 3 total users | 1 |
| 11 1 0 0011 | 484-tone MU RU, load balancing, 1 of 4 total users | 1 |
| 11 1 0 0100 | 484-tone MU RU, load balancing, 2 of 4 total users | 1 |
| 11 1 0 0101 | 484-tone MU RU, load balancing, 3 of 4 total users | 1 |
| 11 1 0 0110 | 484-tone MU RU, load balancing, 2 of 5 total users | 1 |
| 11 1 0 0111 | 484-tone MU RU, load balancing, 3 of 5 total users | 1 |
| 11 1 0 1000 | 484-tone MU RU, load balancing, 2 of 6 total users | 1 |
| 11 1 0 1001 | 484-tone MU RU, load balancing, 3 of 6 total users | 1 |
| 11 1 0 1010 | 484-tone MU RU, load balancing, 4 of 6 total users | 1 |
| 11 1 0 1011 | 484-tone MU RU, load balancing, 2 of 7 total users | 1 |
| 11 1 0 1100 | 484-tone MU RU, load balancing, 5 of 7 total users | 1 |
| 11 1 0 1101 | 484-tone MU RU, load balancing, 2 of 8 total users | 1 |
| 11 1 0 1110 | 484-tone MU RU, load balancing, 4 of 8 total users | 1 |
| 11 1 0 1111 | 484-tone MU RU, load balancing, 6 of 8 total users | 1 |
| 11 1 1 0000 | 996-tone MU RU, load balancing, 1 of 2 total users | 1 |
| 11 1 1 0001 | 996-tone MU RU, load balancing, 1 of 3 total users | 1 |
| 11 1 1 0010 | 996-tone MU RU, load balancing, 2 of 3 total users | 1 |
| 11 1 1 0011 | 996-tone MU RU, load balancing, 1 of 4 total users | 1 |
| 11 1 1 0100 | 996-tone MU RU, load balancing, 2 of 4 total users | 1 |
| 11 1 1 0101 | 996-tone MU RU, load balancing, 3 of 4 total users | 1 |
| 11 1 1 0110 | 996-tone MU RU, load balancing, 2 of 5 total users | 1 |
| 11 1 1 0111 | 996-tone MU RU, load balancing, 3 of 5 total users | 1 |
| 11 1 1 1000 | 996-tone MU RU, load balancing, 2 of 6 total users | 1 |
| 11 1 1 1001 | 996-tone MU RU, load balancing, 3 of 6 total users | 1 |
| 11 1 1 1010 | 996-tone MU RU, load balancing, 4 of 6 total users | 1 |
| 11 1 1 1011 | 996-tone MU RU, load balancing, 2 of 7 total users | 1 |
| 11 1 1 1100 | 996-tone MU RU, load balancing, 5 of 7 total users | 1 |
| 11 1 1 1101 | 996-tone MU RU, load balancing, 2 of 8 total users | 1 |
| 11 1 1 1110 | 996-tone MU RU, load balancing, 4 of 8 total users | 1 |
| 11 1 1 1111 | 996-tone MU RU, load balancing, 6 of 8 total users | 1 |

FIG. 38
Table 16

| 8 bits indices | #1 #2 #3 #4 #5 #6 #7 #8 #9 | # Entries |
|---|---|---|
| 11 1 0 zzzz | 484 RU with MU-MIMO, divided per-STA info subfields between HE-SIG-B1 and HE-SIG-B2. zzzz refers to the MU-MIMO user split mode. | 16 |
| 11 1 1 zzzz | 996 RU with MU-MIMO, divided per-STA info subfields between HE-SIG-B1 and HE-SIG-B2. zzzz refers to the MU-MIMO user split mode. | 16 |

FIG. 40
Table 17
| 8 bits indices | #1 | #2 | #3 | #4 | #5 | #6 | #7 | #8 | #9 | # Entries |
|---|---|---|---|---|---|---|---|---|---|---|
| 1 1 1 0 zzzz | 996 RU with MU-MIMO, divided per-STA info subfields between HE-SIG-B1 and HE-SIG-B2. zzzz refers to the MU-MIMO user split mode. | | | | | | | | | 16 |
| 1 1 1 1 zzzz | 484 RU with MU-MIMO, divided per-STA info subfields between HE-SIG-B1 and HE-SIG-B2. zzzz refers to the MU-MIMO user split mode. | | | | | | | | | 16 |
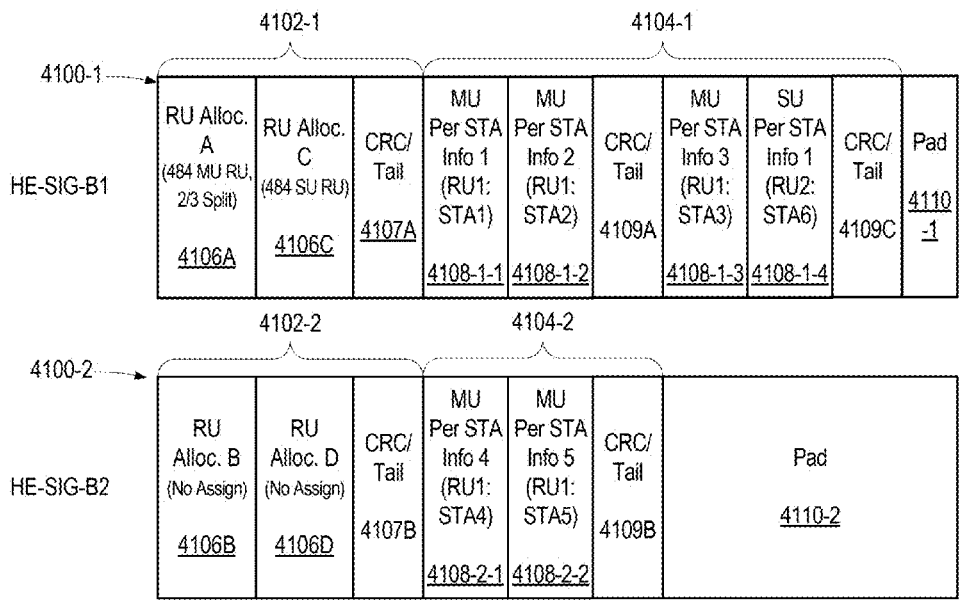
FIG. 41A
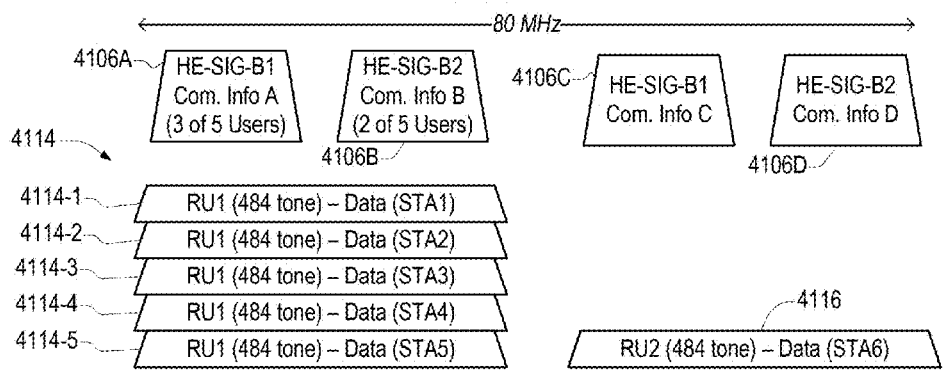
FIG. 41B

FIG. 44
Table 18

| 8 bits indices | #1 | #2 | #3 | #4 | #5 | #6 | #7 | #8 | #9 | # Entries |
|---|---|---|---|---|---|---|---|---|---|---|
| 11 0 11 000 | No STA assigned by this RU allocation subfield (No Assignment) | | | | | | | | | 1 |
| 11 0 11 yyy | 2*996 MU-MIMO (yyy indicates number of users. 001 ~ 111 indicates 2 users to 8) | | | | | | | | | 7 |

FIG. 45
Table 19

| 8 bits indices | #1 | #2 | #3 | #4 | #5 | #6 | #7 | #8 | #9 | # Entries |
|---|---|---|---|---|---|---|---|---|---|---|
| 000 1 0 yyy | 'yyy' indicates a number of per-STA info field (From 0 ~ 7 users) in the same SIG-B (either B1 or B2). Used for MU-MIMO user split case for 484 and 996 RU. Another RU allocation subfield will indicate the exact MU-MIMO split (for example, between 1/7, 2/6, 3/5, 4/4, 1/6, 2/5, 3/4, 1/5, 2/4, 3/3, 1/4, 2/3, 1/3, 2/2, 1/2, 1/1 user split between SIG-B1/B2 or SIG-B2/B1). | | | | | | | | | 8 |
| 000 1 1 xxx | reserved | | | | | | | | | 8 |

FIG. 46
Table 20

| 8 bits indices | #1 | #2 | #3 | #4 | #5 | #6 | #7 | #8 | #9 | # Entries |
|---|---|---|---|---|---|---|---|---|---|---|
| 01 1 xx yyy | 'yyy' indicates a number of per-STA info field (From 0 ~ 7 users) in the same SIG-B (either B1 or B2). Used for MU-MIMO user split case for 484 and 996 RU. Other RU allocation subfield will indicate the exact MU-MIMO split (for example, between 1/7, 2/6, 3/5, 4/4, 1/6, 2/5, 3/4, 1/5, 2/4, 3/3, 1/4, 2/3, 1/3, 2/2, 1/2, 1/1 user split between SIG-B1/B2 or SIG-B2/B1). | | | | | | | | | 4 x 8 |

FIG. 47
Table 21

| 8 bits indices | #1 | #2 | #3 | #4 | #5 | #6 | #7 | #8 | #9 | # Entries |
|---|---|---|---|---|---|---|---|---|---|---|
| 000 1 0 yyy | 'yyy' indicates a number of per-STA info field (From 0 ~ 7 users) in the same SIG-B (either B1 or B2). Used for MU-MIMO user split case for 484 RU. Other RU allocation subfield will indicate the exact MU-MIMO split (for example, between 1/7, 2/6, 3/5, 4/4, 1/6, 2/5, 3/4, 1/5, 2/4, 3/3, 1/4, 2/3, 1/3, 2/2, 1/2, 1/1 user split between SIG-B1/B2 or SIG-B2/B1). | | | | | | | | | 8 |
| 000 1 1 yyy | 'yyy' indicates a number of per-STA info field (From 0 ~ 7 users) in the same SIG-B (either B1 or B2). Used for MU-MIMO user split case for 996 RU. Other RU allocation subfield will indicate the exact MU-MIMO split (for example, between 1/7, 2/6, 3/5, 4/4, 1/6, 2/5, 3/4, 1/5, 2/4, 3/3, 1/4, 2/3, 1/3, 2/2, 1/2, 1/1 user split between SIG-B1/B2 or SIG-B2/B1). | | | | | | | | | 8 |

FIG. 51
Table 22

| Index | MU-MIMO Users | Description of user split mode |
|---|---|---|
| 0 | 2 user MU | MU (1/1 STA split)<br>- if indicated in SIG-B1/B2: 1st user in SIG-B1, 2nd user in SIG-B2 |
| 1 | 3 user MU | MU (1/2 STA split)<br>- if indicated in SIG-B1: 1st user in SIG-B1, 2nd 3rd user in SIG-B2<br>- if indicated in SIG-B2: 1st, 2nd user in SIG-B1, 3rd user in SIG-B2 |
| 2 | 4 user MU | MU (1/3 STA split)<br>- if indicated in SIG-B1: 1st user in SIG-B1, 2nd, 3rd, 4th user in SIG-B2<br>- if indicated in SIG-B2: 1st, 2nd, 3rd user in SIG-B1, 4th user in SIG-B2 |
| 3 | | MU (2/2 STA split)<br>- if indicated in SIG-B1/B2: 1st 2nd user in SIG-B1, 3rd, 4th user in SIG-B2 |
| 4 | 5 user MU | MU (1/4 STA split)<br>- if indicated in SIG-B1: 1st user in SIG-B1, 2nd, 3rd, 4th, 5th, user in SIG-B2<br>- if indicated in SIG-B2: 1st, 2nd, 3rd, 4th, user in SIG-B1, 5th user in SIG-B2 |
| 5 | | MU (2/3 STA split)<br>- if indicated in SIG-B1: 1st, 2nd user in SIG-B1, 3rd, 4th, 5th user in SIG-B2<br>- if indicated in SIG-B2: 1st, 2nd, 3rd user in SIG-B1, 4th, 5th user in SIG-B2 |
| 6 | 6 user MU | MU (1/5 STA split)<br>- if indicated in SIG-B1: 1st user in SIG-B1, 2nd, 3rd, 4th 5th 6th user in SIG-B2<br>- if indicated in SIG-B2: 1st, 2nd 3rd 4th 5th user in SIG-B1, 6th user in SIG-B2 |
| 7 | | MU (2/4 STA split)<br>- if indicated in SIG-B1: 1st, 2nd user in SIG-B1, 3rd, 4th, 5th, 6th user in SIG-B2<br>- if indicated in SIG-B2: 1st, 2nd, 3rd, 4th user in SIG-B1, 5th, 6th user in SIG-B2 |
| 8 | | MU (3/3 STA split)<br>- if indicated in SIG-B1/B2: 1st, 2nd, 3rd user in SIG-B1, 4th, 5th, 6th user in SIG-B2 |
| 9 | 7 user MU | MU (1/6 STA split)<br>- if indicated in SIG-B1: 1st user in SIG-B1, 2nd, 3rd, 4th, 5th, 6th, 7th user in SIG-B2<br>- if indicated in SIG-B2: 1st, 2nd, 3rd, 4th, 5th, 6th user in SIG-B1, 7th user in SIG-B2 |
| 10 | | MU (2/5 STA split)<br>- if indicated in SIG-B1: 1st, 2nd user in SIG-B1, 3rd, 4th, 5th, 6th, 7th user in SIG-B2<br>- if indicated in SIG-B2: 1st, 2nd, 3rd, 4th, 5th user in SIG-B1, 6th, 7th user in SIG-B2 |
| 11 | | MU (3/4 STA split)<br>- if indicated in SIG-B1: 1st, 2nd, 3rd user in SIG-B1, 4th, 5th, 6th, 7th user in SIG-B2<br>- if indicated in SIG-B2: 1st, 2nd, 3rd, 4th user in SIG-B1, 5th, 6th, 7th user in SIG-B2 |
| 12 | 8 User MU | MU (1/7 STA split)<br>- if indicated in SIG-B1: 1st user in SIG-B1, 2nd, 3rd, 4th, 5th, 6th, 7th, 8th user in SIG-B2<br>- if indicated in SIG-B2: 1st, 2nd, 3rd, 4th, 5th, 6th, 7th user in SIG-B1, 8th user in SIG-B2 |
| 13 | | MU (2/6 STA split)<br>- if indicated in SIG-B1: 1st, 2nd user in SIG-B1, 3rd, 4th, 5th, 6th, 7th, 8th user in SIG-B2<br>- if indicated in SIG-B2: 1st, 2nd, 3rd, 4th, 5th, 6th user in SIG-B1, 7th, 8th user in SIG-B2 |
| 14 | | MU (3/5 STA split)<br>- if indicated in SIG-B1: 1st, 2nd, 3rd user in SIG-B1, 4th, 5th, 6th, 7th, 8th user in SIG-B2<br>- if indicated in SIG-B2: 1st, 2nd, 3rd, 4th, 5th user in SIG-B1, 6th, 7th, 8th user in SIG-B2 |
| 15 | | MU (4/4 STA split)<br>- if indicated in SIG-B1/B2: 1st, 2nd, 3rd, 4th user in SIG-B1, 5th, 6th, 7th, 8th user in SIG-B2 |

FIG. 52
Table 23

| Index | MU-MIMO Users | Description of user split mode |
|---|---|---|
| 0 | 2 user MU | MU (1/1 STA split)<br>- if indicated in SIG-B1/B2: 1st user in SIG-B1, 2nd user in SIG-B2 |
| 1 | 3 user MU | MU (1/2 STA split)<br>- if indicated in SIG-B2: 1st user in SIG-B1, 2nd 3rd user in SIG-B2<br>- if indicated in SIG-B1: 1st, 2nd user in SIG-B1, 3rd user in SIG-B2 |
| 2 | 4 user MU | MU (1/3 STA split)<br>- if indicated in SIG-B2: 1st user in SIG-B1, 2nd, 3rd, 4th user in SIG-B2<br>- if indicated in SIG-B1: 1st, 2nd, 3rd user in SIG-B1, 4th user in SIG-B2 |
| 3 |  | MU (2/2 STA split)<br>- if indicated in SIG-B1/B2: 1st 2nd user in SIG-B1, 3rd, 4th user in SIG-B2 |
| 4 | 5 user MU | MU (1/4 STA split)<br>- if indicated in SIG-B2: 1st user in SIG-B1, 2nd, 3rd, 4th, 5th, user in SIG-B2<br>- if indicated in SIG-B1: 1st, 2nd, 3rd, 4th, user in SIG-B1, 5th user in SIG-B2 |
| 5 |  | MU (2/3 STA split)<br>- if indicated in SIG-B2: 1st, 2nd user in SIG-B1, 3rd, 4th, 5th user in SIG-B2<br>- if indicated in SIG-B1: 1st, 2nd, 3rd user in SIG-B1, 4th, 5th user in SIG-B2 |
| 6 | 6 user MU | MU (1/5 STA split)<br>- if indicated in SIG-B2: 1st user in SIG-B1, 2nd, 3rd, 4th 5th 6th user in SIG-B2<br>- if indicated in SIG-B1: 1st, 2nd 3rd 4th 5th user in SIG-B1, 6th user in SIG-B2 |
| 7 |  | MU (2/4 STA split)<br>- if indicated in SIG-B2: 1st, 2nd user in SIG-B1, 3rd, 4th, 5th, 6th user in SIG-B2<br>- if indicated in SIG-B1: 1st, 2nd, 3rd, 4th user in SIG-B1, 5th, 6th user in SIG-B2 |
| 8 |  | MU (3/3 STA split)<br>- if indicated in SIG-B1/B2: 1st, 2nd, 3rd user in SIG-B1, 4th, 5th, 6th user in SIG-B2 |
| 9 | 7 user MU | MU (1/6 STA split)<br>- if indicated in SIG-B2: 1st user in SIG-B1, 2nd, 3rd, 4th, 5th, 6th, 7th user in SIG-B2<br>- if indicated in SIG-B1: 1st, 2nd, 3rd, 4th, 5th, 6th user in SIG-B1, 7th user in SIG-B2 |
| 10 |  | MU (2/5 STA split)<br>- if indicated in SIG-B2: 1st, 2nd user in SIG-B1, 3rd, 4th, 5th, 6th, 7th user in SIG-B2<br>- if indicated in SIG-B1: 1st, 2nd, 3rd, 4th, 5th user in SIG-B1, 6th, 7th user in SIG-B2 |
| 11 |  | MU (3/4 STA split)<br>- if indicated in SIG-B2: 1st, 2nd, 3rd user in SIG-B1, 4th, 5th, 6th, 7th user in SIG-B2<br>- if indicated in SIG-B1: 1st, 2nd, 3rd, 4th user in SIG-B1, 5th, 6th, 7th user in SIG-B2 |
| 12 | 8 User MU | MU (1/7 STA split)<br>- if indicated in SIG-B2: 1st user in SIG-B1, 2nd, 3rd, 4th, 5th, 6th, 7th, 8th user in SIG-B2<br>- if indicated in SIG-B1: 1st, 2nd, 3rd, 4th, 5th, 6th, 7th user in SIG-B1, 8th user in SIG-B2 |
| 13 |  | MU (2/6 STA split)<br>- if indicated in SIG-B2: 1st, 2nd user in SIG-B1, 3rd, 4th, 5th, 6th, 7th, 8th user in SIG-B2<br>- if indicated in SIG-B1: 1st, 2nd, 3rd, 4th, 5th, 6th user in SIG-B1, 7th, 8th user in SIG-B2 |
| 14 |  | MU (3/5 STA split)<br>- if indicated in SIG-B2: 1st, 2nd, 3rd user in SIG-B1, 4th, 5th, 6th, 7th, 8th user in SIG-B2<br>- if indicated in SIG-B1: 1st, 2nd, 3rd, 4th, 5th user in SIG-B1, 6th, 7th, 8th user in SIG-B2 |
| 15 |  | MU (4/4 STA split)<br>- if indicated in SIG-B1/B2: 1st, 2nd, 3rd, 4th user in SIG-B1, 5th, 6th, 7th, 8th user in SIG-B2 |

FIG. 53
Table 24

| Index | MU-MIMO Users | Description |
|---|---|---|
| 0 | 2 user MU | MU (1/1 STA split)<br>- if indicated in SIG-B1/B2: 1st user in SIG-B1, 2nd user in SIG-B2 |
| 1 | 3 user MU | MU (1/2 STA split)<br>- if indicated in SIG-B1: 1st, 2nd user in SIG-B1, 3rd user in SIG-B2<br>- if indicated in SIG-B2: 1st, 2nd user in SIG-B2, 3rd user in SIG-B1 |
| 2 | 4 user MU | MU (1/3 STA split)<br>- if indicated in SIG-B1: 1st, 2nd 3rd user in SIG-B1, 4th user in SIG-B2<br>- if indicated in SIG-B2: 1st, 2nd 3rd user in SIG-B2, 4th user in SIG-B1 |
| 3 | | MU (2/2 STA split)<br>- if indicated in SIG-B1/B2: 1st 2nd user in SIG-B1, 3rd, 4th user in SIG-B2 |
| 4 | 5 user MU | MU (1/4 STA split)<br>- if indicated in SIG-B1: 1st, 2nd 3rd 4th user in SIG-B1, 5th user in SIG-B2<br>- if indicated in SIG-B2: 1st, 2nd 3rd 4th user in SIG-B2, 5th user in SIG-B1 |
| 5 | | MU (2/3 STA split)<br>- if indicated in SIG-B1: 1st, 2nd 3rd user in SIG-B1, 4th 5th user in SIG-B2<br>- if indicated in SIG-B2: 1st, 2nd 3rd user in SIG-B2, 4th 5th user in SIG-B1 |
| 6 | 6 user MU | MU (1/5 STA split)<br>- if indicated in SIG-B1: 1st, 2nd 3rd 4th 5th user in SIG-B1, 6th user in SIG-B2<br>- if indicated in SIG-B2: 1st, 2nd 3rd 4th 5th user in SIG-B2, 6th user in SIG-B1 |
| 7 | | MU (2/4 STA split)<br>- if indicated in SIG-B1: 1st, 2nd 3rd 4th user in SIG-B1, 5th 6th user in SIG-B2<br>- if indicated in SIG-B2: 1st, 2nd 3rd 4th user in SIG-B2, 5th 6th user in SIG-B1 |
| 8 | | MU (3/3 STA split)<br>- if indicated in SIG-B1/B2: 1st 2nd 3rd user in SIG-B1, 4th 5th 6th user in SIG-B2 |
| 9 | 7 user MU | MU (1/6 STA split)<br>- if indicated in SIG-B1: 1st, 2nd 3rd 4th 5th 6th user in SIG-B1, 7th user in SIG-B2<br>- if indicated in SIG-B2: 1st, 2nd 3rd 4th 5th 6th user in SIG-B2, 7th user in SIG-B1 |
| 10 | | MU (2/5 STA split)<br>- if indicated in SIG-B1: 1st, 2nd 3rd 4th 5th user in SIG-B1, 6th 7th user in SIG-B2<br>- if indicated in SIG-B2: 1st, 2nd 3rd 4th 5th user in SIG-B2, 6th 7th user in SIG-B1 |
| 11 | | MU (3/4 STA split)<br>- if indicated in SIG-B1: 1st 2nd 3rd 4th user in SIG-B1, 5th 6th 7th user in SIG-B2<br>- if indicated in SIG-B2: 1st 2nd 3rd 4th user in SIG-B2, 5th 6th 7th user in SIG-B1 |
| 12 | 8 User MU | MU (1/7 STA split)<br>- if indicated in SIG-B1: 1st, 2nd 3rd 4th 5th 6th 7th user in SIG-B1, 8th user in SIG-B2<br>- if indicated in SIG-B2: 1st, 2nd 3rd 4th 5th 6th 7th user in SIG-B2, 8th user in SIG-B1 |
| 13 | | MU (2/6 STA split)<br>- if indicated in SIG-B1: 1st, 2nd 3rd 4th 5th 6th user in SIG-B1, 7th 8th user in SIG-B2<br>- if indicated in SIG-B2: 1st, 2nd 3rd 4th 5th 6th user in SIG-B2, 7th 8th user in SIG-B1 |
| 14 | | MU (3/5 STA split)<br>- if indicated in SIG-B1: 1st 2nd 3rd 4th 5th user in SIG-B1, 6th 7th 8th user in SIG-B2<br>- if indicated in SIG-B2: 1st 2nd 3rd 4th 5th user in SIG-B2, 6th 7th 8th user in SIG-B1 |
| 15 | | MU (4/4 STA split)<br>- if indicated in SIG-B1/B2: 1st 2nd 3rd 4th user in SIG-B1, 5th 6th 7th 8th user in SIG-B2 |

FIG. 55
Table 25

| Index | MU-MIMO Users | Description |
|---|---|---|
| 0 | 2 user MU | MU (1/1 STA split) : 1st user in HE-SIG-B1, 2nd user in HE-SIG-B2 |
| 1 | 3 user MU | MU (1/2 STA split) : 1st user in HE-SIG-B1, 2nd 3rd user in HE-SIG-B2 |
| 2 | 4 user MU | MU (1/3 STA split) : 1st user in HE-SIG-B1, 2nd 3rd 4th user in HE-SIG-B2 |
| 3 | | MU (2/2 STA split) : 1st 2nd user in HE-SIG-B1, 3rd, 4th user in HE-SIG-B2 |
| 4 | 5 user MU | MU (1/4 STA split) : 1st user in HE-SIG-B1, 2nd 3rd 4th 5th user in HE-SIG-B2 |
| 5 | | MU (2/3 STA split) : 1st user in HE-SIG-B1, 2nd 3rd 4th 5th user in HE-SIG-B2 |
| 6 | 6 user MU | MU (1/5 STA split) : 1st user in HE-SIG-B1, 2nd 3rd 4th 5th 6th user in HE-SIG-B2 |
| 7 | | MU (2/4 STA split) : 1st 2nd user in HE-SIG-B1, 3rd 4th 5th 6th user in HE-SIG-B2 |
| 8 | | MU (3/3 STA split) : 1st 2nd 3rd user in HE-SIG-B1, 4th 5th 6th user in HE-SIG-B2 |
| 9 | 7 user MU | MU (1/6 STA split) : 1st user in HE-SIG-B1, 2nd 3rd 4th 5th 6th 7th user in HE-SIG-B2 |
| 10 | | MU (2/5 STA split) : 1st 2nd user in HE-SIG-B1, 3rd 4th 5th 6th 7th user in HE-SIG-B2 |
| 11 | | MU (3/4 STA split) : 1st 2nd 3rd user in HE-SIG-B1, 4th 5th 6th 7th user in HE-SIG-B2 |
| 12 | 8 User MU | MU (1/7 STA split) : 1st user in HE-SIG-B1, 2nd 3rd 4th 5th 6th 7th 8th user in HE-SIG-B2 |
| 13 | | MU (2/6 STA split) : 1st 2nd user in HE-SIG-B1, 3rd 4th 5th 6th 7th 8th user in HE-SIG-B2 |
| 14 | | MU (3/5 STA split) : 1st 2nd 3rd user in HE-SIG-B1, 4th 5th 6th 7th 8th user in HE-SIG-B2 |
| 15 | | MU (4/4 STA split) : 1st 2nd 3rd 4th user in HE-SIG-B1, 5th 6th 7th 8th user in HE-SIG-B2 |
| 16 | 2 user MU | MU (1/1 STA split) : 1st user in HE-SIG-B1, 2nd user in HE-SIG-B2 |
| 17 | 3 user MU | MU (2/1 STA split) : 1st, 2nd user in HE-SIG-B1, 3rd user in HE-SIG-B2 |
| 18 | 4 user MU | MU (3/1 STA split) : 1st, 2nd 3rd user in HE-SIG-B1, 4th user in HE-SIG-B2 |
| 19 | | MU (2/2 STA split) : 1st 2nd user in HE-SIG-B1, 3rd, 4th user in HE-SIG-B2 |
| 20 | 5 user MU | MU (4/1 STA split) : 1st, 2nd 3rd 4th user in HE-SIG-B1, 5th user in HE-SIG-B2 |
| 21 | | MU (3/2 STA split) : 1st, 2nd 3rd user in HE-SIG-B1, 4th 5th user in HE-SIG-B2 |
| 22 | 6 user MU | MU (5/1 STA split) : 1st, 2nd 3rd 4th 5th user in HE-SIG-B1, 6th user in HE-SIG-B2 |
| 23 | | MU (4/2 STA split) : 1st, 2nd 3rd 4th user in HE-SIG-B1, 5th 6th user in HE-SIG-B2 |
| 24 | | MU (3/3 STA split) : 1st 2nd 3rd user in HE-SIG-B1, 4th 5th 6th user in HE-SIG-B2 |
| 25 | 7 user MU | MU (6/1 STA split) : 1st, 2nd 3rd 4th 5th 6th user in HE-SIG-B1, 7th user in HE-SIG-B2 |
| 26 | | MU (5/2 STA split) : 1st, 2nd 3rd 4th 5th user in HE-SIG-B1, 6th 7th user in HE-SIG-B2 |
| 27 | | MU (4/3 STA split) : 1st 2nd 3rd 4th user in HE-SIG-B1, 5th 6th 7th user in HE-SIG-B2 |
| 28 | 8 User MU | MU (7/1 STA split) : 1st, 2nd 3rd 4th 5th 6th 7th user in HE-SIG-B1, 8th user in HE-SIG-B2 |
| 29 | | MU (6/2 STA split) : 1st, 2nd 3rd 4th 5th 6th user in HE-SIG-B1, 7th 8th user in HE-SIG-B2 |
| 30 | | MU (5/3 STA split) : 1st 2nd 3rd 4th 5th user in HE-SIG-B1, 6th 7th 8th user in HE-SIG-B2 |
| 31 | | MU (4/4 STA split) : 1st 2nd 3rd 4th user in HE-SIG-B1, 5th 6th 7th 8th user in HE-SIG-B2 |

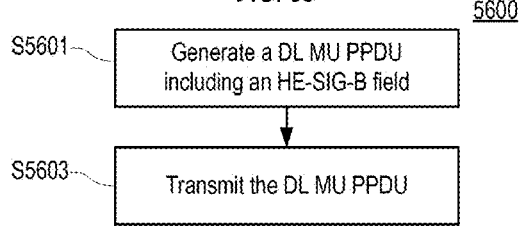
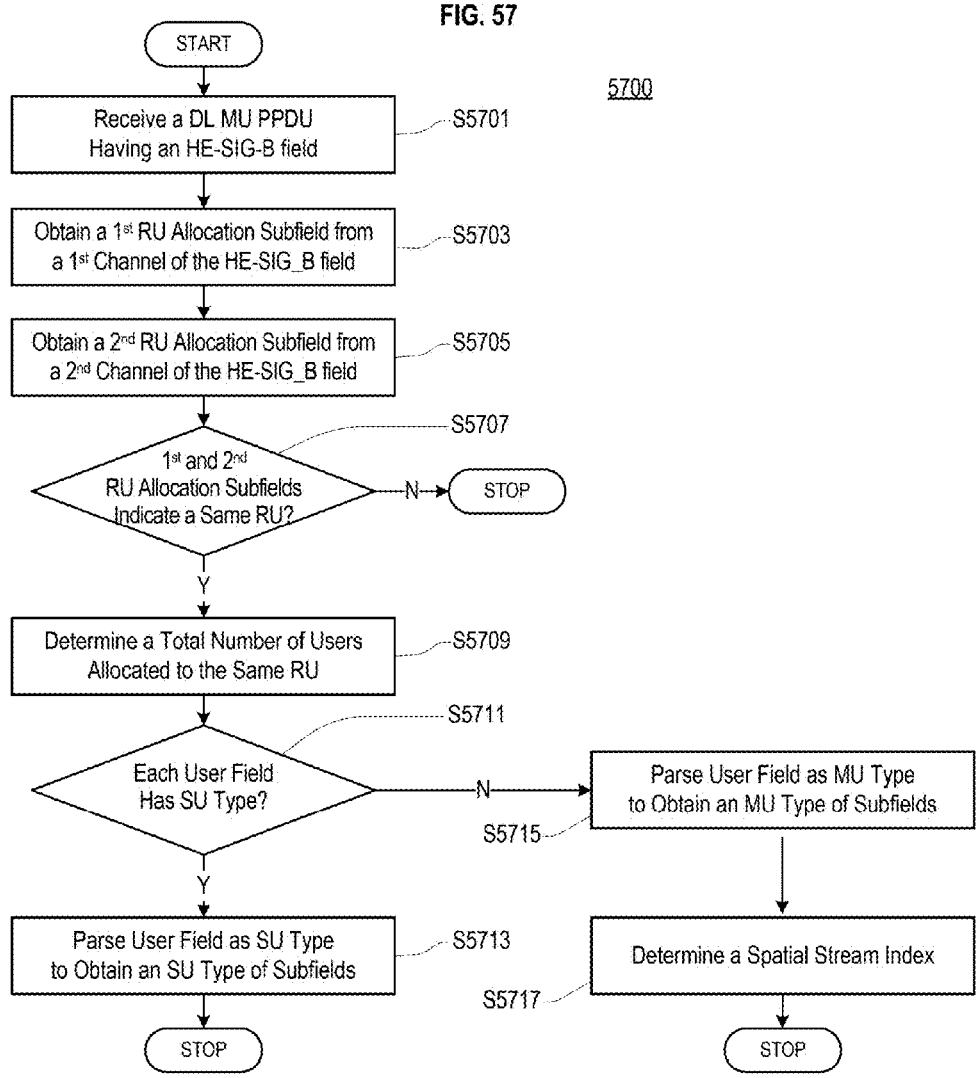

RESOURCE ALLOCATION INDICATION FOR MULTI-USER MULTIPLE-INPUT-MULTIPLE-OUTPUT (MU-MIMO) ORTHOGONAL FREQUENCY DIVISION MULTIPLE ACCESS (OFDMA) COMMUNICATION

CROSS-REFERENCE TO RELATED APPLICATION

This application claims the benefit of U.S. Provisional Patent Application No. 62/234,558, filed Sep. 29, 2015, U.S. Provisional Patent Application No. 62/250,950, filed Nov. 4, 2015, U.S. Provisional Patent Application No. 62/251,554, filed Nov. 5, 2015, U.S. Provisional Patent Application No. 62/252,886, filed Nov. 9, 2015, and U.S. Provisional Patent Application No. 62/344,158, filed Jun. 1, 2016, which are incorporated by reference herein in their entireties.

BACKGROUND

1. Technical Field

The technology described herein relates generally to wireless networking. More particularly, the technology relates to Multi-User Multiple-Input-Multiple-Output (MU-MIMO) and Orthogonal Frequency Division Multiple Access (OFDMA) communications in a wireless network.

2. Description of the Related Art

Wireless LAN (WLAN) devices are currently being deployed in diverse environments. Some of these environments have large numbers of access points (APs) and non-AP stations in geographically limited areas. In addition, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

A WLAN is being standardized by the IEEE (Institute of Electrical and Electronics Engineers) Part 11 under the name of "Wireless LAN Medium Access Control (MAC) and Physical Layer (PHY) Specifications." A series of standards have been adopted as the WLAN evolved, including IEEE Std 802.11™-2012 (March 2012) (IEEE 802.11n). The IEEE Std 802.11 was subsequently amended by IEEE Std 802.11ae™-2012, IEEE Std 802.11aa™-2012, IEEE Std 802.11ad™-2012, and IEEE Std 802.11ac™-2013 (IEEE 802.11ac).

Recently, an amendment focused on providing a High Efficiency (HE) WLAN in high-density scenarios is being developed by the IEEE 802.11ax task group. The 802.11ax amendment focuses on improving metrics that reflect user experience, such as average per station throughput, the 5th percentile of per station throughput of a group of stations, and area throughput. Improvements may be made to support environments such as wireless corporate offices, outdoor hotspots, dense residential apartments, and stadiums.

An HE WLAN supports Down-Link (DL) and Up-Link (UL) Multi-User (MU) transmissions such as MU Orthogonal Frequency Division Multiple Access (MU OFDMA) transmission, Multi-User Multi-Input-Multi-Output (MU MIMO) transmissions, and MU transmissions that use both OFDMA and MU-MIMO. Collectively, transmissions using OFDMA, MU-MIMO, or both are referred to herein as MU transmissions.

MU communication as define herein are distinguished from other transmissions, such as broadcast transmissions, by the allocation in the MU communication of only a portion of the channel (such as a sub-channel in an OFDMA communication, one or more spatial streams in an MU-MIMO communication, or one or more spatial streams of a sub-channel in a communication using both OFDMA and MU-MIMO) to a particular communication.

Each of MU frames transmitted by the stations using OFDMA may include a first portion transmitted across an entire bandwidth of a wireless channel and one or more second portions transmitted to or by respective stations using respective portions of the bandwidth of and respective spatial streams of the wireless channel. The respective second portions of the MU OFDMA frames are each transmitted using one or more spatial streams of respective bandwidths (that is, respective subchannels) allocated exclusively to each second portion. The information on which bandwidths, which spatial streams, or both that are allocated to which stations in the second portion of the frame may be communicated to the stations using an HE Signal-B (HE-SIG-B) field included in a first portion of the MU OFDMA frame or in a preceding frame, such as a trigger frame.

An AP may allocate respective bandwidths, respective spatial streams, or both to each of one or more stations participating in an MU communication. Each allocation must then be communicated to the respective station.

SUMMARY

In an embodiment, a method implemented by a wireless device comprises receiving, by the wireless device, a frame. The frame includes i) a first Resource Unit (RU) allocation subfield including resource information for a first frequency area and indicating a first number of user fields in a first channel that correspond to the first frequency area, and ii) a second RU allocation subfield including resource information for a second frequency area and indicating a second number of user fields in a second channel that correspond to the second frequency area. The method further comprises when the first frequency area and the second frequency area are a same RU, determining, using both the first RU allocation subfield and the second RU allocation subfield, a number of users allocated to the same RU.

In an embodiment, determining the number of users allocated to the same RU comprises: i) determining, using the first RU allocation subfield, the first number of user fields in the first channel that correspond to the same RU, ii) determining, using the second RU allocation subfield, the second number of user fields in the second channel that correspond to the same RU, and iii) determining a sum of the first number and the second number as the number of users allocated to the same RU.

In an embodiment, the method further comprises i) when the number of users allocated to the same RU is equal to 1, determining that a single user field corresponding to the same RU is of a single user (SU) type, and ii) when the number of users allocated to the same RU is greater than 1, determining that each of a plurality of user fields corresponding to the same RU is of a multi user (MU) type.

In an embodiment, the method further comprises when the first RU allocation subfield indicates a first predetermined state indicating that there is one user field in the first channel that correspond to the same RU, and the second RU allocation subfield indicates a second predetermined state indicating that there is no user field in the second channel that correspond to the same RU, determining that the single user field corresponding to the same RU is of the SU type.

In an embodiment, the same RU is a 484-tone resource unit, the first predetermined state indicates that there is one user field in the first channel that correspond to the 484-tone resource unit, and the second predetermined state indicates that there is no user field in the second channel that correspond to the 484-tone resource unit.

In an embodiment, the same RU is a 996-tone resource unit, the first predetermined state indicates that there is one user field in the first channel that correspond to the 996-tone resource unit, and the second predetermined state indicates that there is no user field in the second channel that correspond to the 996-tone resource unit.

In an embodiment, the method further comprises: i) when the number of users allocated to the same RU is equal to 1, determining that the single user field corresponding to the same RU includes the SU type of subfields, and ii) when the number of users allocated to the same RU is greater than 1, determining that each of user fields corresponding to the same RU include the MU type of subfields. The MU type of subfields are different from the SU type of subfields.

In an embodiment, the SU type of subfields includes a station identifier, a number of spatial streams, a use of beamforming, a Modulation and coding scheme, and a coding scheme, and the MU type of subfields includes a station identifier, a spatial configuration, a Modulation and coding scheme, and a coding scheme.

In an embodiment, a size of the same RU is greater than 242 subcarriers.

In an embodiment, wherein the first channel is a first HE-SIG-B channel and the second channel is a second HE-SIG-B channel.

In an embodiment, user fields in the first channel that correspond to the same RU are sequentially ordered based on spatial stream indices, user fields in the second channel that correspond to the same RU are sequentially ordered based on spatial stream indices, and orders of user fields in the first channel that correspond to the same RU precedes orders of user fields in the second channel that correspond to the same RU.

In an embodiment, the method further comprises determining a spatial stream index for the wireless device based on an order of a user field of the non-AP station within user fields included in the first channel and the second channel that correspond to the same RU.

In an embodiment, a method implemented by a wireless device comprises generating, by the wireless device, a frame. The frame includes i) a first Resource Unit (RU) allocation subfield including resource information for a first frequency area and indicating a first number of user fields in a first channel that correspond to the first frequency area, and ii) a second RU allocation subfield including resource information for a second frequency area and indicating of a second number of user fields in a second channel that correspond to the second frequency area. The method further comprises transmitting the frame. When the first frequency area and the second frequency area are a same RU, both the first RU allocation subfield and the second RU allocation subfield indicates a number of users allocated to the same RU.

In an embodiment, a sum of the first number indicated by the first RU allocation subfield and the second number indicated by the second RU allocation subfield indicates the number of users allocated to the same RU.

In an embodiment, when the number of users allocated to the same RU is equal to 1, a single user field corresponding to the same RU is of a SU type. When the number of users allocated to the same RU is greater than 1, each of user fields corresponding to the same RU is of a MU type.

In an embodiment, when the first RU allocation subfield indicates a first predetermined state indicating that there is one user field in the first channel that correspond to the same RU, and the second RU allocation subfield indicates a second predetermined state indicating that there is no user field in the second channel that correspond to the same RU, the single user field corresponding to the same RU is of the SU type.

In an embodiment, the same RU is a 484-tone resource unit, the first predetermined state indicates that there is one user field in the first channel that correspond to the 484-tone resource unit, and the second predetermined state indicates that there is no user field in the second channel that correspond to the 484-tone resource unit.

In an embodiment, the same RU is a 996-tone resource unit, the first predetermined state indicates that there is one user field in the first channel that correspond to the 996-tone resource unit, and the second predetermined state indicating that there is no user field in the second channel that correspond to the 996-tone resource unit.

In an embodiment, when the number of users allocated to the same RU is equal to 1, the single user field corresponding to the same RU includes the SU type of subfields. When the number of users allocated to the same RU is greater than 1, each of user fields corresponding to the same RU include includes the MU type of subfields. The MU type of subfields are different from the SU type of subfields.

In an embodiment, user fields in the first channel that correspond to the same RU are sequentially ordered based on spatial stream indices, user fields in the second channel that correspond to the same RU are sequentially ordered based on spatial stream indices, and orders of user fields in the first channel that correspond to the same RU precedes orders of user fields in the second channel that correspond to the same RU.

BRIEF DESCRIPTION OF THE DRAWINGS

FIG. 1 illustrates a wireless network according to an embodiment.

FIG. 2 is a schematic diagram of a wireless device, according to an embodiment.

FIG. 7A illustrates an HE Physical Layer Convergence Protocol (PLCP) Protocol Data Units (PPDU), according to an embodiment.

FIG. 7B shows properties of fields of the HE PPDU frame of FIG. 7A, according to an embodiment.

FIG. 8 illustrates a DL MU OFDMA PPDU being transmitted to a set of stations, according to an embodiment.

FIG. 9 illustrates Resource Unit (RU) definitions in a 20 MHz bandwidth, according to an embodiment.

FIG. 10 illustrates RU definitions in a 40 MHz bandwidth, according to an embodiment.

FIG. 16A illustrates a portion of an 80 MHz PPDU including a 484-tone RU spatially multiplexed among three users, according to an embodiment.

FIG. 16B illustrates the allocation in channels C and D corresponding to the PPDU of FIG. 16A, according to an embodiment.

FIGS. 18A, 18B, 18C, and 18D, show first, second, third, and fourth parts, respectively, of a table of index values for indicating RU allocations, according to an embodiment.

FIGS. 19A, 19B, 19C, and 19D, show first, second, third, and fourth parts, respectively, of a table of index values for indicating RU allocations, according to another embodiment.

FIGS. 20A, 20B, 20C, and 20D, show first, second, third, and fourth parts, respectively, of a table of index values for indicating RU allocations, according to another embodiment.

FIG. 23 includes a table of states for use in an RU allocation table, according to an embodiment.

FIG. 24 includes a table of states for use in an RU allocation table, according to another embodiment.

FIGS. 25A, 25B, 25C, and 25D, show first, second, third, and fourth parts of a table of index values for indicating RU allocations, according to another embodiment.

FIG. 26 includes a table of states for use in an RU allocation table, according to another embodiment.

FIG. 27 illustrates a process for interpreting a value of an RU allocation subfield according to an RU allocation mapping table.

FIG. 29 includes a table that enumerates the states of an RU allocation mapping table in accordance with the process of FIG. 28, according to an embodiment.

FIG. 30 includes a table enumerating distributions of user fields between HE-SIG-B1 and HE-SIG-B2 fields, according to an embodiment.

FIG. 31 includes a table enumerating distributions of user fields between HE-SIG-B1 and HE-SIG-B2 fields, according to an embodiment that load-balances the user fields.

FIG. 32 includes a table illustrating allowed and disallowed user splits, according to an Embodiment A.

FIGS. 33A and 33B show first and second parts, respectively, of a table of index values for indicating RU allocations, according to the Embodiment A.

FIG. 34 includes a table illustrating allowed and disallowed user splits, according to an Embodiment B.

FIG. 35 includes a table illustrating allowed and disallowed user splits, according to an Embodiment C.

FIG. 36 includes a table illustrating allowed and disallowed user splits, according to an Embodiment D.

FIGS. 37A and 37B show first and second parts, respectively, of a table of index values for indicating RU allocations, according to the Embodiment D.

FIG. 38 includes a table showing an example of indication states for MU-MIMO for 484-tone RUs and 996-tine RUs, according to an embodiment.

FIG. 40 includes a table showing an example of indication states for MU-MIMO for 484-tone RUs and 996-tone RUs, according to an embodiment.

FIG. 41A illustrates an HE-SIG-B1 field and an HE-SIG-B2 field of a PPDU, according to an embodiment.

FIG. 41B illustrates an allocation in an 80 MHz bandwidth corresponding to the HE-SIG-B1 and HE-SIG-B2 fields of FIG. 41A, according to an embodiment.

FIG. 44 illustrates signaling for indicating an unused RU in an OFDMA PPDU, according to an embodiment.

FIG. 45 includes a table showing signaling used in each HE-SIG-B channel to indicate the number of user specific information for an RU that are in each respective HE-SIG-B channel, according to an embodiment.

FIG. 46 includes a table showing signaling used in each HE-SIG-B channel to indicate the number of user specific information for an RU that are in each respective HE-SIG-B channel, according to another embodiment.

FIG. 47 includes a table showing signaling used in each HE-SIG-B channel to indicate the number of user specific information for an RU that are in each respective HE-SIG-B channel, according to another embodiment.

FIG. 51 includes a table showing states for user split mode indication in an RU allocation subfield, according to an embodiment.

FIG. 52 includes a table showing states for user split mode indication in an RU allocation subfield, according to another embodiment.

FIG. 53 includes a table showing states for user split mode indication in an RU allocation subfield, according to another embodiment.

FIG. 55 includes a table showing states for user split mode indication in an RU allocation subfield, according to another embodiment.

FIG. 56 shows a flow chart of an operation of an AP, according to an embodiment.

FIG. 57 shows a flow chart of an operation of a non-AP station, according to an embodiment.

DETAILED DESCRIPTION

Figure 3A:
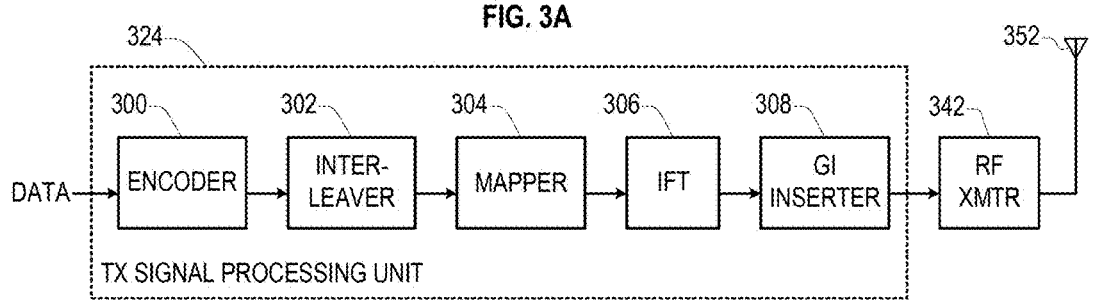
FIG. 3A illustrates components of a wireless device configured to transmit data, according to an embodiment.

The technology described herein relates generally to wireless networking. More particularly, the technology relates to communicating resource unit (RU) and spatial stream allocation information for a Multi-User Multiple-Input-Multiple-Output (MU-MIMO) Orthogonal Frequency Division Multiple Access (OFDMA) communication.

In the following detailed description, certain illustrative embodiments have been illustrated and described. As those skilled in the art would realize, these embodiments are capable of modification in various different ways without departing from the scope of the present disclosure. Accordingly, the drawings and description are to be regarded as illustrative in nature and not restrictive. Like reference numerals designate like elements in the specification.

FIG. 1 illustrates a wireless network according to an embodiment. The wireless network includes an infrastructure Basic Service Set (BSS) 100 of a Wireless Local Area Network (WLAN). In an 802.11 wireless LAN (WLAN), the BSS provides the basic organizational unit and typically includes an Access Point (AP) and one or more associated stations (STAs). In FIG. 1, the BSS 100 includes an Access Point 102 (also referred to as the AP) wirelessly communicating with first, second, third, and fourth wireless devices (or stations) 104, 106, 108, and 110 (also referred to as stations STA1, STA2, STA3, and STA4, respectively). The wireless devices may each include a medium access control layer (MAC) and a physical layer (PHY) according to an IEEE 802.11 standard.

Although FIG. 1 shows the BSS 100 including only the first to fourth stations STA1 to STA4, embodiments are not limited thereto and may comprise BSSs including any number of stations.

The AP 102 is a station, that is, a STA, configured to control and coordinate functions of the BSS 100. The AP 102 may transmit information to a single station selected from the plurality of stations STA1 to STA4 in the BSS 100 using a single frame, or may simultaneously transmit information to two or more of the stations STA1 to STA4 in the BSS 100 using either a single Orthogonal Frequency Division Multiplexing (OFDM) broadcast frame, a single OFDM Multi-User Multi-Input-Multi-Output (MU-MIMO) transmission, a single Orthogonal Frequency Division Multiple Access (OFDMA) frame, or a single MU-MIMO OFDMA frame.

The stations STA1 to STA4 may each transmit data to the AP 102 using a single frame, or transmit information to and receive information from each other using a single frame. Two or more of the stations STA1 to STA4 may simultaneously transmit data to the AP 102 using an Uplink (UL) OFDMA frame, an UL MU-MIMO frame, or an UL MU-MIMO OFDMA frame.

In another embodiment, the AP 102 may be absent and the stations STA1 to STA4 may be in an ad-hoc network.

Each of the stations STA1 to STA4 and the AP 102 includes a processor and a transceiver, and may further include a user interface and a display device.

The processor is configured to generate a frame to be transmitted through a wireless network, to process a frame received through the wireless network, and to execute protocols of the wireless network. The processor may perform some or all of its functions by executing computer programming instructions stored on a non-transitory computer-readable medium.

The transceiver represents a unit functionally connected to the processor, and designed to transmit and receive a frame through the wireless network. The transceiver may include a single component that performs the functions of transmitting and receiving, or two separate components each performing one of such functions.

The processor and transceiver of the stations STA1 to STA4 and the AP 102 may be respectively implemented using hardware components, software components, or both.

The AP 102 may be or may include a WLAN router, a stand-alone Access Point, a WLAN bridge, a Light-Weight Access Point (LWAP) managed by a WLAN controller, and the like. In addition, a device such as a personal computer, tablet computer, or cellular phone may configured able to operate as the AP 102, such as when a cellular phone is configured to operate as a wireless "hot spot."

Each of the stations STA1 to STA4 may be or may include a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, a digital video player, and the like.

The present disclosure may be applied to WLAN systems according to IEEE 802.11 standards but embodiments are not limited thereto.

In IEEE 802.11 standards, frames exchanged between stations (including access points) are classified into management frames, control frames, and data frames. A management frame may be a frame used for exchanging management information that is not forwarded to a higher layer of a communication protocol stack. A control frame may be a frame used for controlling access to a medium. A data frame may be a frame used for transmitting data to be forwarded to the higher layer of the communication protocol stack.

A type and subtype of a frame may be identified using a type field and a subtype field included in a control field of the frame, as prescribed in the applicable standard.

FIG. 2 illustrates a schematic block diagram of a wireless device 200 according to an embodiment. The wireless or WLAN device 200 may be included in the AP 102 or any of the stations STA1 to STA4 in FIG. 1. The WLAN device 200 includes a baseband processor 210, a radio frequency (RF) transceiver 240, an antenna unit 250, a storage device (e.g., memory) 232, one or more input interfaces 234, and one or more output interfaces 236. The baseband processor 210, the memory 232, the input interfaces 234, the output interfaces 236, and the RF transceiver 240 may communicate with each other via a bus 260.

The baseband processor 210 performs baseband signal processing, and includes a MAC processor 212 and a PHY processor 222. The baseband processor 210 may utilize the memory 232, which may include a non-transitory computer readable medium having software (e.g., computer programming instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the memory 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting signal processing unit (SPU) 224 and a receiving SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beamformed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 200 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, and so on.

As described herein, a wide variety of electronic devices, circuits, firmware, software, and combinations thereof may be used to implement the functions of the components of the WLAN device 200. Furthermore, the WLAN device 200 may include other components, such as application processors, storage interfaces, clock generator circuits, power supply circuits, and the like, which have been omitted in the interest of brevity.

FIG. 3A illustrates components of a wireless device configured to transmit data according to an embodiment, including a Transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data DATA. In an embodiment, the encoder 300 includes a forward error correction (FEC) encoder. The FEC encoder may include a binary convolutional code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs the BCC encoding, and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to the constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
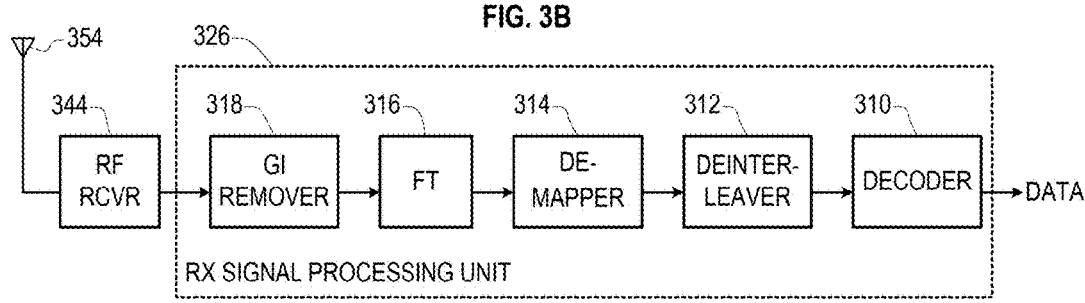
FIG. 3B illustrates components of a wireless device configured to receive data, according to an embodiment.

FIG. 3B illustrates components of a wireless device configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using the LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using the BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs the BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 200 will assess the availability of the wireless medium using Clear Channel Assessment (CCA). If the medium is occupied, CCA may determine that it is busy, while if the medium is available, CCA determines that it is idle.

Figure 4:
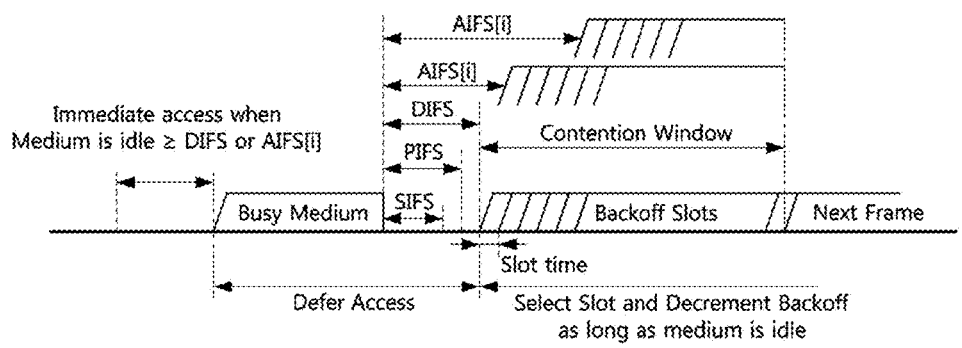
FIG. 4 illustrates Inter-Frame Space (IFS) relationships.

FIG. 4 illustrates Inter-Frame Space (IFS) relationships. FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time.

A data frame is used for transmission of data forwarded to a higher layer. The WLAN device transmits the data frame after performing backoff if a DIFS has elapsed during which DIFS the medium has been idle.

A management frame is used for exchanging management information, which is not forwarded to the higher layer. Subtype frames of the management frame include a beacon frame, an association request/response frame, a probe request/response frame, and an authentication request/response frame.

A control frame is used for controlling access to the medium. Subtype frames of the control frame include a request to send (RTS) frame, a clear to send (CTS) frame, and an acknowledgement (ACK) frame.

When the control frame is not a response frame of another frame, the WLAN device transmits the control frame after performing backoff if a DIFS has elapsed during which DIFS the medium has been idle. When the control frame is the response frame of another frame, the WLAN device transmits the control frame after a SIFS has elapsed without performing backoff or checking whether the medium is idle.

A WLAN device that supports a Quality of Service (QoS) functionality (that is, a QoS station) may transmit the frame after performing backoff if an AIFS for an associated access category (AC), (AIFS[AC]), has elapsed. When transmitted by the QoS station, any of the data frame, the management frame, and the control frame which is not the response frame may use the AIFS[AC] of the AC of the transmitted frame.

A WLAN device may perform a backoff procedure when the WLAN device that is ready to transfer a frame finds the medium busy. In addition, a WLAN device operating according to the IEEE 802.11n and 802.11ac standards may perform the backoff procedure when the WLAN device infers that a transmission of a frame by the WLAN device has failed.

The backoff procedure includes determining a random backoff time composed of N backoff slots, each backoff slot having a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device detects no medium activity for the duration of a particular backoff slot, the backoff procedure shall decrement the backoff time by the slot time. When the WLAN determines that the medium is busy during a backoff slot, the backoff procedure is suspended until the medium is again determined to be idle for the duration of a DIFS or EIFS period. The WLAN device may perform transmission or retransmission of the frame when the backoff timer reaches zero.

The backoff procedure operates so that when multiple WLAN devices are deferring and execute the backoff procedure, each WLAN device may select a backoff time using a random function, and the WLAN device selecting the smallest backoff time may win the contention, reducing the probability of a collision.

Figure 5:
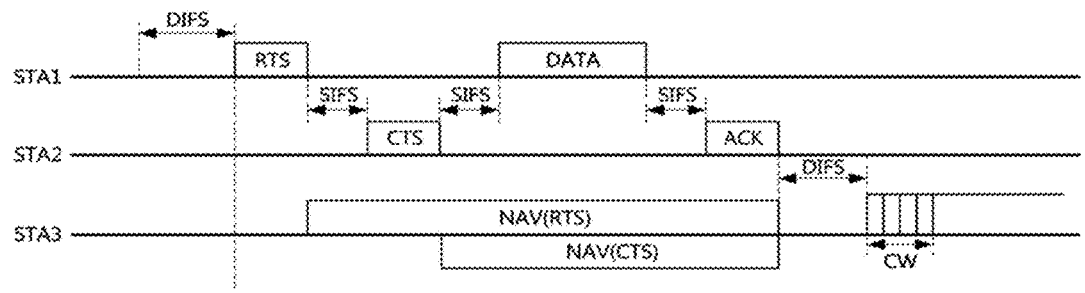
FIG. 5 illustrates a Carrier Sense Multiple Access/Collision Avoidance (CSMA/CA) based frame transmission procedure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1, a frame transmitted from the second station STA2, or both can be received. The stations STA1, STA2, and STA3 may be WLAN devices.

The STA1 may determine whether the channel is busy by carrier sensing. The STA1 may determine the channel occupation based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the STA1 may transmit a Ready-To-Send (RTS) frame to the second station STA2. Upon receiving the RTS frame, after a SIFS the second station STA2 may transmit a Clear-To-Send (CTS) frame as a response of the RTS frame. If Dual-CTS is enabled and the second station STA2 is an AP, the AP may send two CTS frames in response to the RTS frame: a first CTS frame in the legacy non-HT format, and a second CTS frame in the HT format.

When the third station STA3 receives the RTS frame, it may set a NAV timer of the third station STA3 for a transmission duration of subsequently transmitted frames (for example, a duration of SIFS+CTS frame duration+SIFS+data frame duration+SIFS+ACK frame duration) using duration information included in the RTS frame. When the third station STA3 receives the CTS frame, it may set the NAV timer of the third station STA3 for a transmission duration of subsequently transmitted frames using duration information included in the CTS frame. Upon receiving a new frame before the NAV timer expires, the third station STA3 may update the NAV timer of the third station STA3 by using duration information included in the new frame. The third station STA3 does not attempt to access the channel until the NAV timer expires.

When the STA1 receives the CTS frame from the second station STA2, it may transmit a data frame to the second station STA2 after SIFS elapses from a time when the CTS frame has been completely received. Upon successfully receiving the data frame, the second station STA2 may transmit an ACK frame as a response of the data frame after SIFS elapses.

When the NAV timer expires, the third station STA3 may determine whether the channel is busy using the carrier sensing. Upon determining that the channel is not used by other devices during a DIFS after the NAV timer has expired, the third station STA3 may attempt to access the channel after a contention window according to a backoff process elapses.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame.

Figure 6:
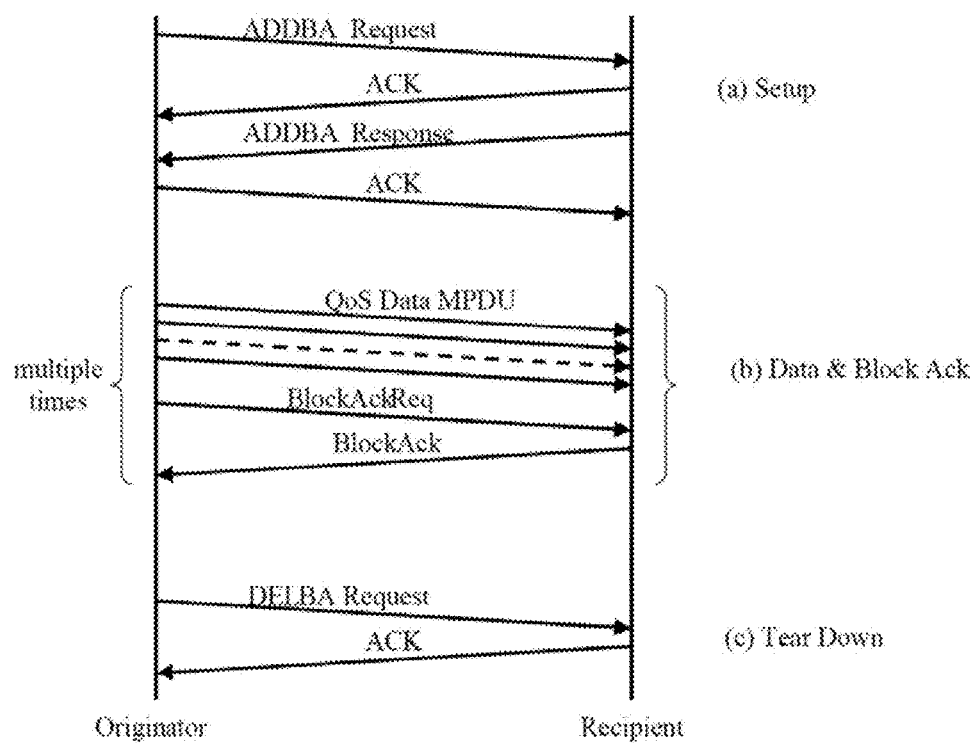
FIG. 6 illustrates an embodiment in which a station acknowledges successful receipt of a frame using a Block Acknowledgment frame.

FIG. 5 shows the second station STA1 transmitting an ACK frame to acknowledge the successful reception of a frame by the recipient. FIG. 6 illustrates an embodiment in which a station acknowledges successful receipt of a frame using a Block Acknowledgment (Block Ack, BlockAck or BA) frame.

The Block Ack mechanism improves channel efficiency by aggregating several acknowledgments into one frame. There are two types of Block Ack mechanisms: Immediate and Delayed. The Immediate Block Ack mechanism is intended for use with high-bandwidth, low-latency traffic. The delayed Block Ack mechanism is intended for applications that tolerate moderate latency.

Here, a station with data to send which will be acknowledged using the Block Ack mechanism is referred to as the originator, and the receiver of that data as the recipient. An AP can be the recipient or the originator.

The Block Ack mechanism is initialized using a setup process that includes an exchange of ADDBA Request and ADDBA Response frames. The ADDBA Request and ADDBA Response frames include indications of whether Aggregate MAC Service Data Units (A-MSDUs) are permitted in the frames using the Black Ack mechanism, whether Immediate or Delayed Block Ack is to be used, and other information.

After initialization, blocks of data frames—in particular, Quality of Service (QoS) data frame according to IEEE Std 802.11-2012—may be transmitted from the originator to the recipient. A block may be started within a polled TXOP or by winning Enhanced Distributed Channel Access (EDCA) contention. The number of frames in the block is limited, and the amount of state that is to be kept by the recipient is bounded.

The MPDUs within the block of frames are acknowledged by a BlockAck frame, which is requested by a BlockAckReq frame.

The Block Ack mechanism does not require the setting up of a Traffic Stream (TS); however, QoS stations using the TS facility may choose to signal their intention to use a Block Ack mechanism for the scheduler's consideration in assigning Transmission Opportunities (TXOPs).

Acknowledgments of frames belonging to the same Traffic Identifier (TID), but transmitted during multiple TXOPs, may also be combined into a single BlockAck frame. This mechanism allows the originator to have flexibility regarding the transmission of data MPDUs. The originator may split the block of frames across TXOPs, separate the data transfer and the Block Ack exchange, and interleave blocks of MPDUs carrying all or part of MAC Service Data Units (MSDUs) or Aggregate MSDUs (A-MSDUs) for different TIDs or receiver addresses.

The Block Ack mechanism is torn down using a DELBA frame including a DELBA Request. The DELBA frame is sent by either the originator or the recipient to terminate participation in the Block Ack mechanism.

The PHY entity for IEEE Std 802.11 is based on Orthogonal Frequency Division Multiplexing (OFDM) or Orthogonal Frequency Division Multiple Access (OFDMA). In either OFDM or OFDMA Physical (PHY) layers, a STA is capable of transmitting and receiving Physical Layer Convergence Protocol (PLCP) Protocol Data Units (PPDUs) that are compliant with the mandatory PHY specifications. A PHY specification defines a set of Modulation and Coding Schemes (MCS) and a maximum number of spatial streams.

Some PHY entities define downlink (DL) and uplink (UL) Multi-User (MU) transmissions having a maximum number of space-time streams (STS) per user and employing up to a predetermined total number of STSs.

A PHY entity may define PPDUs that are individually addressed using an Association Identifier (AID) or Partial AID and may also define PPDUs that are group addressed based on Group ID (GID).

A PHY entity may provide support for 20 MHz, 40 MHz, 80 MHz, and 160 MHz contiguous channel widths and support for an 80+80 MHz non-contiguous channel width. Each channel includes a plurality of subcarriers, which may also be referred to as tones. Data subcarriers within the channels may be modulated using binary phase shift keying (BPSK), quadrature phase shift keying (QPSK), 16-quadrature amplitude modulation (16-QAM), 64-QAM and 256-QAM. Forward error correction (FEC) coding (such as convolutional or Low Density Parity Check (LDPC) coding) may be used with coding rates of 1/2, 2/3, 3/4 and 5/6.

A PHY entity may define fields denoted as Legacy Signal (L-SIG), Signal A (SIG-A), and Signal B (SIG-B) within which some necessary information about PLCP Service Data Unit (PSDU) attributes are communicated. For example, a High Efficiency (HE) PHY entity may define an L-SIG field, an HE-SIG-A field, and an HE-SIG-B field. In an embodiment, the symbols in the L-SIG, SIG-A, and SIG-B fields are encoded with the most robust (and therefore least efficient) MCS of the PHY entity.

To prevent excessive consumption of WLAN resource by overhead, the L-SIG, HE-SIG-A, and HE-SIG-B fields have a limited number of bits and it is advantageous to encode them in the most compact form possible. In a receiving STA, the symbols of these fields are decoded first in order to obtain vital information about the PSDU attributes and some MAC attributes.

In the IEEE Std 802.11ac, SIG-A and SIG-B fields are called VHT SIG-A and VHT SIG-B fields. Hereinafter, IEEE Std 802.11ax SIG-A and SIG-B fields are respectively referred to as HE-SIG-A and HE-SIG-B fields.

FIG. 7A illustrates an HE PPDU 700 according to an embodiment. A transmitting station generates the HE PPDU frame 700 and transmits it to one or more receiving stations. The receiving stations receive, detect, and process the HE PPDU frame 700.

The HE PPDU frame 700 includes a Legacy Short Training Field (L-STF) field 702, a Legacy (i.e., a Non-High Throughput (Non-HT)) Long Training Field (L-LTF) 704, a Legacy Signal (L-SIG) field 706, and a Repeated L-SIG field (RL-SIG) 708, which together comprise a legacy preamble 701. The L-STF 704 of a non-trigger-based PPDU has a periodicity of 0.8 µs with 10 periods.

The HE PPDU frame 700 also includes an HE-SIG-A field 710, an optional HE-SIG-B field 712, an HE-STF 714, an HE-LTF 716, and an HE-Data field 718.

The legacy preamble 701, the HE-SIG-A field 710, and the HE-SIG-B field 712 when present, comprise a first part of the HE PPDU frame 700. In an embodiment, the first part of the HE PPDU frame 700 is decoded using a 64-element Discrete Fourier Transform (DFT), having a basic subcarrier spacing of 312.5 KHz.

The HE-SIG-A field 710 is duplicated on each 20 MHz segment after the legacy preamble to indicate common control information. The HE-SIG-A field 710 includes a plurality of OFDM HE-SIG-A symbols 720 each having a duration (including a Guard Interval (GI)) of 4 µs. A number of the HE-SIG-A symbols 720 in the HE-SIG-A field 710 is indicated by $N_{HESIGA}$ and is either 2 or 4.

The HE-SIG-B field 712 is included in Down-Link (DL) Multi-User (MU) PPDUs. The HE-SIG-B field 712 includes a plurality of OFDM HE-SIG-B symbols 722 each having a duration including a Guard Interval (GI) of 4 µs. In embodiments, Single User (SU) PPDUs, Up-Link (UL) MU PPDUs, or both do not include the HE-SIG-B field 712. A number of the HE-SIG-B symbols 722 in the HE-SIG-B field 712 is indicated by $N_{HESIGB}$ and is variable.

When the HE PPDU 700 has a bandwidth of 40 MHz or more, the HE-SIG-B field 712 may be transmitted in first and second HE-SIG-B channels 1 and 2. The HE-SIG-B field in the HE-SIG-B channel 1 is referred to as the HE-SIG-B1 field, and the HE-SIG-B field in the HE-SIG-B channel 2 is referred to as the HE-SIG-B2 field. The HE-SIG-B1 field and the HE-SIG-B2 field are communicated using different 20 MHz bandwidths of the HE PPDU 700, and may contain different information. Within this document, the term "HE-SIG-B field" may refer to an HE-SIG-B field of a 20 MHz PPDU, or to either of an HE-SIG-B1 field or HE-SIG-B2 field of a 40 MHz or more PPDU.

An HE-STF 714 of a non-trigger-based PPDU has a periodicity of 0.8 µs with 5 periods. A non-trigger-based PPDU is a PPDU that is not sent in response to a trigger frame. An HE-STF 714 of a trigger-based PPDU has a periodicity of 1.6 µs with 5 periods. Trigger-based PPDUs include UL PPDUs sent in response to respective trigger frames.

The HE-LTF 716 includes one or more OFDM HE-LTF symbols 726 each having a duration of 12.8 µs plus a Guard Interval (GI). The HE PPDU frame 700 may support a 2×LTF mode and a 4×LTF mode. In the 2×LTF mode, an HE-LTF symbol 726 excluding a Guard Interval (GI) is equivalent to modulating every other tone in an OFDM symbol of 12.8 µs excluding the GI, and then removing the second half of the OFDM symbol in a time domain. A number of the HE-LTF symbols 726 in the HE-LTF field 716 is indicated by $N_{HELTF}$, and is equal to 1, 2, 4, 6, or 8.

The HE-Data field 718 includes one or more OFDM HE-Data symbols 728 each having a duration of 12.8 µs plus a Guard Interval (GI). A number of the HE-Data symbols 728 in the HE-Data field 718 is indicated by $N_{DATA}$ and is variable.

FIG. 7B shows a Table 1 indicating additional properties of the fields of the HE PPDU frame 700 of FIG. 7A, according to an embodiment.

The descriptions below, for sake of completeness and brevity, refer to OFDMA-based 802.11 technology. Unless otherwise indicated, a station refers to a non-AP HE STA, and an AP refers to an HE AP.

FIG. 8 illustrates transmission of a DL MU OFDMA PPDU 800 to a set of stations, according to an embodiment. The set of stations includes first, second, third, and fourth stations STA1, STA2, STA3, and STA4. The concepts described herein with respect to DL OFDMA frame 800 also apply to UL OFDMA frames unless specifically stated otherwise. The bandwidth of the DL OFDMA frame 800 may be 20, 40, 80, 160, or 80+80 MHz.

In FIG. 8, a horizontal dimension is a time dimension or number of OFDM symbols, and a vertical dimension is a frequency dimension, or a number of tones or subcarriers. For a given Fourier Transform (FT) size, the number of tones is a fixed value; however, depending on the subcarrier spacing, two OFDM symbols with, for example, respective FT sizes of 64 and 256 may require the same bandwidth to transmit.

Hereinafter, the term sub-band refers to a set of contiguous subcarriers (that is, a set of subcarriers for which no subcarrier not in the set is between any two subcarriers within the set) that as a whole are assigned for a payload whose expected destination is a single station, or a set of stations. A set of sub-bands or a set of subcarriers may also be referred to as a Resource Unit (RU).

In an embodiment, the set of contiguous subcarriers is a set of contiguous data subcarriers (that is, a set of data subcarriers for which no data subcarrier not in the set is between any two data subcarriers within the set).

A sub-band is represented in FIG. 8 as a horizontal partition of the DL OFDMA PPDU 800 where a set of contiguous tones for a contiguous set of OFDM symbols are designated for a given payload whose expected destination is a station or a set of stations. The bandwidth assigned to payloads of the stations STA1 to STA4 depend on the respective payload sizes, on a MCSs and numbers of spatial streams that the AP determines for the respective sub-band transmissions, and on the overall considerations that the AP needs to address in order to align the length or duration of various PSDU sub-bands.

The DL OFDMA PPDU 800 includes a first portion 804 including an L-STF, an L-LTF, and an L-SIG field based on IEEE Std 802.11n and 802.11ac. The symbols in these fields serve to make the DL OFDMA PPDU 800 compatible with legacy designs and products.

The L-STF, L-LTF, and L-SIG symbols of the first portion 804 are modulated using a Fourier Transform (FT) size of 64 on a 20 MHz channel and are duplicated within each 20 MHz channel of the DL OFDMA PPDU 800 when the DL OFDMA PPDU 800 has a bandwidth wider than 20 MHz.

The first portion 804 also includes an HE-SIG-A field. The symbols of the HE-SIG-A field may carry necessary information regarding each PSDU and regarding the RF, PHY, and MAC properties of the DL OFDMA PPDU 800.

The DL OFDMA PPDU 800 includes an HE-SIG-B field 806. The symbols of the HE-SIG-B field 806 may carry necessary information regarding each PSDU and regarding the RF, PHY, and MAC properties of the DL OFDMA PPDU 800. In an embodiment, the HE-SIG-B field 806 may not always be present in all DL OFDM PPDUs and is not present in UL OFDMA PPDUs.

When the DL OFDMA PPDU 800 has a bandwidth of 40 MHz or more, the HE-SIG-B field 712 may be transmitted in first and second HE-SIG-B channels 1 and 2 respectively including an HE-SIG-B1 field and an HE-SIG-B2 field. The HE-SIG-B1 field and the HE-SIG-B2 field are communicated in first and second 20 MHz bandwidths of the DL OFDMA PPDU 800, respectively, and may contain different information. The HE-SIG-B1 and HE-SIG-B2 fields are duplicated within each 40 MHz bandwidth of the DL OFDMA PPDU 800 when the DL OFDMA PPDU 800 has a bandwidth of 80 MHz or more.

In an embodiment, the HE-SIG-A field of the first portion 804 and HE-SIG-B field 806 are modulated using an FT size of 64. In another embodiment, the HE-SIG-A field of the first portion 804 and HE-SIG-B field 806 are modulated using an FT size of 256. In another embodiment, the HE-SIG-A field of the first portion 804 are modulated using an FT size of 64 and the HE-SIG-B field 806 are modulated using an FT size of 256.

The DL OFDMA PPDU 800 includes HE-STF and HE-LTF symbols in a second portion 810. The HE-STF and HE-LTF symbols are used to perform necessary RF and PHY processing for each PSDU in the DL OFDMA PPDU 800, for the whole DL OFDMA PPDU 800, or both. Depending on whether the HE-STF and HE-LTF symbols in the second portion 810 are beamformed or not, there might be two or more sets of such symbols.

The DL OFDMA PPDU 800 includes a Multi-User (MU) payload region 812. The MU payload region 812 includes first, second, third, and fourth unicast PSDUs 814, 816, 818, and 820 intended for the first, second, third, and fourth stations STA1, STA2, STA3, and STA4, respectively. Each unicast PSDU 814, 816, 818, and 820 contains a respective payload that is destined to the respective stations STA1, STA2, STA3, and STA4 plus necessary MAC padding and PHY padding. The unicast PSDU 814, 816, 818, and 820 are sub-band PSDUs.

A bandwidth of the MU payload region 812 is divided into one or more Resource Units (RUs), and each of the PSDUs 814, 816, 818, and 820 are allocated one or more of the RUs. In an embodiment, an RU is allocated to no more than one PSDU.

In an embodiment including MU-MIMO communications, an RU may be allocated to a plurality of PSDUs destined for respective stations, each of the plurality of PSDUs being communicated in a respective set of one or more spatial streams within the bandwidth of the RU.

The unicast PSDUs 814, 816, 818, and 820 are destined to respective stations that are associated with the AP. The presence and length of unicast PSDUs 814, 816, 818, and 820 in respective one or more sub-bands and the respective stations that are the recipients of the unicast PSDUs 814, 816, 818, and 820 may be indicated by the HE-SIG-A field, the HE-SIG-B field, or both.

In an embodiment, the DL OFDMA PPDU 800 may include a full-band transmission region (not shown) for unicast or broadcast/multicast full-band PSDU(s). The full-band transmission region may be an optional region in a DL OFDMA PPDU 800 and may have a variable length. The full-band transmission region includes one or more sequential symbols that each covers the whole bandwidth of the DL OFDMA PPDU 800 and that occur before the start of a MU payload region 812. The full-band transmission region may not be present in an UL OFDMA PPDU.

When the full-band transmission region is present in the DL OFDMA PPDU 800, there may be a set of HE-STF and/or HE-LTF symbols that immediately precede the full-band PSDUs included in the full-band transmission region (not shown), where the set of HE-STF and/or HE-LTF symbols are not beamformed. The one or more full-band PSDUs in the full-band transmission region 808 could be carried with FT size=64 or FT size=256 according to a design choice to have the full-band PSDUs in the full-band transmission region 808 carried with FT size=64 as the HE-SIG-A field is or carried with FT size=256 as the MU payload region 812 is.

One or more of a Broadcast full-band PSDU, a Multicast full-band PSDU, and a unicast full-band PSDUs may be located in the full-band transmission region and destined to all, some, or one, respectively, of the stations that are associated with the AP. The presence and length of the full-band PSDUs may be indicated in the HE-SIG-A field, the HE-SIG-B field, or both.

Each PSDU in the DL OFDMA PPDU 800, whether full-band or sub-band, contains a payload that is destined to a station, or to several stations, plus the necessary MAC padding and PHY padding.

FIG. 9 illustrates Resource Unit (RU) definitions in a 20 MHz bandwidth 900 according to an embodiment. Within the 20 MHz bandwidth 900 are defined:

first to ninth 26-tone RUs 902, 904, 906, 908, 910, 912, 914, 916, and 918, each occupying approximately 2 MHz of the bandwidth, first to fourth 52-tone RUs 922, 924, 926 and 928, each occupying approximately 4 MHz of the bandwidth, first and second 106-tone RUs 932 and 934, each occupying approximately 8 MHz of the bandwidth, and a 242-tone RU 940 occupying 40 MHz of the bandwidth.

FIG. 10 illustrates RU definitions in a 40 MHz bandwidth 1000 according to an embodiment. Within the 40 MHz bandwidth 1000 are defined:

first to eighteenth 26-tone RUs 1002, 1004, 1006, 1008, 1010, 1012, 1014, 1016, 1018, 1022, 1024, 1026, 1028, 1030, 1032, 1034, 1036, and 1038, each occupying approximately 2 MHz of the bandwidth, first to eighth 52-tone RUs 1042, 1044, 1046, 1048, 1052, 1054, 1056, and 1058, each occupying approximately 4 MHz of the bandwidth, first to fourth 106-tone RUs 1062, 1064, 1066, and 1068, each occupying approximately 8 MHz of the bandwidth, first and second 242-tone RUs 1072 and 1074, each occupying 20 MHz of the bandwidth, and a 484-tone RU 1076 occupying 40 MHz of the bandwidth.

Figure 11:
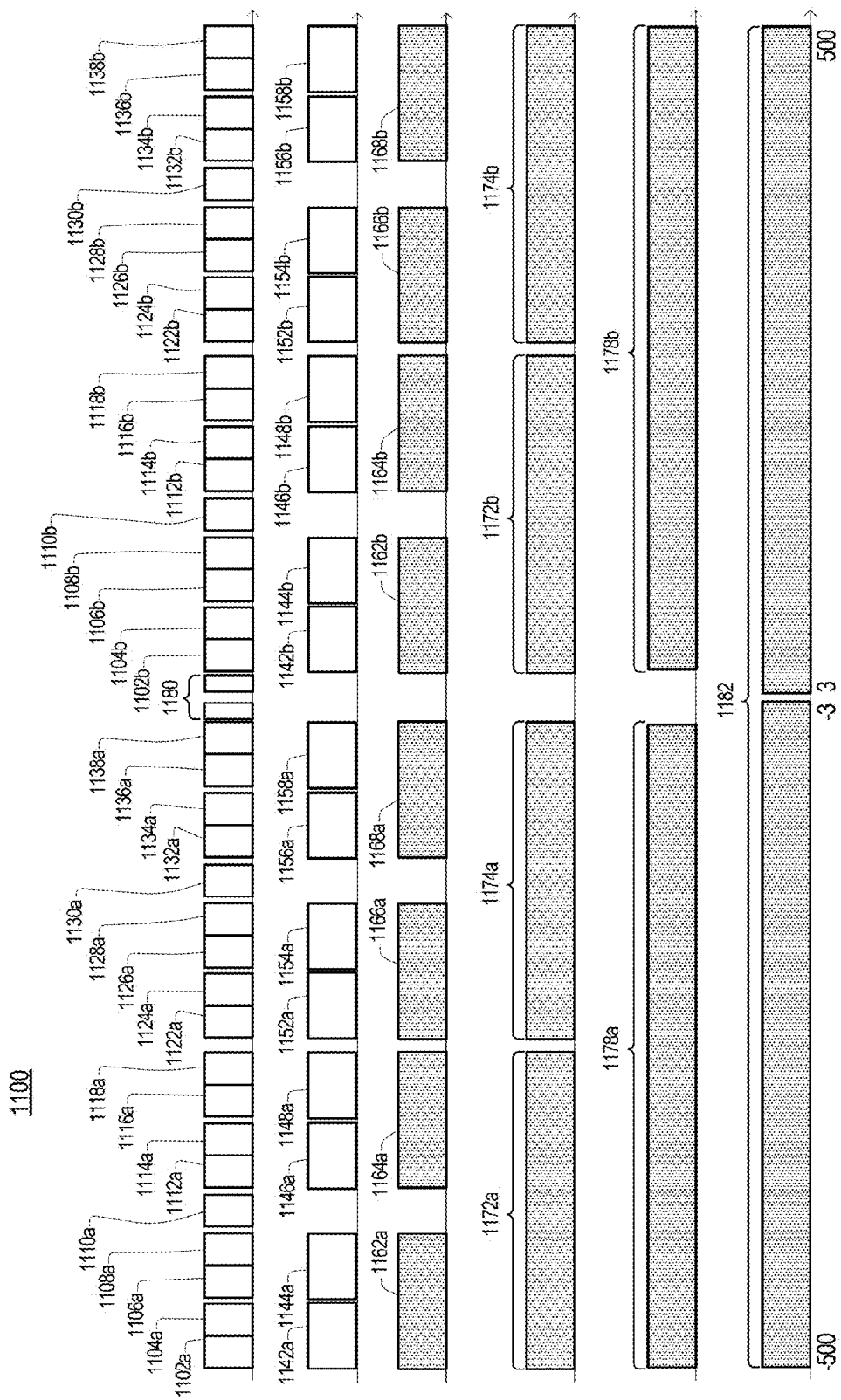
FIG. 11 illustrates RU definitions in an 80 MHz bandwidth, according to an embodiment.

FIG. 11 illustrates RU definitions in an 80 MHz bandwidth 1100 according to an embodiment. Within the 80 MHz bandwidth 1100 are defined:

first to eighteenth 26-tone RUs 1102a, 1104a, 1106a, 1108a, 1110a, 1112a, 1114a, 1116a, 1118a, 1122a, 1124a, 1126a, 1128a, 1130a, 1132a, 1134a, 1136a, and 1138a, each occupying approximately 2 MHz of the bandwidth of a left (lower) 40 MHz of the 80 MHz bandwidth 1100, a nineteenth 26-tone RU 1180 occupying a center 2 MHz bandwidth of the 80 MHz bandwidth 1100, twentieth to thirty-seventh 26-tone RUs 1102b, 1104b, 1106b, 1108b, 1110b, 1112b, 1114b, 1116b, 1118b, 1122b, 1124b, 1126b, 1128b, 1130b, 1132b, 1134b, 1136b, and 1138b, each occupying approximately 2 MHz of the bandwidth of a right (upper) 40 MHz of the 80 MHz bandwidth 1100, first to eighth 52-tone RUs 1142a, 1144a, 1146a, 1148a, 1152a, 1154a, 1156a, and 1158a, each occupying approximately 4 MHz of the bandwidth of the left 40 MHZ, ninth to sixteenth 52-tone RUs 1142b, 1144b, 1146b, 1148b, 1152b, 1154b, 1156b, and 1158b, each occupying approximately 4 MHz of the bandwidth of the right 40 MHZ, first to fourth 106-tone RUs 1162a, 1164a, 1166a, and 1168a, each occupying approximately 8 MHz of the bandwidth of the left 40 MHZ, fifth to eighth 106-tone RUs 1162b, 1164b, 1166b, and 1168b, each occupying approximately 8 MHz of the bandwidth of the right 40 MHZ, first and second 242-tone RUs 1172a and 1174a, each occupying 20 MHz of the bandwidth of the left 40 MHZ, third and fourth 242-tone RUs 1172b and 1174b, each occupying 20 MHz of the bandwidth of the right 40 MHZ, first and second 484-tone RUs 1178a and 1178b occupying the left 40 MHz and the right 40 MHz, respectively, and a 996-tone RU 1182 occupying 80 MHz of the bandwidth.

For the RUs of FIGS. 9, 10, and 11, MU-MIMO is not supported on RUs whose sizes are smaller than 106 tones.

And, a bandwidth being used to provide a 26- or 52-tone RU in a PPDU may not be used to provide another RU in the PPDU. For example, if a 2 MHz bandwidth corresponding to first 26-tone RU 902 is used to provide the first 26-tone RU 902 in a 20 MHz PPDU, then the first 52-tone RU 922, the first 106-tone RU 932, and the 242-tone RU 940 are not provided within the 20 MHz PPDU.

MU-MIMO is supported on RUs whose sizes are equal to or greater than 106 tones. Regardless of whether MU-MIMO is used, a bandwidth being used to provide a 106-, 242, 484, or 996-tone RU in the PPDU may not be used to provide another RU in the PPDU. For example, in FIG. 9, if a bandwidth corresponding to first 106-tone RU 932 is used to provide the first 106-tone RU 932 in a 20 MHz PPDU, then the first 26-tone RU 902, the first 52-tone RU 922, and the 242-tone RU 940 are not provided within the 20 MHz PPDU.

A bandwidth allocation to stations (that is, an allocation of respective RUs to the stations) for a DL MU PPDU may be communicated in a HE-SIG-B field. The HE-SIG-B may have dynamic length in IEEE Std 802.11ax. When there are a large number of stations participating in a single MU session, the length of the HE-SIG-B field may become very large. In embodiments, the length of the HE-SIG-B field is reduced by efficient communication of the allocation information included in the HE-SIG-B field.

In embodiments, a transmitting device transmits resource allocation information as well as other control signaling information necessary for correct reception of data signals in one or more HE-SIG-B fields.

In the illustrative embodiments presented below, HE-SIG-B fields (including HE-SIG-B1 and HE-SIG-B2 fields) are illustrated as communicating allocation information regarding bandwidths and spatial streams within PPDUs including the respective the HE-SIG-B fields. However, embodiments are not limited thereto.

Figure 12:
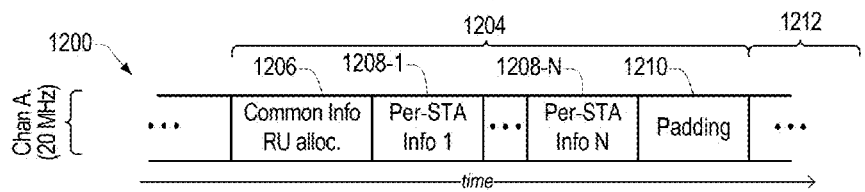
FIG. 12 illustrates a portion of a 20 MHz PPDU including an HE-SIG-B field, according to an embodiment.

FIG. 12 illustrates a portion of a 20 MHz PPDU 1200 including an HE-SIG-B field 1204. The HE-SIG-B field 1204 includes a common control information (common block) field 1206 and one or more station-specific information (per-STA info) subfields 1208-1 to 1208-N. A payload region 1212 follows the HE-SIG-B field 1204. Some details of the HE-SIG-B field 1204 (such as Cyclic Redundancy Check (CRC) bits and tail bits) are omitted in the interest of brevity.

The common field 1206 includes control information that all the stations that are to participate in a communication require in order to participate in the communication, referred to as common information. Each of the one or more per-STA info subfields 1208-1 to 1208-N includes control information that is only intended for use by a specific respective station, which may be referred to us user specific information. The communication can be a Down-Link (DL) communication performed using the payload region 1212 of the PPDU 1200, or an Up-Link (UL) communication performed using a subsequent PPDU. The communication can be a Multi-User (MU) communication using either MU-MIMO, OFDMA, or both MU-MIMO and OFDMA.

The common field 1206 includes an indication of which RUs are allocated for the communication, that is, an RU allocation indication. The common field 1206 also indicates whether each RU allocated for the communication is a Single User (SU) RU or a Multi-User (MU) RU using MU-MIMO.

A per-STA info subfield containing information for a specific user (which may also be referred to as a user field) may be one of two types: an SU per-STA info subfield or an MU per-STA info subfield. Depending on the resource allocation information, each of the one or more per-STA info subfields 1208-1 to 1208-N is one of an SU per-STA info subfield or an MU per-STA info subfield.

An SU per-STA info subfield includes control information for a station participating in an SU-MIMO transmission mode communication using an RU. The control information includes an identifier of the station (STA-ID), a Number of Spatial Streams ($N_{STS}$), a Modulation and Coding Scheme (MCS) indication, a BeamForming (BF) indication, and a Coding indication indicating either Low-Density Parity Coding (LDPC) or Block Convolution Coding (BCC).

An MU per-STA info subfield includes control information for a station participating, along with other stations, in an MU-MIMO transmission mode communication using an RU. The control information includes a STA-ID, an indication of the spatial configuration, an MCS indication, a BF indication, and a Coding indication indicating either LDPC or BCC.

In an embodiment, the indication of the spatial configuration may indicate both the Number of Spatial Streams ($N_{STS}$) allocated to a station corresponding to the STA-ID, the starting spatial stream index ($M_{STS}$) for the station, and the total number ($L_{STS}$) of spatial streams in the MU-MIMO transmission.

In another embodiment, the indication of the spatial configuration may be an index into a spatial configuration table, which when combined with a logical order of a station indicates the first spatial stream and number of spatial streams allocated to the station.

A distinction between SU per-STA info subfields and MU per-STA info subfields is that MU per-STA info subfields contains additional information regarding spatial configuration. In the SU-MIMO transmission mode, each user will occupy $N_{STS}$ spatial streams allocated to that specific user. In the MU-MIMO transmission mode, when the total number of spatial streams is $L_{STS}$, each user will occupy only a subset of the total number spatial streams (that, is the number of spatial streams $N_{STS}$ used by each station participating in the MU-MIMO communication is smaller than $L_{STS}$).

The device transmitting the HE-SIG-B field 1204 must indicate the logical order of each station (indicated by $M_{STS}$) participating in an MU communication in the spatial stream assignments. For example, in an embodiment the transmitter can indicate the starting spatial stream index, $M_{STS}$, and the number of spatial streams, $N_{STS}$, for each user, in the spatial configuration indication of the MU per-STA info subfield. In another embodiment, the logical order of each station is determined using the order of the corresponding per-STA info subfield in the HE-SIG-B field 1204. The logical order may be used for determining the spatial stream indices that each user needs to decode. As long as spatial streams for different MU-MIMO users of an RU do not overlap, each user of the RU can successfully participate in the MU communication.

In an embodiment, an MU per-STA info subfield also includes an indication of the total number of spatial streams, which may be used for determining the number of HE-LTF symbols used in the MU communication.

The HE-SIG-B field 1204 further includes padding 1210.

As shown in FIG. 12, for a 20 MHz PPDU, a single HE-SIG-B field is included in the PPDU. For a 40 MHz PPDU, two HE-SIG-B fields are included in the PPDU: an HE-SIG-B channel 1 (HE-SIG-B1) field and an HE-SIG-B channel 2 (HE-SIG-B2) field, as shown in FIG. 13.

Figure 13:
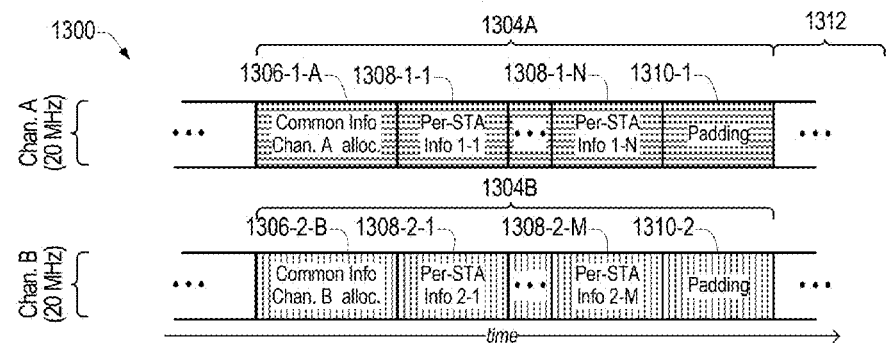
FIG. 13 illustrates a portion of a 40 MHz PPDU including an HE-SIG-B1 field and an HE-SIG-B2 field, according to an embodiment.

FIG. 13 illustrates a portion of a 40 MHz PPDU 1300 including an HE-SIG-B1 field 1304A and an HE-SIG-B2 field 1304B. The HE-SIG-B1 field 1304A is transmitted in a first 20 MHz channel A, and the HE-SIG-B2 field 1304B is transmitted in a second 20 MHz channel B. Some details of the HE-SIG-B1 and HE-SIG-B2 fields 1304A and 1304B (such as CRC bits and tail bits) are omitted in the interest of brevity.

The first 20 MHz channel A corresponds to a first frequency area. The second 20 MHz channel B corresponds to a second frequency area. A combination of the first frequency area and the second frequency area corresponds to a third frequency area.

The HE-SIG-B1 field 1304A includes a Channel A common info subfield 1306-1-A and zero or more per-STA info subfields 1308-1-1 to 1308-1-N. The HE-SIG-B2 field 1304B includes a Channel B common info subfield 1306-2-B and zero or more per-STA info subfields 1308-2-1 to 1308-2-M. The Channel A common info subfield 1306-1-A and the Channel B common info subfield 1306-2-B may be referred to herein as a Channel A RU allocation subfield 1306-1-A and a Channel B RU allocation subfield 1306-2-B, respectively.

A payload region 1312 may follow the HE-SIG-B1 field 1304A and HE-SIG-B2 field 1304B.

Each of the HE-SIG-B1 field 1304A and HE-SIG-B2 field 1304B conveys information about resources in their respective 20 MHz bandwidth. The Channel A common info subfield 1306-1-A includes an indication of which RUs of the first 20 MHz channel A are allocated for the communication. In an embodiment, the Channel A RU allocation subfield 1306-1-A also indicates whether each RU of the first 20 MHz channel A that is allocated is a Single User (SU) RU or a Multi-User (MU) RU.

The Channel B common info subfield 1306-2-B includes an indication of which RUs of the second 20 MHz channel B are allocated for the communication. In an embodiment, the Channel B RU allocation subfield 1306-2-B also indicates whether each RU of the second 20 MHz channel B that is allocated is a Single User (SU) RU or a Multi-User (MU) RU.

The per-STA info subfields 1308-1-1 to 1308-1-N and 1308-2-1 to 1308-2-M operate as described for the per-STA info subfields 1208-1-1 to 1208-1-N of the HE-SIG-B field 1204 of FIG. 12. Each of the per-STA info subfields 1308-1-1 to 1308-1-N and 1308-2-1 to 1308-2-M includes user specific information for an RU of a same 20 MHz bandwidth that the per-STA info subfield is transmitted in.

The HE-SIG-B1 field 1304A and HE-SIG-B2 field 1304B further include respective padding 1310-1 and 1310-2 which may be employed to make the lengths of the HE-SIG-B1 field 1304A and HE-SIG-B2 field 1304B equal.

Figure 14:
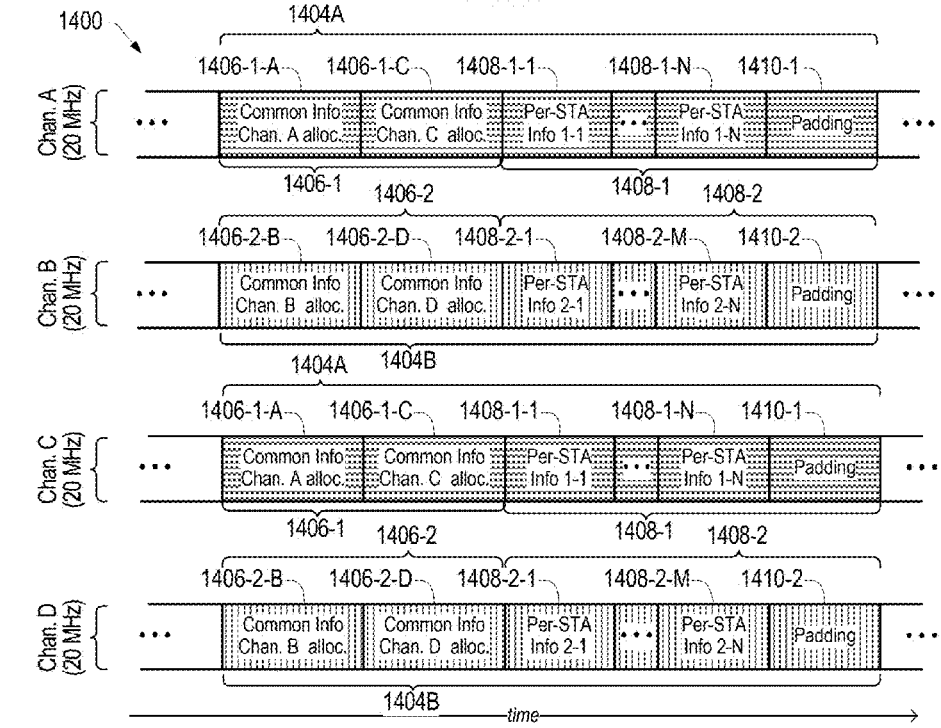
FIG. 14 illustrates a portion of an 80 MHz PPDU including an HE-SIG-B1 field and an HE-SIG-B2 field, according to an embodiment.

FIG. 14 illustrates a HE-SIG-B field of an 80 MHz PPDU 1400 including an HE-SIG-B1 field 1404A and an HE-SIG-B2 field 1404B. In an 80 MHz PPDU, the HE-SIG-B field includes the HE-SIG-B1 field 1404A and an HE-SIG-B2 field 1404B, and each of the HE-SIG-B1 field 1404A and an HE-SIG-B2 field 1404B is replicated twice in the frequency domain. A first copy of the HE-SIG-B1 field 1404A is transmitted in a first 20 MHZ channel A and a second copy of the HE-SIG-B1 field 1404A is transmitted in a third 20 MHZ channel C. A first copy of the HE-SIG-B2 field 1404B is transmitted in a second 20 MHZ channel B and a second copy of the HE-SIG-B2 field 1404B is transmitted in a fourth 20 MHZ channel D. This results in combined HE-SIG-B field that spans 80 MHz.

The first, second, third, and fourth 20 MHz channels A, B, C, and D respectively corresponds to first, second, third, and fourth frequency area. A combination of the first frequency area and the second frequency area corresponds to a fifth frequency area. A combination of the third frequency area and the fourth frequency area corresponds to a sixth frequency area. A combination of the fifth frequency area and the sixth frequency area corresponds to a seventh frequency area.

Each of the HE-SIG-B1 field 1404A and the HE-SIG-B2 field 1404B conveys information about resources in the respective two 20 MHz bandwidths that each is transmitted in.

The HE-SIG-B1 field 1404A includes a first common field 1406-1 and a first user specific field 1408-1 that are duplicated in the frequency domain. The first common field 1406-1 includes a Channel A RU allocation subfield 1406-1-A and a Channel C RU allocation subfield 1406-1-C. In an embodiment, the RU allocation subfields are 8 bits in length. In an embodiment, the RU allocation subfields of the first common field 1406-1 are encoded together The HE-SIG-B2 field 1404B includes a second common field 1406-2 and a second user specific field 1408-2 that are duplicated in the frequency domain. The second common field 1406-2 includes a Channel B RU allocation subfield 1406-2-B and a Channel D RU allocation subfield 1406-2-D. In an embodiment, the RU allocation subfields are 8 bits in length. In an embodiment, the RU allocation subfields of the second common field 1406-2 are encoded together.

The Channel A RU allocation subfield 1406-1-A includes an indication of which RUs of the first 20 MHz channel A are allocated for the communication. For an embodiment, the Channel A RU allocation subfield 1406-1-A may indicates that the channel A is divided into nine 26-tone RUs. For an embodiment, the Channel A RU allocation subfield 1406-1-A may indicates that the channel A is divided into one center 26-tone RU, two 52-tone RUs and one 106-tone RU, and the 106-tone RU is allocated to N users. For an embodiment, the Channel A RU allocation subfield 1406-1-A may indicates that the channel A is combined with the channel B to make a 484-tone RU. In an embodiment, the Channel A RU allocation subfield 1406-2-A also indicates whether each RU of the first 20 MHz channel A that is allocated is a Single User (SU) RU or a Multi-User (MU) RU.

The Channel C RU allocation subfield 1406-1-C includes an indication of which RUs of the third 20 MHz channel C are allocated for the communication. In an embodiment, the Channel C RU allocation subfield 1406-2-C also indicates whether each RU of the third 20 MHz channel C that is allocated is a Single User (SU) RU or a Multi-User (MU) RU.

The Channel B RU allocation subfield 1406-2-B includes an indication of which RUs of the second 20 MHz channel B are allocated for the communication. In an embodiment, the Channel B RU allocation subfield 1406-2-B also indicates whether each RU of the second 20 MHz channel B that is allocated is a Single User (SU) RU or a Multi-User (MU) RU. The Channel D RU allocation subfield 1406-2-D includes an indication of which RUs of the fourth 20 MHz channel D are allocated for the communication. In an embodiment, the Channel D RU allocation subfield 1406-2-D also indicates whether each RU of the fourth 20 MHz channel D that is allocated is a Single User (SU) RU or a Multi-User (MU) RU.

Each of the HE-SIG-B1 field 1404A and HE-SIG-B2 field 1404B includes per-STA info subfields that are duplicated in the frequency domain. The HE-SIG-B1 field 1404A includes the first user specific field 1408-1 including zero or more per-STA info subfields 1408-1-1 to 1408-1-N. The HE-SIG-B2 field 1404B includes the second user specific field 1408-2 including zero or more per-STA info subfields 1408-2-1 to 1408-2-M. The per-STA info subfields 1408-1-1 to 1408-1-N and 1408-2-1 to 1404-2-M operate as described for the per-STA info subfields of FIG. 13.

The HE-SIG-B1 field 1404A and HE-SIG-B2 field 1404B further include respective padding 1410-1 and 1410-2 which may equalize lengths of the HE-SIG-B1 field 1404A and HE-SIG-B2 field 1404B. The padding is duplicated in the frequency domain.

Figure 15:
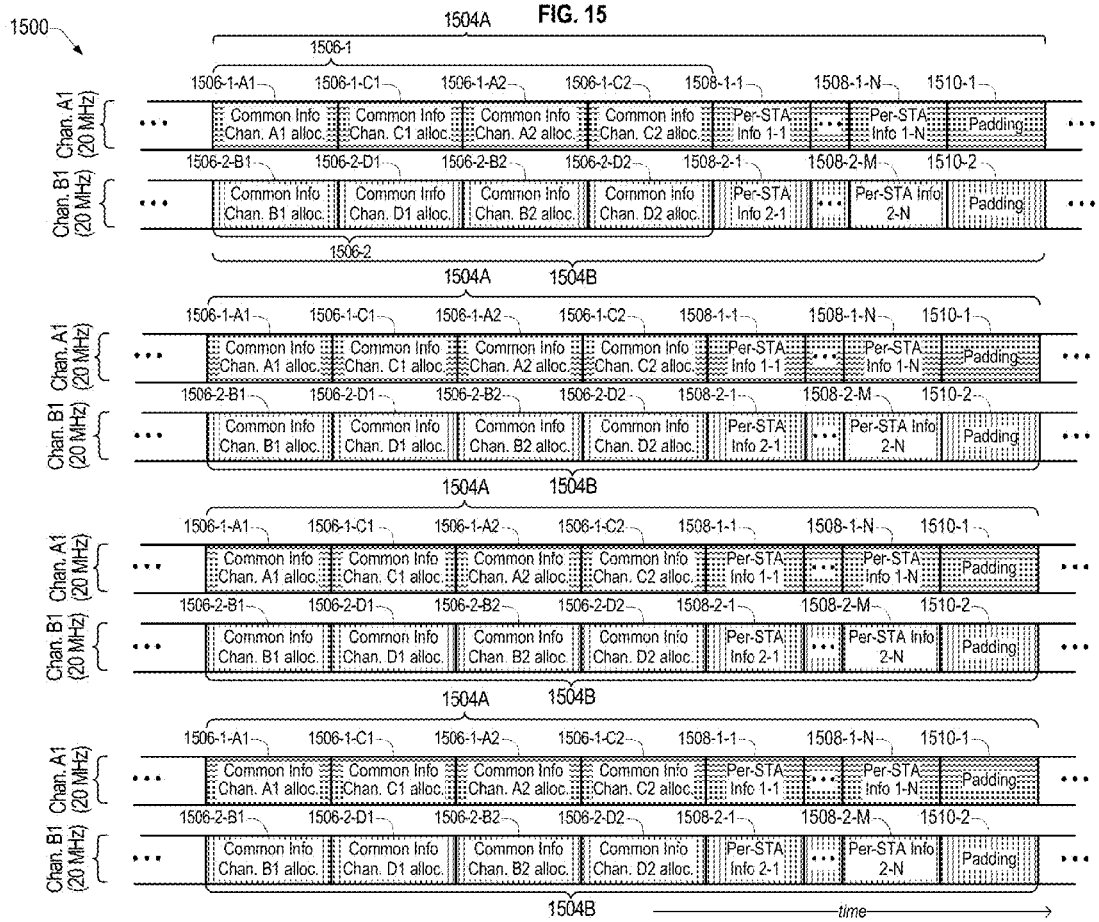
FIG. 15 illustrates a portion of a 160 MHz PPDU including an HE-SIG-B1 field and an HE-SIG-B2 field, according to an embodiment.

FIG. 15 illustrates a portion of a 160 MHz PPDU 1500 including an HE-SIG-B1 field 1504A and an HE-SIG-B2 field 1504B. In a 160 MHz PPDU, each of the HE-SIG-B1 field 1504A and an HE-SIG-B2 field 1504B is replicated four times in the frequency domain. First, second, third, and fourth copies of the HE-SIG-B1 field 1504A are transmitted in first, third, fifth, and seventh 20 MHZ channels A1, C1, A2, and C2, respectively. First, second, third, and fourth copies of the HE-SIG-B2 field 1504B are transmitted in second, fourth, sixth, and eighth 20 MHZ channels B1, D1, B2, and D2, respectively. This results in combined HE-SIG-B field that spans 160 MHz.

The first to eighth 20 MHz channels A1, B1, C1, D1, A2, B2, C2, and D2 respectively correspond to first to eighth frequency areas. A combination of the first frequency area and the second frequency area corresponds to a ninth frequency area. A combination of the third frequency area and the fourth frequency area corresponds to a tenth frequency area. A combination of the fifth frequency area and the sixth frequency area corresponds to an eleventh frequency area. A combination of the seventh frequency area and the eighth frequency area corresponds to a twelfth frequency area.

A combination of the ninth frequency area and the tenth frequency area corresponds to a thirteenth frequency area. A combination of the eleventh frequency area and the twelfth frequency area corresponds to a fourteenth frequency area. A combination of the thirteenth frequency area and the fourteenth frequency area corresponds to a fifteenth frequency area.

Each of the HE-SIG-B1 field 1504A and HE-SIG-B2 field 1504B conveys information about resources in the respective four 20 MHz bandwidths each is transmitted in.

The HE-SIG-B1 field 1504A includes a first common field 1506-1 that is duplicated in the frequency domain. The first common field 1506-2 that includes a Channel A1 RU allocation subfield 1506-1-A1, a Channel C1 RU allocation subfield 1506-1-C1, a Channel A2 RU allocation subfield 1506-1-A2, and a Channel C2 RU allocation subfield 1506-1-C2. In an embodiment, the RU allocation subfields of the first common field 1506-1 are encoded together.

The HE-SIG-B2 field 1504B includes a second common field 1506-2 that is duplicated in the frequency domain. The second common field 1506-2 includes a Channel B1 RU allocation subfield 1506-2-B1, and a Channel D1 RU allocation subfield 1506-2-D1, a Channel B2 RU allocation subfield 1506-2-B2, and a Channel D2 RU allocation subfield 1506-2-D2. In an embodiment, the RU allocation subfields of the second common field 1506-2 are encoded together.

The Channel A1 and A2 RU allocation subfields 1506-1-A1 and 1506-1-A2 respectively include indications of which RUs of the first and fifth 20 MHz channels A1 and A2, respectively, are allocated for the communication. The Channel C1 and C2 RU allocation subfields 1506-1-C1 and 1506-1-C2 respectively include indications of which RUs of the third and seventh 20 MHz channels C1 and C2 are allocated for the communication. In an embodiment, the Channel A1, A2, C1, and C2 RU allocation subfields 1506-1-A1, 1506-1-A2, 1506-1-C1, and 1506-1-C2 each indicate whether the RUs allocated for use by each are respectively SU or MU RUs.

The Channel B1 and B2 RU allocation subfields 1506-2-B1 and 1506-2-B2 respectively include indications of which RUs of the second and sixth 20 MHz channels B1 and B2 are allocated for the communication. The Channel D1 and D2 RU allocation subfields 1506-2-D1 and 1506-2-D2 respectively include indications of which RUs of the fourth and eighth 20 MHz channels D1 and D2 are allocated for the communication. In an embodiment, the Channel B1, B2, D1, and D2 RU allocation subfields 1506-2-B1, 1506-2-B2, 1506-2-D1, and 1506-2-D2 each indicate whether the RUs allocated for use by each are respectively SU or MU RUs.

Each of the HE-SIG-B1 field 1504A and HE-SIG-B2 field 1504B includes per-STA info subfields that are duplicated in the frequency domain. The HE-SIG-B1 field 1504A includes zero or more per-STA info subfields 1508-1-1 to 1508-1-N. The HE-SIG-B2 field 1504B includes zero or more per-STA info subfields 1508-2-1 to 1508-2-M. The per-STA info subfields 1508-1-1 to 1508-1-N and 1508-2-1 to 1504-2-M operate as described for the per-STA info subfields of FIG. 13.

The HE-SIG-B1 field 1504A and HE-SIG-B2 field 1504B further include respective padding 1510-1 and 1510-2 that may equalize lengths of the HE-SIG-B1 field 1504A and HE-SIG-B2 field 1504B. The padding is duplicated in the frequency domain.

In embodiments, spatial multiplexing of data signals for different users (that is, MU-MIMO) can be used with frequency multiplexing of data signals for different users (that is, OFDMA) within a PPDU. A plurality of users can use a same OFDMA RU by each using a respective sets of one or more spatial streams of the OFDMA RU.

For MU-MIMO multiplexing of an RU having a bandwidth equal to or less than 20 MHz, all of the user control information regarding the RU is confined within one of an HE-SIG-B, HE-SIG-B1, or HE-SIG-B2 field transmitted in the same 20 MHz channel as the RU.

However, for MU-MIMO multiplexing of an OFDMA RU having a bandwidth greater than 20 MHz (for example, a 484-tone RU having a bandwidth of 40 MHz, or an 996-tone RU having a bandwidth of 80 MHz), the user specific control information (the per-STA info) can be positioned in any one of the HE-SIG-B1 and HE-SIG-B2 fields, because any RU having 484 or more tones will occupy at least one channel including the HE-SIG-B1 field and at least one other channel including the HE-SIG-B2 field.

FIG. 16A illustrates a portion of an 80 MHz PPDU 1600 including a 484-tone RU (MU RU5) spatially multiplexed among three users (stations STA5, STA6, and STA7), according to an embodiment. The PPDU 1600 includes an HE-SIG-B1 field 1604A that contains control information for STA5 and STA6 and an HE-SIG-B2 field 1604B that contains control information for STA7. Some details of the HE-SIG-B1 and HE-SIG-B2 fields 1604A and 1604B (such as CRC bits and tail bits) are omitted in the interest of brevity.

In the 80 MHz PP PPDU 1600 DU, each of the HE-SIG-B1 field 1604A and the HE-SIG-B2 field 1604B is replicated twice in the frequency domain, as described for the HE-SIG-B1 field 1404A and the HE-SIG-B2 field 1404B of FIG. 14. This results in a combined HE-SIG-B field that spans 80 MHz.

Each of the HE-SIG-B1 field 1604A and HE-SIG-B2 field 1604B conveys information about resources in the respective two 20 MHz bandwidths each is transmitted in. The HE-SIG-B1 field 1604A includes a Channel A RU allocation subfield 1606A and a Channel C RU allocation subfield 1606C that are duplicated in the frequency domain. The HE-SIG-B2 field 1604B includes a Channel B RU allocation subfield 1606B and a Channel D RU allocation subfield 1606D that are duplicated in the frequency domain.

The Channel A RU allocation subfield 1606A includes an indication of which RUs of the first 20 MHz channel A are allocated for a communication, and may also indicate whether each RU of the first 20 MHz channel A that is allocated is a Single User (SU) RU or a Multi-User (MU) RU. In the example shown, the Channel A RU allocation subfield 1606A indicates that a first RU 1614 (RU1) having 242 tones in the first 20 MHz channel A is allocated and that the first 242-tone RU1 is allocated for an SU communication.

The Channel B RU allocation subfield 1606B includes an indication of which RUs of the second 20 MHz channel B are allocated for communication, and may also indicate whether each RU of the second 20 MHz channel B that is allocated is a Single User (SU) RU or a Multi-User (MU) RU. In the example shown, the Channel B RU allocation subfield 1606B indicates that in the second 20 MHz channel B, a second RU 1616 (RU2) having 106 tones, a third RU 1618 (RU3) having 26 tones, and a fourth RU 1620 (RU4) having 106 tones are allocated and that each of them is allocated for SU communication.

The Channel C RU allocation subfield 1606C includes an indication of which RUs of the third 20 MHz channel C are allocated for a communication, and may also indicate whether each RU of the third 20 MHz channel C that is allocated is a Single User (SU) RU or a Multi-User (MU) RU. The Channel D RU allocation subfield 1606D includes an indication of which RUs of the fourth 20 MHz channel D are allocated for a communication, and may also indicate whether each RU of the fourth 20 MHz channel D that is allocated is a Single User (SU) RU or a Multi-User (MU) RU.

In the example shown, the Channel C RU allocation subfield 1606C and the Channel D RU allocation subfield 1606D both indicate that a fifth RU 1625 (RU5) having 484 tones in the third and fourth 20 MHz channels C and D is allocated and that the fifth RU RU5 is allocated for an MU communication.

In an embodiment, the Channel C RU allocation subfield 1606C, the Channel D RU allocation subfield 1606D, or the combination of both indicates the number of stations participating in the MU communication for which the fifth RU RU5 is being allocated.

In an embodiment, the Channel C RU allocation subfield 1606C, the Channel D RU allocation subfield 1606D, or the combination of both indicates a distribution of per-STA info subfields related to the fifth RU RU5 among the HE-SIG-B1 field 1604A and the HE-SIG-B1 field 1604B. In the example shown, two per-STA info subfields (MU per-STA info subfields 1608-1-2 and 1608-1-3) in the HE-SIG-B1 field 1604A pertain to stations (STA5 and STA6) participating in the MU communication, and one per-STA info subfield (MU per-STA info subfields 1608-2-4) in the HE-SIG-B2 field 1604B pertains to a station (STAT) participating in the MU communication.

Each of the HE-SIG-B1 field 1604A and HE-SIG-B2 field 1604B includes per-STA info subfields that are duplicated in the frequency domain. The HE-SIG-B1 field 1604A includes three per-STA info subfields 1608-1-1 to 1608-1-3. The HE-SIG-B2 field 1604B includes four per-STA info subfields 1608-2-1 to 1608-2-4.

The first HE-SIG-B1 per-STA info subfield 1608-1-1 has an SU type and indicates that a first station STA1 will use the first RU RU1 for an SU communication.

The second HE-SIG-B1 per-STA info subfield 1608-1-2 has an MU type and indicates that a fifth station STA5 will use the fifth RU RU5 as part of an MU communication. The third HE-SIG-B1 per-STA info subfield 1608-1-3 has an MU type indicates that a sixth station STA6 will use the fifth RU RU5 as part of the MU communication.

The first HE-SIG-B2 per-STA info subfield 1608-2-1 has an SU type and indicates that a second station STA2 will use the second RU RU2 for an SU communication. The second HE-SIG-B2 per-STA info subfield 1608-2-2 has an SU type and indicates that a third station STA3 will use the third RU RU3 for an SU communication. The third HE-SIG-B2 per-STA info subfield 1608-2-3 has an SU type and indicates that a fourth station STA4 will use the fourth RU RU4 for an SU communication.

The fourth HE-SIG-B2 per-STA info subfield 1608-2-4 has an MU type indicates that a seventh station STA7 will use the fifth RU RU5 as part of the MU communication.

The HE-SIG-B1 field 1604A further includes padding 1610-1 to make the lengths of the HE-SIG-B1 field 1604A and HE-SIG-B2 field 1604B equal. The padding is duplicated in the frequency domain.

FIG. 16B illustrates the resulting allocation in channels C and D. The HE-SIG-B1 field 1604A indicates that a first set of one or more spatial streams 1624-1 of the fifth RU RU5 is allocated for use by the fifth station STA5, and a second set of one or more spatial streams 1624-2 of the fifth RU RU5 is allocated for use by the sixth station STA6. The HE-SIG-B2 field 1604B indicates that a third set of one or more spatial streams 1624-3 of the fifth RU RU5 is allocated for use by the seventh station STA7.

When an HE-SIG-B1 field and an HE-SIG-B2 field share the communication of allocation information about an MU RU, one, both, or the combination of a common info field in the HE-SIG-B1 field and a common info field in HE-SIG-B2 field indicates how many stations are allocated to use the MU RU. Furthermore, in an embodiment, one, both, or the combination of a common info field in the HE-SIG-B1 field and a common info field in HE-SIG-B2 field indicates how many per-STA info subfields in each of the HE-SIG-B1 field and HE-SIG-B2 field are related to the MU RU.

In an embodiment, for the example shown in FIG. 16A, the RU allocation subfields of the HE-SIG-B1 field 1604A indicates 2 stations using the 484-tone RU RU5. Stations decoding the HE-SIG-B1 field 1604A will understand that there will be two user specific subfields (STA-info subfields) related to the 484-tone RU RU5 in the HE-SIG-B1 field 1604A and that those subfields will have an MU type and be based on an MU subfield format.

The RU allocation subfields of the HE-SIG-B2 field 1604B indicate 1 station using the 484-tone RU RU5. However, in an embodiment wherein RU allocation subfields are not capable of indicating a single-user MU RU, stations decoding just the HE-SIG-B2 field 1604B will not know if the user specific subfield related to the 484-tone RU RU5 (here, per-STA info subfield 1608-2-4) is of the SU type or the MU type. In such an embodiment, if the station has correctly decoded all of the RU allocation subfields of the HE-SIG-B1 field 1604A and the HE-SIG-B2 field 1604B, the station can determine that, because the HE-SIG-B1 field 1604A indicates that that 484-tone RU RU5 is an MU RU, per-STA info subfield 1608-2-4 must be of the MU type. However, the station may not be able to determine this when an error occurs in decoding the RU allocation subfields of the HE-SIG-B1 field 1604A.

Embodiments include an HE-SIG-B field (such an HE-SIG-B1 or HE-SIG-B2 field) that includes a RU allocation subfield capable of indicating whether or not an indicated RU with one user is transmitted using SU or MU-MIMO. That is, when the HE-SIG-B field has exactly one per-STA info field related to an RU, embodiments have a first distinct state (or signaling) for the RU allocation subfield that indicates that the per-STA info field has the SU type, and a second distinct state (or signaling) for the RU allocation subfield that indicates that the per-STA info field has the MU type.

Figure 17A:
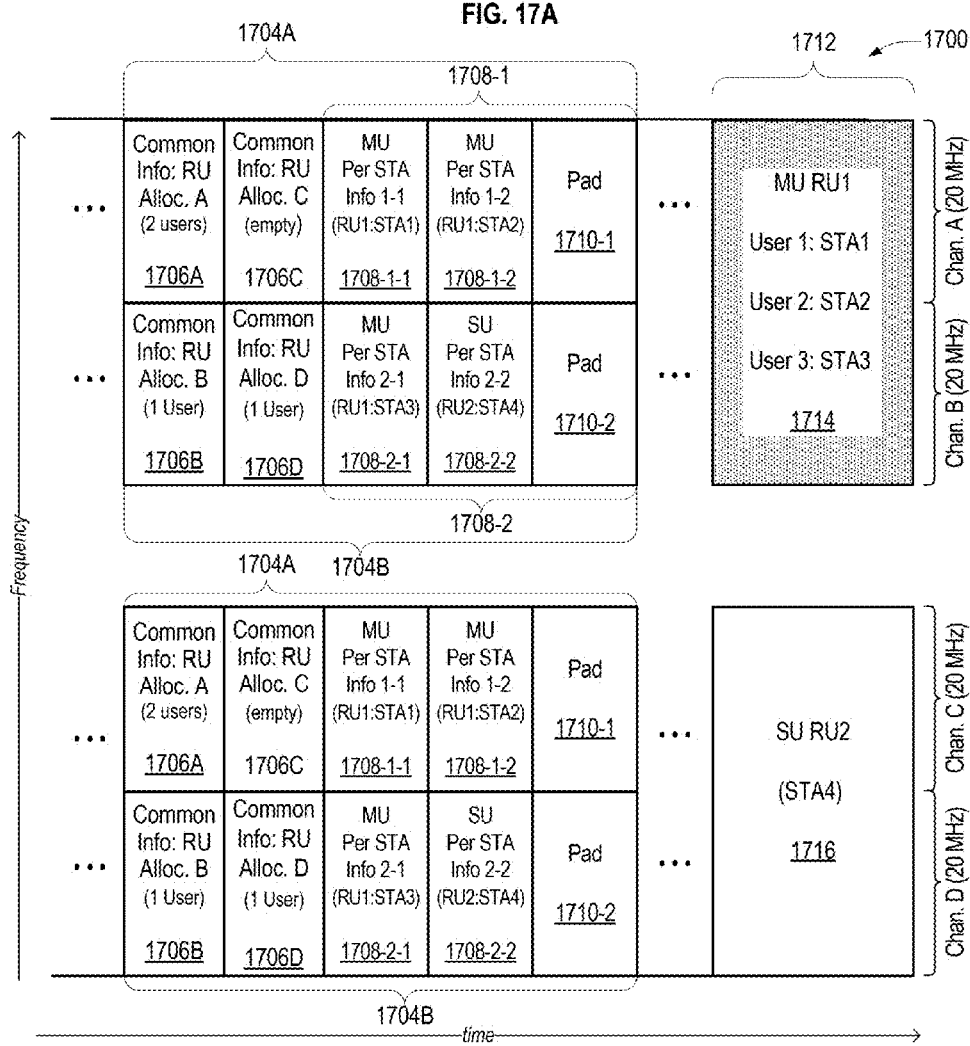
FIG. 17A illustrates a portion of an 80 MHz PPDU including a spatially multiplexed 484-tone RU and a single-user 484-tone RU, according to an embodiment.

FIG. 17A illustrates a portion of an 80 MHz PPDU 1700 including a first 484-tone RU (MU RU1) spatially multiplexed among three users (stations STA1, STA2, and STA3) and a second 484-tone RU (SU RU2) used by a single user (STA4), according to such an embodiment. The PPDU 1700 includes an HE-SIG-B1 field 1704A that contains control information for STA1 and STA2 and an HE-SIG-B2 field 1704B that contains control information for STA3 and STA4.

In the 80 MHz PP PPDU 1700 DU, each of the HE-SIG-B1 field 1704A and the HE-SIG-B2 field 1704B is replicated twice in the frequency domain, as described for the HE-SIG-B1 field 1404A and the HE-SIG-B2 field 1404B of FIG. 14. This results in combined HE-SIG-B field that spans 80 MHz.

Each of the HE-SIG-B1 field 1704A and HE-SIG-B2 field 1704B conveys information about resources in the respective two 20 MHz bandwidths each is transmitted in.

The HE-SIG-B1 field 1704A includes a Channel A RU allocation subfield 1706A and a Channel C RU allocation subfield 1706C. The Channel A RU allocation subfield 1706A and that Channel C RU allocation subfield 1706C are included in a common field that is duplicated in the frequency domain.

The HE-SIG-B2 field 1704B includes a Channel B RU allocation subfield 1706B and a Channel D RU allocation subfield 1706D. The Channel B RU allocation subfield 1706B and that Channel B RU allocation subfield 1706B are included in a common field that is duplicated in the frequency domain.

In the example shown, the Channel A RU allocation subfield 1706A indicates that the first 20 MHz channel A is combined with the second 20 MHz channel B to make a first RU 1714 (RU1) having 484 tones and that a number of user fields 1708-1-1 and 1708-1-2 in the first user specific field 1708-1 that correspond to the first RU 1714 is two.

In the example shown, the Channel B RU allocation subfield 1706B indicates that the second 20 MHz channel B is combined with the first 20 MHz channel A to make the first RU RU1 having 484 tones and that a number of user fields 1708-2-1 in a second user specific field 1708-2 that correspond to the first RU 1714 is one.

The Channel A RU allocation subfield 1706A indicating that the number of user fields 1708-1-1 and 1708-1-2 in a first user specific field 1708-1 that correspond to the first 484-tone RU RU1 is two and the Channel B RU allocation subfield 1706B indicating that the number of user fields 1708-2-1 in the second user specific field 1708-2 that correspond to the first 484-tone RU RU1 is one indicates that the first 484-tone RU R1 has a total of three users (two plus one), which further indicates that user fields 1708-1-1, 1708-1-2, and 1708-2-1 have a MU type.

In an embodiment, the example shown, the Channel C RU allocation subfield 1706C may indicate a "zero assigned user" state (shown as "empty" in FIG. 17A). This is possible because another RU allocation subfield (specifically, Channel D RU allocation subfield 1706D) conveys an indication of the resource assignments for channels C and D, therefore no duplicate indication is needed. In an embodiment, the Channel C RU allocation subfield 1706C may indicate "zero user 484 RU" state, so the Channel C RU allocation subfield 1706C indicates that the third 20 MHz channel C is combined with the fourth 20 MHz channel D to make a second RU 1716 (RU2) having 484 tones and that a number of user fields in the first user specific field 1708-1 that correspond to the second RU 1716 is zero.

In the example shown, the Channel D RU allocation subfield 1706D indicates that the fourth 20 MHz channel D is combined with the third 20 MHz channel C to make a second RU RU2 having 484 tones and that a number of user fields in the second user specific field 1708-2 that correspond to the second 484-tone RU RU2 is one.

The Channel C RU allocation subfield 1706C indicating the number of user fields in the first user specific field 1708-1 that correspond to the second RU 1716 is zero and the Channel D RU allocation subfield 1706D indicating that the number of user fields in the second user specific field 1708-2 that correspond to the second 484-tone RU RU2 is one, indicates that the second 484-tone RU R2 has a total of one user (zero plus one), which further indicates that the user field 1708-2-2 is of the SU type.

Each of the HE-SIG-B1 field 1704A and HE-SIG-B2 field 1704B includes per-STA info subfields that are duplicated in the frequency domain. The HE-SIG-B1 field 1704A includes two HE-SIG-B1 per-STA info subfields 1708-1-1 and 1708-1-2. The HE-SIG-B2 field 1704B includes two HE-SIG-B2 per-STA info subfields 1708-2-1 and 1708-2-2.

In an embodiment, the type (between SU and MU) of the per-STA info fields in the HE-SIG-B1 field 1704A may be determined using the information in the Channel A and C RU allocation subfields 1706A and 1706C. In the example of FIG. 17A, the Channel A RU allocation subfield 1706A indicates that two stations are using one or more RUs to perform one or more MU communications, which indicates that the first and second HE-SIG-B1 per-STA info subfields 1708-1-1 and 1708-1-2 are of the MU type. The Channel C RU allocation subfield 1706C indicates that no stations are using RUs, indicating that there are no additional per-STA info subfields in the HE-SIG-B1 field 1704A. The total number of per-STA info subfields in the HE-SIG-B1 field 1704A includes one per-STA info subfield for each station indicated in either of the Channel A and C RU allocation subfields 1706A and 1706C.

In an embodiment, the type (between SU and MU) of the per-STA info fields in the HE-SIG-B2 field 1704A may be determined using the information in the Channel B and D RU allocation subfields 1706B and 1706D. In the example of FIG. 17A, the Channel B RU allocation subfield 1706B indicates that one station is using an RU to perform an MU communication, indicating that the first HE-SIG-B2 per-STA info subfield 1708-2-1 is of the MU type. The Channel D RU allocation subfield 1706D indicates one station is using an RU to perform an SU communication, indicating that the second HE-SIG-B2 per-STA info subfield 1708-2-2 is of the SU type. The total number of per-STA info subfields in the HE-SIG-B2 field 1704B includes one per-STA info subfield for each station indicated in each of the Channel B and D RU allocation subfields 1706B and 1706D.

The first HE-SIG-B1 per-STA info subfield 1708-1-1 indicates that a first station STA1 will use the first RU RU1 as part of an MU communication. The second HE-SIG-B1 per-STA info subfield 1708-1-2 indicates that a second station STA2 will also use the first RU RU1 as part of an MU communication.

The first HE-SIG-B2 per-STA info subfield 1708-2-1 indicates that a third station STA3 will use the first RU RU1 as part of an MU communication.

The second HE-SIG-B2 per-STA info subfield 1708-2-2 indicates that a fourth station STA4 will use the second RU RU2 for an SU communication.

The HE-SIG-B1 field 1704A and HE-SIG-2 field 1704B further include respective padding 1710-1 and 1710-2 which may make the lengths of the HE-SIG-B1 field 1704A and HE-SIG-B2 field 1704B equal. The padding is duplicated in the frequency domain.

Figure 17B:
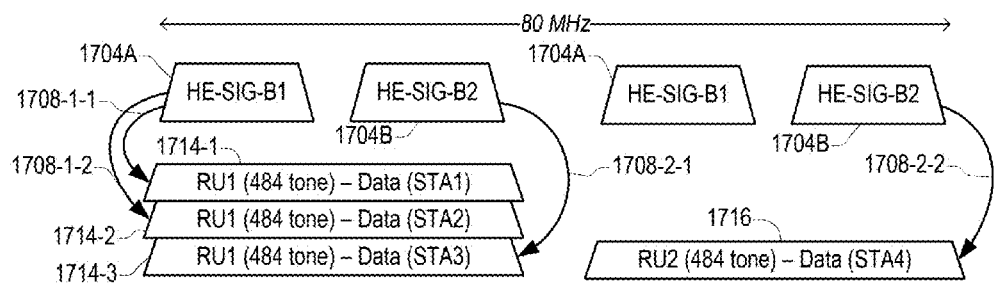
FIG. 17B illustrates an allocation in an 80 MHz bandwidth corresponding to the PPDU of FIG. 17A, according to an embodiment.

FIG. 17B illustrates the resulting allocation in the 80 MHz bandwidth. The HE-SIG-B1 field 1704A indicates that a first set of one or more spatial streams 1714-1 of the first RU RU1 is allocated for use by the first station STA1, and that a second set of one or more spatial streams 1714-2 of the first RU RU1 is allocated for use by the second station STA2. The HE-SIG-B2 field 1704B indicates that a third set of one or more spatial streams 1714-3 of the first RU RU1 is allocated for use by the seventh station STAT, and that the second RU RU2 is allocated for SU use by the fourth station STA4.

As demonstrated in FIGS. 17A and 17B, the HE-SIG-B1 field 1704A in a first 20 MHz channel and the HE-SIG-2 field 1704B in a second 20 MHz channel can each simultaneously allocate spatial streams of a 40 MHz (484 tone) or larger RU, and the per-STA info subfields related to the 40 MHz or larger RU can be distributed among (that is, shared by or split between) the HE-SIG-B1 field 1704A and the HE-SIG-2 field 1704B. As a result, the communication of allocation information for the 40 MHz or larger RU can be load balanced across the HE-SIG-B1 field 1704A and the HE-SIG-2 field 1704B, which can reduce the length of the HE-SIG-B field portion of the PPDU 1700. Embodiments include signaling mechanisms to indicate this shared communication of allocation information for 40 MHz or larger RUs by HE-SIG-B1 and HE-SIG-2 fields.

Referring to FIGS. 17A and 17B, the per-STA info subfields 1708-1-1 and 1708-1-2 included in the HE-SIG-B channel 1 (HE-SIG-B1) that correspond to the same RU 1714 indicated by RU allocation subfields 1706A and 1706B are sequentially ordered in the user specific field 1708-1 of the HE-SIG-B1 based on spatial stream indices corresponding to the per-STA info subfields. The per-STA info subfields 1708-2-1 included in the HE-SIG-B channel 2 (HE-SIG-B2) that correspond to the same RU 1714 indicated by RU allocation subfields 1706A and 1706B are sequentially ordered in the user specific field 1708-2 of the HE-SIG-B2 based on spatial stream indices corresponding to the per-STA info subfields. The orders of the per-STA info subfields 1708-1-1 and 1708-1-2 included in the HE-SIG-B channel 1 (HE-SIG-B1) precede orders of the per-STA info subfields 1708-2-1 included in the HE-SIG-B channel 2 (HE-SIG-B2).

In an illustrative example, the station STA1 has two spatial streams whose starting spatial stream index is 0, the station STA2 has one spatial stream whose starting spatial stream index is 2, the station STA3 has three spatial streams whose starting spatial stream index is 3. The AP determines to locate two per-STA info subfields in the HE-SIG-B1, and one per-STA info subfield in the HE-SIG-B2. The AP locates the per-STA info subfield 1708-1-1 for STA1 and per-STA info subfield 1708-1-2 for STA2 in the user specific field 1708-1 of the HE-SIG-B1 so that the per-STA info subfield 1708-1-1 is located before the per-STA info subfield 1708-1-2, because the starting spatial stream index of STA1 is lower than the starting spatial stream index of STA2. And the AP locates the per-STA info subfield 1708-2-1 for STA3 in the user specific field 1708-2 of the HE-SIG-B2, because the starting spatial stream index of STA3 is lower than the starting spatial stream indices of STA1 and STA2. The stations STA1, STA2, and STA3 can obtain the total number of spatial streams, the number of spatial stream allocated to the each station, and an order of the per-STA info subfield of the each station within per-STA info subfields, and can determine their starting spatial stream indices based on them.

FIGS. 18A, 18B, 18C, and 18D, show first, second, third, and fourth parts, respectively of Table 1. Table 1 is a table of index values used in RU allocation subfields of an HE-SIG-B field (such as an HE-SIG-B1 field or an HE-SIG-B2 field) for indicating RU allocations, according to an embodiment. That is, Table 1 is an RU allocation table, according to the embodiment.

Each RU allocation subfield includes 8 bits indicating an index that corresponds to a resource allocation structure shown in Table 1.

For example, an index value of 2 indicates that there are first to fifth per-STA info subfields in the HE-SIG-B field, and that the first to fifth per-STA info subfields correspond to a first 52-tone RU, a second 52-tone RU, a 26-tone RU, a third 52-tone RU, and a fourth 52-tone RU, respectively, sequential arranged in the frequency domain, and that the first to fifth per-STA info subfields are SU-type per-STA info subfields.

For another example, an index value of 17 indicates that there are first to third per-STA info subfields in the HE-SIG-B field, and that the first to third per-STA info subfields correspond to a first 106-tone RU, a 26-tone RU, and a second 106-tone RU, respectively, sequential arranged in the frequency domain, and that the first to third per-STA info subfields are SU-type per-STA info subfields.

For another example, an index value of 18 indicates that there are first to fourth per-STA info subfields in the HE-SIG-B field, and that the first to fourth per-STA info subfields correspond to a first 106-tone RU, a 26-tone RU, a first set of spatial streams of a second 106-tone RU, and a second set of spatial streams of the second 106-tone RU (because the second 106-tone RU has two users). The second 106-tone RU having 2 users corresponds to an MU-MIMO transmission mode. The index value of 18 therefore indicates that the first and second per-STA info subfields are of the SU type, and that the third and fourth per-STA info subfields are of the MU type.

For another example, an index value of 153 indicates that there is one per-STA info subfields in the HE-SIG-B field, that the per-STA info subfield correspond to a 484-tone RU, and that the per-STA info subfield is of the SU type. An index value of 153 indicates that there is one per-STA info subfields in the HE-SIG-B field, that the per-STA info subfield correspond to a 484-tone RU, and that the per-STA info subfield is of the MU type. Similar indication exist in Table 1 for 996-tone RU allocations (index values 162 and 163).

Additionally, a "zero user assigned" state may be included in the RU allocation table, which is used to indicate no assignment from the RU allocation subfield. Index value 0 is used for this purpose in the embodiment shown in Table 1. The other RU allocation subfields within the common field may indicate resource assignment.

In other embodiments, the RU allocation table may include values corresponding to one or more of a zero user 484-tone RU indication, a zero user 996-tone RU indication, and a zero user 2×996-tone RU indications, respectively indicating that 484-tone, 996-tone, and 2×996-tone RUs are assigned but that no corresponding per-STA info subfield will be included in the HE-SIG-B field that includes the RU allocation subfield.

When an HE-SIG-B field includes a plurality of RU allocation subfields, the indications of the RU allocation subfields are sequentially combined. For example, is an HE-SIG-B1 field includes a Channel A RU allocation subfield having a value of 2 and a Channel C RU allocation subfield having a value of 18, then there are first to fifth per-STA info subfields in the HE-SIG-B field each having SU-type and respectively corresponding to a first 52-tone RU, a second 52-tone RU, a 26-tone RU, a third 52-tone RU, and a fourth 52-tone RU sequential arranged in the frequency domain of Channel A, and also sixth to ninth per-STA info subfields in the HE-SIG-B field, respectively having the SU type, SU type, and MU type, and MU type, and respectively corresponding to a first 106-tone RU, a 26-tone RU, a first set of spatial streams of a second 106-tone MU RU, and a second set of spatial streams of the second 106-tone MU RU, the latter RUs being sequential arranged in the frequency domain of Channel C.

The above embodiment may use additional bits, other than the 8 bits used in the RU allocation table shown in Table 1, to signal the allocation of the special center 26 RU (for example, 26-tone RU 1180 shown in FIG. 11) that is present in 80 MHz and 160 MHz PPDUs.

FIGS. 19A, 19B, 19C, and 19D show first, second, third, and fourth parts, respectively, of Table 2. Table 2 is an RU allocation table for use in an HE-SIG-B field (such as an HE-SIG-B1 field or an HE-SIG-B2 field), according to another embodiment. In the embodiment of Table 2, a maximum number of MU-MIMO users is limited to 8 per 20 MHz channel.

Entries are provided in Table 2 to support indication of the allocation of the special center 26 RU in 80 MHz and 160 MHz, shown as column "S-RU" in Table 2. The NA in the S-RU column indicates that there is no assignment of the special center 26 RU. The special center 26 RU in 80 MHz is, for example, the 26-tone RU 1180 shown in FIG. 11.

Table 2 also includes distinct entries specifically for SU MIMO and single-user MU MIMO allocations of 484-tone and 996-tone RUs.

In another embodiment, states 100 to 197 in Table 2 are instead mapped to states 128 to 225, respectively. This is equivalent of having a separate bit indication for the special central 26-tone RU and using 7 bits to indicate the rest of the RU assignments in the 8 bit RU allocation unit.

FIGS. 20A, 20B, 20C, and 20D show first, second, third, and fourth parts, respectively, of Table 3. Table 3 is an RU allocation table for use in an HE-SIG-B field (such as an HE-SIG-B1 field or an HE-SIG-B2 field), according to another embodiment. In the embodiment of Table 3, a maximum number of MU-MIMO users is further limited relative to the embodiment of Table 2.

In another embodiment, states 83 to 165 in Table 3 are instead mapped to states 128 to 210, respectively. This is equivalent of having a separate bit indication for the special central 26-tone RU and using 7 bits to indicate the rest of the RU assignments in the 8 bit RU allocation unit.

In embodiments where allocation state about the special center 26 RU is indicated using an RU allocation table value carried in an 8 bit field of RU allocation subfields of an HE-SIG-B1 field and an HE-SIG-B2 field, 8 bit fields of different RU allocation subfields may indicate the allocation state of the special center 26-tone RU for first and second 80 MHz bandwidths, respectively, of an 160 MHz transmission.

The first and second special center 26-tone RUs are indicated in different RU allocation units of RU allocation subfields of HE-SIG-B. In an embodiment, each of the HE-SIG-B1 field and the HE-SIG-B2 field indicate the allocation state of both special center 26-tone RUs. For example, in 160 MHz, each of the HE-SIG-B1 field and an HE-SIG-B2 field contains 4 RU allocation units in the common field. Each of the RU allocation units correspond to 20 MHz blocks of the 160 MHz.

In an embodiments, RU allocation units for channels A and B indicate the first special central 26-tone RU, and RU allocation units for channels C and D indication the second special central 26-tone RU.

Because both the special central 26 RUs can be indicated in either of HE-SIG-B1 or HE-SIG-B2, the user specification subfield for the special central 26 RU can be load balanced between HE-SIG-B1 and HE-SIG-B2 (i.e., can be signaled in either of the HE-SIG-B1 or HE-SIG-B2).

Embodiments provide user combination signaling for 484-tone, 996-tone, and 2*996-tone MU RUs.

In an embodiment, a RU allocation subfield of an HE-SIG-B field (such as HE-SIG-B1 or HE-SIG-B2 field) signals a total number of MU-MIMO users allocated to a 484-tone, 996-tone or 2×996-tone RU and indicates a number of users of the RU having user specific information fields (i.e., per-STA info subfields) in the HE-SIG-B field.

Figure 21A:
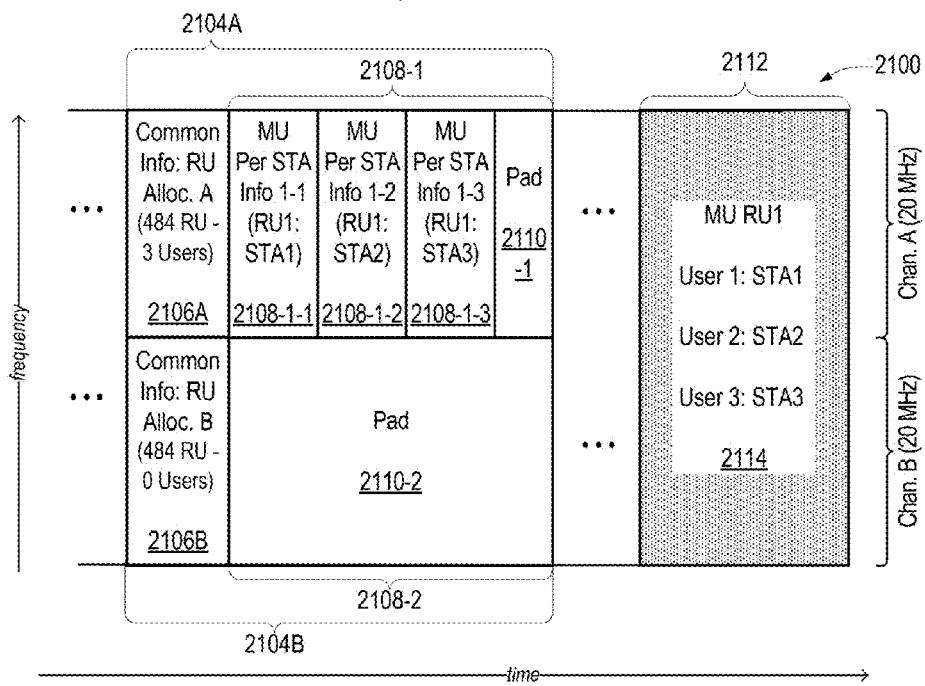
FIG. 21A illustrates portions of a 40 MHz PPDU, according to an embodiment.

FIG. 21A illustrates an example including portions of a 40 MHz PPDU 2100 according to an embodiment. In the 40 MHz PPDU 2100, 3 users (STA1, STA2, STA3) are allocated to a first 484-tone RU 2214 (R1).

The PPDU 2100 includes an HE-SIG-B1 field 2104A that contains control information for stations STA1, STA2, and STA3 and an HE-SIG-B2 field 2104B.

In the 40 MHz PP PPDU 2100 DU, each of the HE-SIG-B1 field 2104A and HE-SIG-B2 field 2104B conveys information about resources in the respective 20 MHz bandwidths each is transmitted in.

The HE-SIG-B1 field 2104A includes a Channel A RU allocation subfield 2106A. The HE-SIG-B2 field 2104B includes a Channel B RU allocation subfield 2106B.

In the example shown, the Channel A RU allocation subfield 2106A indicates that a first RU 2114 (RU1) having 484 tones in first and second 20 MHz channels A and B is allocated, that the first 484-tone RU1 is allocated for an MU communication, is used by three users and that the respective per-STA info fields for the three users are in the HE-SIG-B1 field 2104A.

In the example shown, the Channel B RU allocation subfield 2106B indicates that the first RU RU1 having 484 tones in the first and second 20 MHz channels A and B is allocated and that there are no per-STA info fields related to the first RU RU1 in the HE-SIG-B2 field 2104B.

The Channel A RU allocation subfield 2106A indicating that the first 484-tone RU RU1 is an MU RU having three users and the Channel B RU allocation subfield 2106B indicating that the first 484-tone RU RU1 is an RU having no users indicates that the first 484-tone RU R1 has a total of three (three plus zero) users.

The HE-SIG-B1 field 2104A includes per-STA info subfields that are duplicated in the frequency domain. The HE-SIG-B1 field 2104A includes three HE-SIG-B1 per-STA info subfields 2108-1-1 to 2108-1-3 in a first user specific field 2108-1. Because the Channel B RU allocation subfield 2106B does not indicate that a user is allocated an RU, there are no per-STA info subfields in a second user specific field 2108-2 of the HE-SIG-B2 field 2104B.

In the example of FIG. 21A, the Channel A RU allocation subfield 2106A indicates that three stations are using one or more RUs to perform one or more MU communications, indicating that the first, second, and third HE-SIG-B1 per-STA info subfields 2108-1-1, 2108-1-2, and 2108-1-3 are of the MU type.

The first HE-SIG-B1 per-STA info subfield 2108-1-1 indicates a first station STA1 will use the first RU RU1 as part of an MU communication. The second HE-SIG-B1 per-STA info subfield 2108-1-2 indicates a second station STA2 will use the first RU RU1 as part of the MU communication. The third HE-SIG-B1 per-STA info subfield 2108-1-3 indicates a third station STA3 will use the first RU RU1 as part of the MU communication.

The HE-SIG-B1 field 2104A and HE-SIG-2 field 2104B further include respective padding 2110-1 and 2110-2 which may make the lengths of the HE-SIG-B1 field 2104A and HE-SIG-B2 field 2104B equal.

Figure 21B:
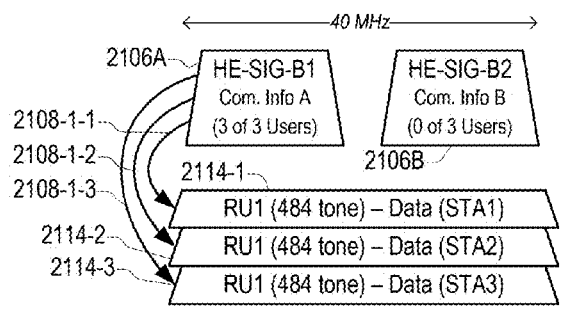
FIG. 21B illustrates an allocation in a 40 MHz bandwidth corresponding to the PPDU of FIG. 21A, according to an embodiment.

FIG. 21B illustrates the resulting allocation in the 40 MHz bandwidth. The HE-SIG-B1 field 2104A indicates that a first set of one or more spatial streams 2114-1 of the first RU RU1 is allocated for use by the first station STA1, a second set of one or more spatial streams 2114-2 of the first RU RU1 is allocated for use by the second station STA2, and a third set of one or more spatial streams 2114-3 of the first RU RU1 is allocated for use by the third station STA3. The first, second, and third stations STA1, STA2, and STA3 are ordered in a MU-MIMO spatial stream allocation as 1st, 2nd, and 3rd users, respectively.

In an embodiment, load balancing of user specific subfields (the per-STA info subfields) can be performed such that, for example, 2 users of a 484-tone, 996-tone, or 2×996-tone RU are scheduled in an HE-SIG-B1 field, and 1 user of the RU is scheduled in the HE-SIG-B2 field. In an embodiment, a first RU allocation subfield in the HE-SIG-B1 field will indicate allocation of the RU to 1 out of 3 users and second RU allocation subfield in the HE-SIG-B2 field will indicate allocation of the RU to 2 out of 3 users.

Furthermore, in an embodiment, an RU allocation subfield of an HE-SIG-B field will indicate whether the users scheduled to use the RU in the HE-SIG-B field are a first set of users or a last set of users. When the users are the first set of users, the users shall be the first (lower) users in the ordering of spatial streams in the MU-MIMO transmission of the RU, with the first user in the ordering of the spatial streams being the user specified in the first per-STA info subfield corresponding to the RU, and so on. When the users are the last set of users, the users shall be the last users in the ordering of spatial streams in the MU-MIMO transmission of the RU, with the last user in the ordering of the spatial streams being the user specified in the last per-STA info subfield corresponding to the RU, and so on. In an embodiment, the per-STA info subfield for each user is logically ordered with the same ordering as the user ordering of the MU-MIMO transmission.

The first set of users having Y out of X users refers to the 1st user to Yth user in the MU-MIMO ordering. The last set of users having Z out of X users, where Y+Z=X, refers to the (X-Z+1)th user to Xth user in the MU-MIMO ordering. In an embodiment, the RU allocation mapping table used for the RU allocation subfields includes respective entries for both a first set of the user and a last set of user for each combination of Y and X wherein Y is equal to or smaller than X and X is less than or equal to a maximum number of users of an RU. For each of the cases where Y and X have identical values, the RU allocation mapping table only needs to include 1 state.

Figure 22A:
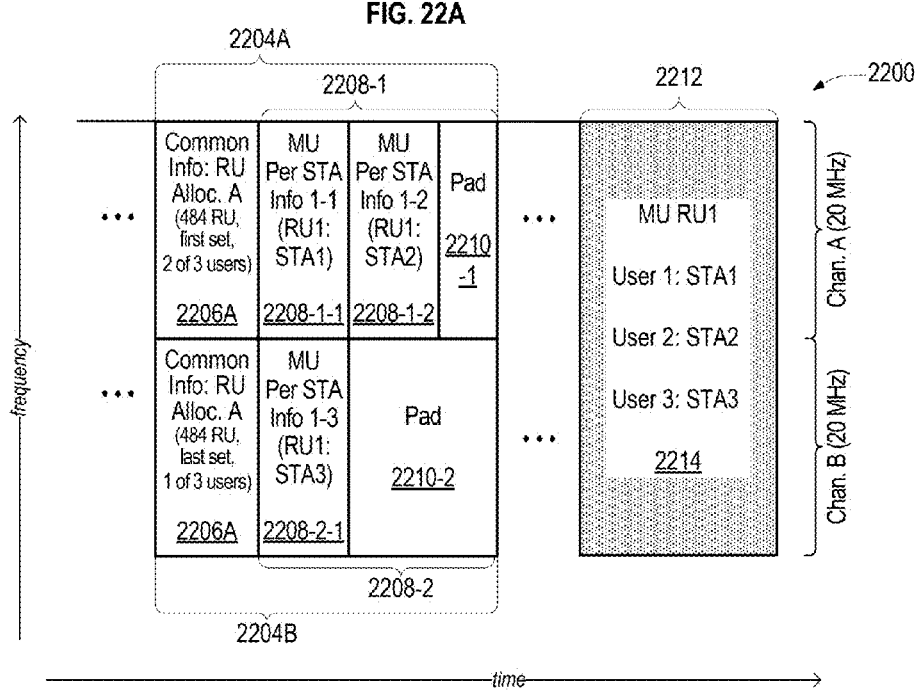
FIG. 22A illustrates portions of a 40 MHz PPDU, according to an embodiment.

FIG. 22A illustrates an example of MU-MIMO allocation to an RU in an 40 MHz PPDU, according to an embodiment. The PPDU 2200 includes an HE-SIG-B1 field 2204A that contains control information for stations STA1 and STA2 and an HE-SIG-B2 field 2204B that contains control information for a station STA3.

In the 40 MHz PP PPDU 2200 DU, each of the HE-SIG-B1 field 2204A each conveys information about resources in respective 20 MHz bandwidths that each is transmitted in, as described for the HE-SIG-B1 field 1404A and the HE-SIG-B2 field 1404B of FIG. 14.

The HE-SIG-B1 field 2204A includes a Channel A RU allocation subfield 2206A. The HE-SIG-B2 field 2204B includes a Channel B RU allocation subfield 2206B.

The Channel A RU allocation subfield 2206A indicates that a first RU 2214 (RU1) having 484 tones in the first and second 20 MHz channels A and B is allocated, that the first 484-tone RU1 is allocated for an MU communication, that the first 484-tone RU1 is used by a total of three users, and that the respective per-STA info fields for the first two users in the ordering of the MU-MIMO spatial streams of the first 484-tone RU1 are in the HE-SIG-B1 field 2204A.

The Channel B RU allocation subfield 2206B indicates that the first RU RU1 having 484 tones in the first and second 20 MHz channels A and B is allocated, that the first 484-tone RU1 is allocated for an MU communication, that the first 484-tone RU1 is used by a total of three users, and that the per-STA info field for the last one user in the ordering of the MU-MIMO spatial streams of the first 484-tone RU1 is in the HE-SIG-B2 field 2204B.

A first user specific field 2208-1 of the HE-SIG-B1 field 2204A includes two HE-SIG-B1 per-STA info subfields 2208-1-1 and 2208-1-2, respectively including information specific to the first and second users in the ordering of the MU-MIMO spatial streams of the first 484-tone RU1.

A second user specific field 2208-2 of the HE-SIG-B2 field 2204B includes one HE-SIG-B2 per-STA info subfield 2208-2-1, which includes information specific to the last (third) user in the ordering of the MU-MIMO spatial streams of the first 484-tone RU1.

The Channel A RU allocation subfield 2206A also indicates that the first and second HE-SIG-B1 per-STA info subfields 2208-1-1 and 2208-1-2 are of the MU type. The Channel B RU allocation subfield 2206B also indicates that the first HE-SIG-B1 per-STA info subfield 2208-2-1 is of the MU type.

The first HE-SIG-B1 per-STA info subfield 2208-1-1 indicates that a first station STA1 will use a first set of spatial streams of the first RU RU1 as part of an MU communication. The second HE-SIG-B1 per-STA info subfield 2208-1-2 indicates that a second station STA2 will use a second set of spatial streams of the first RU RU1 as part of the MU communication.

The first HE-SIG-B2 per-STA info subfield 2208-2-1 indicates that a third station STA3 will use a third set of spatial streams of the first RU RU1 as part of the MU communication.

The HE-SIG-B1 field 2204A and HE-SIG-2 field 2204B further include respective padding 2210-1 and 2210-2 to make lengths of the HE-SIG-B1 field 2204A and HE-SIG-B2 field 2204B equal.

Figure 22B:
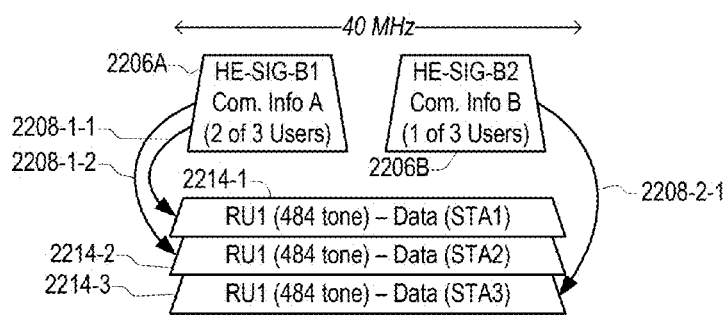
FIG. 22B illustrates an allocation in a 40 MHz bandwidth corresponding to the PPDU of FIG. 22A, according to an embodiment.

FIG. 22B illustrates the resulting allocation in the 40 MHz bandwidth. The HE-SIG-B1 field 2204A indicates that that first set of one or more spatial streams 2114-1 of the first RU RU1 is allocated for use by the first station STA1, and the second set of one or more spatial streams 2114-2 of the first RU RU1 is allocated for use by the second station STA2. The HE-SIG-B2 field 2204B indicates that the third set of one or more spatial streams 2114-3 of the first RU RU1 is allocated for use by the third station STA3. The first, second, and third stations STA1, STA2, and STA3 are ordered in the MU-MIMO spatial stream allocation as 1st, 2nd, and $3^{rd}$ users, respectively.

In the signaling scheme of the embodiment illustrated by FIG. 22A, an RU allocation subfield of an HE-SIG-B1 or HE-SIG-B2 field can indicate, for a 484-tone RU, any of the combinations of RU allocation sharing and MU-MIMO orderings (that is, logical orderings) shown in Table 4 of FIG. 23.

The logical order of a station may be used along with a total number of spatial streams and spatial configuration information included in the MU per-STA info subfield associated with the station to determine the number of spatial streams allocated to the station. For example, the combination of the total number of spatial streams and the spatial configuration information may indicate a row in a predetermined table of spatial stream allocations, and the logical order of the station may identify a column within that row that indicates the number of spatial streams allocated to the station.

Table 4 requires a total of 64 states to indicate the included SU and MU-MIMO indications. In an embodiment, the illustrated combinations of RU allocation sharing and MU-MIMO orderings can be also be signaled for a 996-tone RU and for a 2×996-tone RU, using additional 64 and 63 states, respectively. In an embodiment, the signaling for a 2×996-tone RU does not include an indication for SU.

Table 5 of FIG. 24 is similar to Table 4 but requires only total of 57 states for indicating combinations of RU allocation sharing and MU-MIMO orderings. The difference between Table 4 and Table 5 is that for the 8 user MU-MIMO cases, Table 5 does not indicate which stations are the first and last sets of stations.

The reason that Table 5 does not indicate the first and last sets of stations is that when 8 users are participating in an MU-MIMO communication in an RU, each user is allocated exactly one spatial stream. As a result, the MU-MIMO ordering of the users may not be important, and there may not be any distinction between the first set of the users in MU-MIMO and the last set of users in MU-MIMO. In contrast, when an MU-MIMO communication has less than 7 users and 8 spatial streams are supported, one or more of the users may be allocated more than one spatial stream respectively, with users earlier in the logical ordering have the larger number of spatial streams allocated to them.

FIGS. 25A, 25B, 25C, and 25D show first, second, third, and fourth parts, respectively, of Table 6. Table 6 is an RU allocation table for use in an HE-SIG-B field (such as an HE-SIG-B1 field or an HE-SIG-B2 field), according to another embodiment. In the embodiment of Table 6, an RU allocation subfield of an HE-SIG-B field is capable of indicating a total number of users of an allocated 484-tone, 996-tone, or 2×996-tone RU, a number of the users having user-specific information (that is, per-STA info fields) in the HE-SIG-B field, and whether the users having per-STA info fields in the HE-SIG-B field are in a first set or a last set of MU-MIMO users.

In an embodiment, the required number of signaling states can be reduced from what is shown in Table 5 and Table 6 by defining the user ordering in MU-MIMO between the HE-SIG-B1 field and HE-SIG-B2 field. In the embodiment, there is logical ordering of users participating in MU-MIMO within an RU based on whether the per-STA info subfield for the user is in the HE-SIG-B1 field or the HE-SIG-B2 field.

For example, in an embodiment, lower order users (that is, users in the first set of users, such as the 1st user) are allocated in the HE-SIG-B1 field first. In another embodiment, lower order users are allocated in the HE-SIG-B2 first. Because which of the HE-SIG-B1 and HE-SIG-B2 fields includes the allocation information for the first set of users is predetermined, the RU allocation subfield does not need to indicate which of the HE-SIG-B1 and HE-SIG-B2 fields includes the allocation information for the first set of users, which reduces the number of signaling states need.

For example, in an embodiment, when an MU-MIMO communication is being performed in an RU by five users, the user specific information (the per-STA info subfields) for the five users can be distributed between the HE-SIG-B1 and HE-SIG-B2 fields as 5+0, 1+4, 2+3, 3+2, 4+1, or 0+5 users, respectively. When the users are distributed 1+4 between the HE-SIG-B1 and HE-SIG-B2 fields, respectively, the logical first user's user specific information is signaled in the HE-SIG-B1 field, while the user specific information for the logical second through logical fifth users are signaled in the HE-SIG-B2 field in sequential order.

FIG. 22A, described above, illustrates the users distributed 2+1 between the HE-SIG-B1 and HE-SIG-B2 fields respectively. According to an embodiment, the first user STA1 is the logical first user for the MU-MIMO communication, the second user STA2 is the logical second user for the MU-MIMO communication, and the third user STA3 is the logical third user for the MU-MIMO communication.

In embodiments, the logical ordering of the users participating in the MU-MIMO communication is used in determining the spatial stream indices each user needs to decode.

In a signaling scheme of an embodiment wherein allocation information of a first set of users of an MU-MIMO communication is indicated in an HE-SIG-B1 field and allocation information of a last set of users of an MU-MIMO communication is indicated in an HE-SIG-B2 field, an RU allocation subfield of an HE-SIG-B1 or HE-SIG-B2 field can indicate, for a 484-tone RU, any of the combinations of RU allocation sharing and MU-MIMO orderings (that is, logical orderings) shown in Table 7 of FIG. 26.

Table 7 requires a total of 35 states to indicate the included MU-MIMO indications. In an embodiment, the illustrated combinations of RU allocation sharing and MU-MIMO orderings can be also be signaled for a 996-tone RU and for a 2×996-tone RU, using an additional 37 states for each.

A split in the communication of user specific information between HE-SIG-B1 field and HE-SIG-B2 field can be indicated in an RU allocation subfield using the states shown in Table 7. The Table 7 does not include states for indicating that all of the user specific information is mapped to either HE-SIG-B1 or HE-SIG-B2, which in an embodiment is indicated using separate states of the RU allocation mapping table.

As shown in Table 7, when an RU allocation subfield in an HE-SIG-B1 field indicates "1 out of 2 STAs" for an MU RU, the station indicated in the per-STA info field for that RU in the HE-SIG-B1 field is the first logical user. But when an RU allocation subfield in an HE-SIG-B2 field indicates the same "1 out of 2 STAs" for an MU RU, the station indicated in the per-STA info field for that RU in the HE-SIG-B2 field is the second logical user.

In another example from Table 7, when an RU allocation subfield in an HE-SIG-B1 field indicates "3 out of 5 STAs" for an MU RU, the first, second, and third stations indicated in the first, second, and third per-STA info fields for that RU in the HE-SIG-B1 field are the first, second, and third logical users, respectively. But when an RU allocation subfield in an HE-SIG-B2 field indicates the same "3 out of 5 STAs" for an MU RU, the first, second, and third stations indicated in the first, second, and third per-STA info fields for that RU in the HE-SIG-B2 field are the third, fourth, and fifth logical users, respectively.

FIG. 27 illustrates, as a decision tree, a process for interpreting a value of an RU allocation subfield according to an RU allocation mapping table. Circles in FIG. 27 correspond to decisions based on one or more bits of the RU allocation subfield, the specific bit or bits being indicated next to each circle. Labels on the arcs leaving each circle indicate the state of the corresponding bit or bits that caused the process to follow that arc.

For example, at the start, a first decision is made based on a first bit of the RU allocation subfield. If the first bit is zero, then a second decision is made based on second, third, and fourth bits the RU allocation subfield. If the second, third, and fourth bits are all equal to zero, then third, fourth, fifth, and sixth decisions are made based on the 5th, 6th, seventh, and eighth bits, respectively. If, for example, the $5^{th}$ bit is a zero, then a first portion of a 20 MHz bandwidth is determined to include two 26-tone RUs, and if the $5^{th}$ bit is a one, then the first portion of a 20 MHz bandwidth is determined to include one 52-tone RU.

For allocations including combinations of one or more of 26-tone, 52-tone, and 106-tone RUs, the respective portions of the bandwidths for each RU are vertically ordered within respective 20 MHz bandwidths.

The first bit is used to differentiate between RU allocations having 242-tone, 448-tone, 996-tone, and 2×996-tone RUs (that is, RUs that span at least one 20 MHz channel, indicated by the first bit being a 1), and RU allocations including one or more of 26-tone, 52-tone, and 106-tone RUs (indicated by the first bit being a 0).

Within the RU allocations that include one or more of 26-tone, 52-tone, and 106-tone RUs, values of the next two bits (i.e., the 2nd and $3^{rd}$ bits) indicate different MU-MIMO assignment of {106 RU, 26 RU, 106 RU} allocation in 20 MHz. For example, '000 xxxxx' can be used for 26-tone and 52-tone RU allocations, while '001 xxxxx' is used for {MU-MIMO 106 RU, SU-MIMO 26 RU, SU-MIMO 106 RU} allocation, '010 xxxxx' is used for {SU-MIMO 106 RU, SU-MIMO 26 RU, MU-MIMO 106 RU} allocation, and, '011 xxxxx' is used for {MU-MIMO 106 RU, SU-MIMO 26 RU, MU-MIMO 106 RU} allocations. In case of {MU-MIMO 106 RU, SU-MIMO 26 RU, MU-MIMO 106 RU} allocations in 20 MHz, the signaled number of users in each 106 RU can be from 2 user to 5 users each.

Within the 242/448/996/2×996-tone RU indications (i.e., 1 xxxxxxx), the 2nd and 3rd bits differentiate between a) SU-MIMO/MU-MIMO allocations without a user split between the HE-SIG-B1 and HE-SIG-B2 fields and b) MU-MIMO allocation with a user split (a "Dynamic Split") between the HE-SIG-B1 and HE-SIG-B2 fields. When the MU-MIMO allocation has users split between the HE-SIG- B1 and HE-SIG-B2 fields, the 4th bit differentiates between 484-tone RU MU-MIMO with users split and 996-tone RU MU-MIMO with users split.

Figure 28:
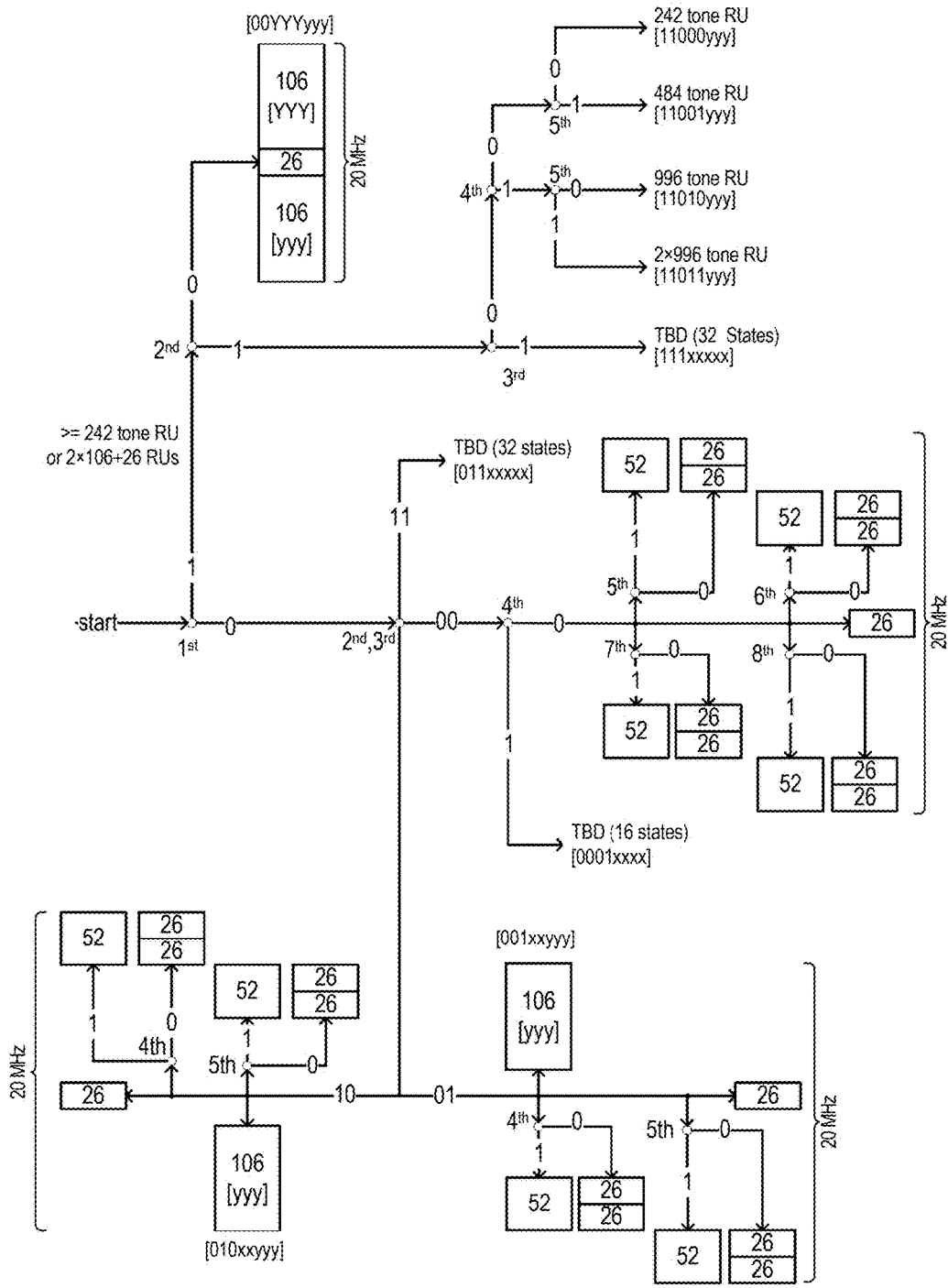
FIG. 28 illustrates a process for interpreting a value of an RU allocation subfield according to an RU allocation mapping table, according to an embodiment.

FIG. 28 illustrates, as a decision tree, a process for interpreting a value of an RU allocation subfield according to an RU allocation mapping table, according to an embodiment. Circles in FIG. 28 correspond to decisions based on one or more bits of the RU allocation subfield, the bits being indicated next to each circle. FIG. 28 is interpreted in the same general manner as described for FIG. 27.

FIG. 28 differs from FIG. 27 in that, among other things, the RU allocation subfield does not include indications of whether the users (or more specifically, the user specific information for the users) of 484-tone or 996-tone MU RUs are split between the HE-SIG-B1 and HE-SIG-B2 fields.

In FIG. 28, bits labeled as "yyy" or "YYY" indicate that a corresponding RU is an SU-MIMO RU when they have a value of zero, and otherwise indicate that the RU is an MU-MIMO RU and the number of users of the RU.

In an embodiment, that the users of a 484-tone or 996-tone RU MU-MIMO are split between the HE-SIG-B1 and HE-SIG-B2 fields is indicated using one or more RU allocation subfield states shown as To Be Determined (TBD) in FIG. 28.

In an embodiment corresponding to FIG. 28, users of 2×996 RU based MU-MIMO will always be equally user split between the HE-SIG-B1 and HE-SIG-B2 for 2×996 RU based MU-MIMO, and as a result there is no need to indicate the split in the RU allocation subfield. When there are an odd number of users of the 2×996 RU based MU-MIMO, the HE-SIG-B1 field may have one more user specific information than the HE-SIG-B2 field.

FIG. 29 includes Table 7, which enumerates the states of an RU allocation mapping table according to the interpretation process shown in FIG. 28. In Table 7, states shown as "reserved" correspond to respective TBD states of FIG. 28.

Embodiments include signaling for RU allocation subfields that restricts the number of distributions of user splits that an RU allocation subfield is capable of indicating to less than all the potential distributions.

FIG. 30 includes Table 8, which enumerates all the potential distributions between HE-SIG-B1 and HE-SIG-B2 fields of user fields (the per-STA info subfields) associated with a 484-tone or 996-tone RU, with and without load balancing (that is, when the split of the user specific information is permitted to be either balanced or unbalanced.) Table 8 demonstrates that signaling all of the potential distributions would require 42 states for each of the 484-tone RU and the 996-tone RU.

In an embodiment, to reduce the number of required states for signaling 484-tone and 996-tone MU-MIMO RU allocations when the user fields (the per-STA info subfields) are split between the HE-SIG-B1 and HE-SIG-B2 fields, the number of signaling possibilities is reduced from the signaling possibilities shown in Table 8.

In Table 8, an 'x' value in an (x,y) pair refers to a number of user specific informations for the one of HE-SIG-B1 and HE-SIG-B2 fields that includes an RU allocation subfield including an indication corresponding to the (x,y) pair, and a 'y' value in the (x,y) pair refers a number of user specific informations for the other of HE-SIG-B1 and HE-SIG-B2 fields in the PPDU.

For example, if a RU allocation field in an HE-SIG-B1 field signals (1,3), then an RU allocation field in the corresponding HE-SIG-B2 field must signal (3,1) for the same RU allocation. This results in 1 user specific information in HE-SIG-B1 and 3 user specific informations in HE-SIG-B2.

The users specific information number combinations that contains 0 users, either (x,0) or (0,y), are signaled by RU allocation field MU-MIMO values that do not indicate load balancing.

With user logical ordering between the HE-SIG-B1 and HE-SIG-B2 fields (as explained above), a total of 28 states for each of 484 or 996 RU based MU-MIMO is needed.

FIG. 31 includes Table 9, which enumerates all the potential distributions between HE-SIG-B1 and HE-SIG-B2 fields of user fields (the per-STA info subfields) associated with a 484-tone or 996-tone RU when load balancing is required. Table 9 demonstrates that signaling all of the potential distributions would require 28 states for each of the 484-tone RU and the 996-tone RU. Table 9 is read in the same manner as described for Table 8.

In order to further reduce the amount of signaling needed for MU-MIMO with load balancing, some entries can be removed from Table 8 or Table 9 by disallowing some splits of users across the HE-SIG-B1 and HE-SIG-B2 fields.

FIG. 32 includes Table 10, which illustrates allowed and disallowed user splits of an Embodiment A. Disallowed user splits are indicated as italicized, struck-through, and in a shaded box.

In Embodiment A, when both load-balanced and non-load-balanced splits of user specific information are to be signaled, 34 states are required to signal the allowed splits. When only load-balanced splits are to be signaled (that is, when splits corresponding to (0,y) or (x,0) are not to be signaled or are signaled using other states), only 20 states are required to signal the allowed splits. Entries which are disallowed are not signaled and are therefore not supported in the 8 bit RU allocation table.

FIGS. 33A and 33B show first and second parts, respectively, of Table 11, which shows an RU allocation table according to embodiment A of Table 10.

FIG. 34 includes Table 12, which illustrates allowed and disallowed user splits of an Embodiment B. Disallowed user splits are indicated as italicized, struck-through, and in a shaded box.

In Embodiment B, when both load-balanced and non-load-balanced splits of user specific information are to be signaled, 32 states are required to signal the allowed splits. When only load-balanced splits are to be signaled (that is, when splits corresponding to (0,y) or (x,0) are not to be signaled or are signaled using other states), only 18 states are required to signal the allowed splits. Entries which are disallowed are not signaled and are therefore not supported in the 8 bit RU allocation table.

FIG. 35 includes Table 13, which illustrates allowed and disallowed user splits of an Embodiment C. Disallowed user splits are indicated as italicized, struck-through, and in a shaded box.

In Embodiment C, when both load-balanced and non-load-balanced splits of user specific information are to be signaled, 32 states are required to signal the allowed splits. When only load-balanced splits are to be signaled (that is, when splits corresponding to (0,y) or (x,0) are not to be signaled or are signaled using other states), only 18 states are required to signal the allowed splits. Entries which are disallowed are not signaled and are therefore not supported in the 8 bit RU allocation table.

FIG. 36 includes Table 14, which illustrates allowed and disallowed user splits of an Embodiment D. Disallowed user splits are indicated as italicized, struck-through, and in a shaded box.

In Embodiment D, when both load-balanced and non-load-balanced splits of user specific information are to be signaled, 30 states are required to signal the allowed splits. When only load-balanced splits are to be signaled (that is, when splits corresponding to (0,y) or (x,0) are not to be signaled or are signaled using other states), only 16 states are required to signal the allowed splits. Entries which are disallowed are not signaled and are therefore not supported in the 8 bit RU allocation table.

FIGS. 37A and 37B show first and second parts, respectively, of Table 15, which shows an RU allocation table according to embodiment D of Table 14.

The allowed entries in Embodiments A, B, C, and D, above, are chosen to provide varying degree of load balancing to the AP. For example, because (8,0) and (0,8) splits of users may be signaled using by non-load balancing MU-MIMO entries, the (1,7) and (7,1) splits are removed in some embodiments as they are only change the split by one user specific information compared to the (8,0) and (0,8) splits, respectively. (8,0) signaling would indicate 8 user specific information in one the HE-SIG-B channel (that is, in one of HE-SIG-B1 and HE-SIG-B2 fields of a PPDU) and 0 user specific information in the other HE-SIG-B channel (that is, in the other of the HE-SIG-B1 and HE-SIG-B2 fields of the PPDU). (7,1) signaling would indicate 7 user specific information in one HE-SIG-B channel and 1 user specific information in the other HE-SIG-B channel.

The dynamic user information split between the HE-SIG-B1 and HE-SIG-B2 fields as described in Embodiments A, B, C, and D, above, can be further compressed by supporting a subset of the user information dynamic loading between the HE-SIG-B1 and HE-SIG-B2 fields.

For example, in an embodiment, 16 states that corresponds to one of the {1/7, 2/6, 3/5, 4/4, 1/6, 2/5, 3/4, 1/5, 2/4, 3/3, 1/4, 2/3, 1/3, 2/2, 1/2, 1/1} user split between HE-SIG-B1 and HE-SIG-B2 or HE-SIG-B2 and HE-SIG-B1 are allowed to be signaled. Depending on whether the one of the 16 states is signaled in the RU allocation subfield within an HE-SIG-B1 field or an HE-SIG-B2 field, a user split between the HE-SIG-B1 and HE-SIG-B2 fields or the HE-SIG-B2 and HE-SIG-B1 fields, respectively, is utilized.

For example, in an embodiment, when the user split is indicated in an HE-SIG-B1 field and not in a corresponding HE-SIG-B2 field, the HE-SIG-B1 field contains the larger number of users specific information subfields indicated for the user split and the HE-SIG-B2 field contains the smaller number of user fields indicated for the user split. In another embodiment, the reverse can be done: the smaller number of users specific information subfields indicated for the user split is in the HE-SIG-B channel carrying the user split indication, and the larger number of users specific information subfields indicated for the user split are the HE-SIG-B channel not carrying the user split indication.

In an embodiment, the user ordering for MU-MIMO is determined so that user specific information of the lower ordered users (that is, a first set of users) are always included in the HE-SIG-B1 field and user specific information of higher order users (that is, a last set of users) are always included in the HE-SIG-B2 field. For example, in an embodiment, when there is sequence of first to fifth users in MU-MIMO and there are five users in total, user specific information of the first, second, and third users in the MU-MIMO ordering are located in HE-SIG-B1 and user specific information of the fourth and fifth users in the MU-MIMO ordering are located in the HE-SIG-B2 field when a 2/3 split is used.

In another embodiment, user specific information of the lower ordered users in the MU-MIMO ordering are allocated in the HE-SIG-B channel (i.e., the one of the HE-SIG-B1 and HE-SIG-B2 fields) that contains the RU allocation subfield indicating the user split mode, and user specific information of the higher ordered users in the MU-MIMO ordering are allocated in the other HE-SIG-B channel.

FIG. 38 includes a Table 16 showing an example of state indications for MU-MIMO for 484-tone RUs and 996-tine RUs, according to an embodiment.

Figure 39:
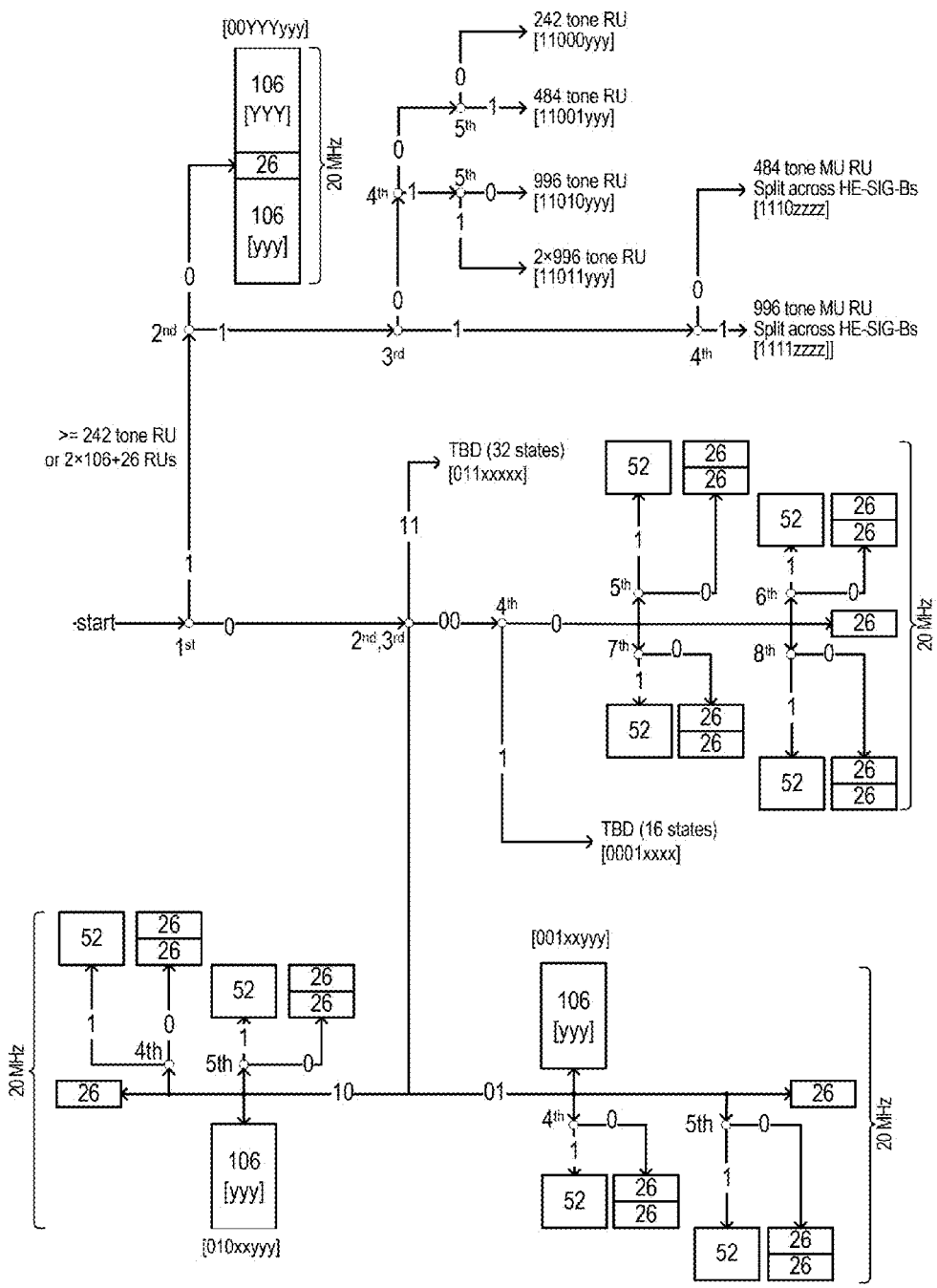
FIG. 39 illustrates a process for interpreting a value of an RU allocation subfield according to an RU allocation mapping table, according to an embodiment.

FIG. 39 illustrates, as a decision tree, a process for interpreting a value of an RU allocation subfield according to an RU allocation mapping table including the state indications shown in Table 16. FIG. 39 is interpreted in the same general manner as described for FIG. 27.

In FIGS. 38 and 39, "zzzz" indicates one of 16 supported user splits. In an embodiment, the indicated user split is one of {1/7, 2/6, 3/5, 4/4, 1/6, 2/5, 3/4, 1/5, 2/4, 3/3, 1/4, 2/3, 1/3, 2/2, 1/2, 1/1}.

FIG. 40 includes a Table 17 which shows an example of state indications for MU-MIMO for 484-tone RUs and 996-tone RUs, according to another embodiment. In Table 17, "zzzz" indicates one of 16 supported user splits. In an embodiment, the indicated user split is one of {1/7, 2/6, 3/5, 4/4, 1/6, 2/5, 3/4, 1/5, 2/4, 3/3, 1/4, 2/3, 1/3, 2/2, 1/2, 1/1}.

In an embodiment, when an RU allocation subfield in an HE-SIG-B1 field of a PPDU indicates an MU-MIMO user split mode for a 484-tone or 996-tone RU, an RU allocation subfield corresponding to the 484-tone or 996-tone RU in an HE-SIG-B2 field of the PPDU indicates no assignment.

In another embodiment, when an RU allocation subfield in an HE-SIG-B2 field of a PPDU indicates an MU-MIMO user split mode for a 484-tone or 996-tone RU, an RU allocation subfield corresponding to the 484-tone or 996-tone RU in an HE-SIG-B1 field of the PPDU indicates no assignment.

In another embodiment, when an RU allocation subfield in an HE-SIG-B1 field of a PPDU indicates an MU-MIMO user split mode for a 484-tone or 996-tone RU, an RU allocation subfield corresponding to the 484-tone or 996-tone RU in an HE-SIG-B2 field of the PPDU indicates a number of user specific subfields included within the HE-SIG-B2 field that carry information for the users of the 484-tone or 996-tone RU.

In another embodiment, when an RU allocation subfield in an HE-SIG-B2 field of a PPDU indicates an MU-MIMO user split mode for a 484-tone or 996-tone RU, an RU allocation subfield corresponding to the 484-tone or 996-tone RU in an HE-SIG-B1 field of the PPDU indicates a number of user specific subfields included within the HE-SIG-B1 field that carry information for the users of the 484-tone or 996-tone RU.

Embodiments include processes for positioning and signaling the positions and subfield types of user fields (that is, per-STA info subfields) within HE-SIG-B1 and HE-SIG-B2 fields of a PPDU. FIGS. 41A, 41B, 42, and 43 show illustrative examples wherein six users are allocated to 484-tone RUs of an 80 MHz PPDU.

In the example, five users are allocated in MU-MIMO using the left 484-tone RU of the 80 MHz PPDU, and one user is allocated in SU-MIMO in the right 484-tone RU of the 80 MHz PPDU. An RU allocation A subfield corresponds to RU allocations of a left most 20 MHz, a left 484-tone RU, and an entire 80 MHz (i.e., 996-tone RU) of the PPDU. An RU allocation B subfield corresponds to the RU allocations of a second from the left 20 MHz, the left 484-tone RU, and the entire 80 MHz of the PPDU RU. An RU allocation C subfield corresponds to the RU allocations of a second from the right 20 MHz, a right 484-tone RU, and the entire 80 MHz of the PPDU RU. An RU allocation D subfield corresponds to the RU allocations of a right most 20 MHz, the right 484-tone RU, and the entire 80 MHz of the PPDU.

FIG. 41A illustrates an HE-SIG-B1 field 4100-1 and an HE-SIG-B2 field 4100-2 of an 80 MHz PPDU, according to an embodiment.

The HE-SIG-B1 field 4100-1 includes a common field (or common block) 4102-1 that includes an RU allocation A subfield 4106A, an RU allocation C subfield 4106C, and a CRC and Tail bits block 4107A.

The HE-SIG-B1 field 4100-1 also includes a per-station information field 4104-1. The per-station information field 4104-1 includes one or more user fields (that is, per-STA info subfields), which are grouped in pairs, each pair having a corresponding CRC and Tail bits block. Here, the per-station information field 4104-1 includes first and second per-STA info subfields 4108-1-1 and 4108-1-2, respectively, grouped with a CRC and Tail bits block 4109A, and third and fourth per-STA info subfields 4108-1-3 and 4108-1-4, respectively, grouped with a CRC and Tail bits block 4109C.

The HE-SIG-B1 field 4100-1 also may include a pad block 4110-1 having pad bits. The pad block 4110-1 may be used to make lengths of the HE-SIG-B1 field 4100-1 and the HE-SIG-B2 field 4100-2 equal.

The HE-SIG-B2 field 4100-2 includes a common field (or common block) 4102-2 that includes an RU allocation B subfield 4106B, an RU allocation D subfield 4106D, and a CRC and Tail bits block 4107B.

The HE-SIG-B2 field 4100-2 also includes a per-station information field 4104-2. The per-station information field 4104-1 includes a fifth and sixth per-STA info subfields 4108-2-1 and 4108-2-2, respectively, grouped with a CRC and Tail bits block 4109B.

The HE-SIG-B2 field 4100-2 also may include a pad block 4110-2 having pad bits. The pad block 4110-2 may be used to make lengths of the HE-SIG-B1 field 4100-1 and the HE-SIG-B2 field 4100-2 equal.

The RU allocation A subfield 4106A, RU allocation B subfield 4106B, RU allocation C subfield 4106C, and RU allocation D subfield 4106D may also be referred to as a Channel A RU allocation subfield, a Channel B RU allocation subfield, a Channel C RU allocation subfield, and a Channel D RU allocation subfield, respectively.

In the example of FIG. 41A, the RU allocation A subfield 4106A includes an indication that the left 484-tone RU of the PPDU is allocated to MU-MIMO with a two/three user split. In the embodiment of FIG. 41A, because the RU allocation A subfield 4106A is in the HE-SIG-B1 field 4100-1, the larger number of users (three) of the left 484-tone RU have their allocation information in the HE-SIG-B1 field 4100-1, and the smaller number of users (two) of the left 484-tone RU have their allocation information in the HE-SIG-B2 field 4100-2. The RU Allocation C subfield 4106C includes an indication that the right 484-tone RU of the PPDU is an SU-MIMO RU having one user. The RU allocation B subfield 4106B and the RU allocation D subfield 4106D indicates no assignment.

In this embodiment, the RU Allocation A-D subfields, taken together, indicated that four per-STA info subfields 4108-1-1 to 4108-1-4 are included in the HE-SIG-B1 field 4100-1 (3 being indicated by RU Allocation A subfield 4106A and one being indicated by RU Allocation C subfield 4106C), and that two per-STA info subfields 4108-2-1 to 4108-2-2 are included in the HE-SIG-B2 field 4100-2 (2 being indicated by RU Allocation A subfield 4106A and none being indicated by the RU allocation B and D subfields 4106B and 4106D.)

The user specific information in the four per-STA info subfields 4108-1-1 to 4108-1-4 of the HE-SIG-B1 field 4100-1 are ordered as STA1, STA2, STA3, and STA6, where STA1, STA2, and STA3 respectively correspond to the 1st, 2nd, and 3rd users in the MU-MIMO ordering for the left 484-tone RU having allocation information in the RU allocation A subfield 4106A, and STA6 is the user allocated to the right 484-tone RU in the RU allocation C subfield 4106C. User specific information in the two per-STA info subfields 4108-2-1 to 4108-2-2 of the HE-SIG-B2 field 4100-2 is ordered as STA4 then STA5, where STA4 and STA5 respectively correspond to the 4th and 5th users in the MU-MIMO ordering for the left 484-tone RU having allocation information in RU allocation A subfield 4106A.

FIG. 41B illustrates the allocation that results from the HE-SIG-B1 and HE-SIG-B2 fields 4100-1 and 4100-2 of FIG. 41A. A left 484-tone RU 4114 of the 80 MHz PPDU is allocated in MU-MIMO to five users STA1 to STA5. The first MU-MIMO user STA1 is allocated a first set of one or more spatial streams 4114-1 in the left 484-tone RU 4114, the second MU-MIMO user STA2 is allocated a second set of one or more spatial streams 4114-2 in the left 484-tone RU 4114, the third MU-MIMO user STA3 is allocated a third set of one or more spatial streams 4114-3 in the left 484-tone RU 4114, the fourth MU-MIMO user STA4 is allocated a fourth set of one or more spatial streams 4114-4 in the left 484-tone RU 4114, and the fifth MU-MIMO user STA5 is allocated a last spatial stream 4114-5 in the left 484-tone RU 4114. A sixth user STA5 is allocated a right 484-tone RU 4116 in SU-MIMO.

Figure 42:
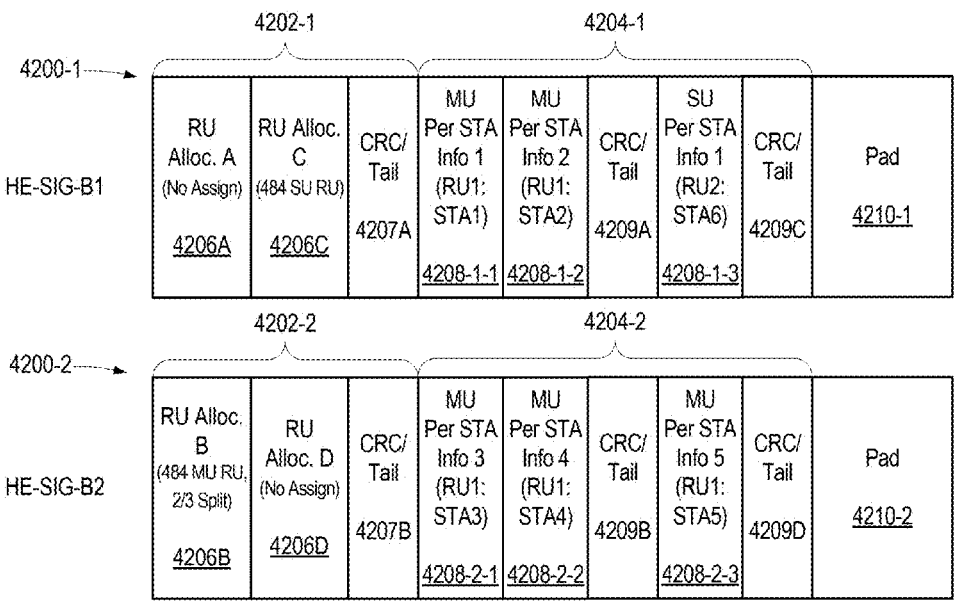
FIG. 42 illustrates an HE-SIG-B1 field and an HE-SIG-B2 field of a PPDU, according to an embodiment.

FIG. 42 illustrates an HE-SIG-B1 field 4200-1 and an HE-SIG-B2 field 4200-2 of an 80 MHz PPDU, according to another embodiment. The HE-SIG-B1 field 4200-1 and HE-SIG-B2 field 4200-2 produce the same allocation shown in FIG. 41B but using different signaling and positioning in the HE-SIG-B1 field 4200-1 and HE-SIG-B2 field 4200-2.

Like-numbered elements of FIG. 42 are similar to the corresponding elements of FIG. 41A; for example, similar to common field 4102-1 of the HE-SIG-B1 field 4100-1 of FIG. 41 that includes an RU allocation A subfield 4106A, an RU allocation C subfield 4106C, and a CRC and Tail bits block 4107A, the common field 4202-1 of the HE-SIG-B1 field 4200-1 of FIG. 42 includes an RU allocation A subfield 4206A, an RU allocation C subfield 4206C, and a CRC and Tail bits block 4207A. Therefore in the interest of brevity, descriptions that are common between FIG. 42 and FIG. 41A have been omitted.

In the example of FIG. 42, the RU allocation A subfield 4206A indicates no assignment, and the RU allocation B subfield 4206B includes an indication that the left 484-tone RU of the PPDU is allocated to MU-MIMO with a two/three user split. In the embodiment of FIG. 42, because the RU allocation B subfield 4206B is in the HE-SIG-B2 field 4200-2, the larger number of users (three) of the left 484-tone RU have their allocation information in the HE-SIG-B2 field 4200-2, and the smaller number of users (two) of the left 484-tone RU have their allocation information in the HE-SIG-B1 field 4200-1. The RU Allocation C subfield 4106C includes an indication that a right 484-tone RU of the PPDU is an SU-MIMO RU having one user. The RU allocation D subfield 4106D indicates no assignment.

In this embodiment, the RU Allocation A-D subfields, taken together, indicate that three per-STA info subfields 4208-1-1 to 4208-1-3 are included in the HE-SIG-B1 field 4200-1 (2 being indicated by the RU Allocation B subfield 4206B and one being indicated by RU Allocation C subfield 4206C), and that three per-STA info subfields 4208-2-1 to 4208-2-3 are included in the HE-SIG-B2 field 4200-1 (3 being indicated by the RU Allocation B subfield 4206B and none being indicated by the RU allocation D subfield 4206D.)

The user specific information in the three per-STA info subfields 4108-1-1 to 4108-1-3 of the HE-SIG-B1 field 4200-1 are ordered as STA1, STA2, and STA6, where STA1 and STA2 respectively correspond to the 1$^{st}$ and 2nd users in the MU-MIMO ordering for the left 484-tone RU having allocation information in the RU allocation B subfield 4206B, and STA6 is the user allocated to the right 484-tone RU in the RU allocation C subfield 4206C. User specific information in the three per-STA info subfields 4108-2-1 to 4108-2-3 of the HE-SIG-B2 field 4200-2 is ordered as STA3, STA4, and STA5, where STA3, STA4, and STA5 respectively correspond to the 3rd, 4th and 5th users in the MU-MIMO ordering for the left 484-tone RU having allocation information in the RU allocation B subfield 4206B.

Figure 43:
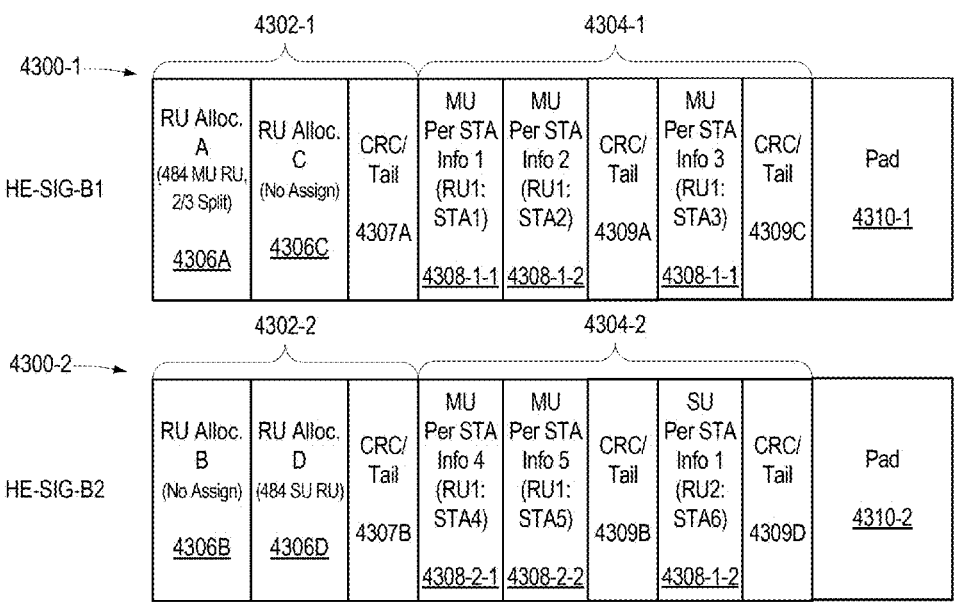
FIG. 43 illustrates an HE-SIG-B1 field and an HE-SIG-B2 field of a PPDU, according to an embodiment.

FIG. 43 illustrates an HE-SIG-B1 field 4300-1 and an HE-SIG-B2 field 4300-2 of an 80 MHz PPDU, according to another embodiment. The HE-SIG-B1 field 4300-1 and HE-SIG-B2 field 4300-2 produce the same allocation shown in FIG. 41B but using different signaling and positioning in the HE-SIG-B1 field 4300-1 and HE-SIG-B2 field 4300-2.

Like-numbered elements of FIG. 43 are similar to the corresponding elements of FIG. 41A; for example, like common field 4102-1 of the HE-SIG-B1 field 4100-1 of FIG. 41 that includes an RU allocation A subfield 4106A, an RU allocation C subfield 4106C, and a CRC and Tail bits block 4107A, the common field 4302-1 of the HE-SIG-B1 field 4300-1 of FIG. 43 includes an RU allocation A subfield 4306A, an RU allocation C subfield 4306C, and a CRC and Tail bits block 4307A. Therefore in the interest of brevity, descriptions that are common between FIG. 43 and FIG. 41A have been omitted.

In the example of FIG. 43, the RU allocation A subfield 4306A includes an indication that the left 484-tone RU of the PPDU is allocated to MU-MIMO with a two/three user split. In the embodiment of FIG. 43, because the RU allocation A subfield 4306A is in the HE-SIG-B1 field 4300-1, the larger number of users (three) of the left 484-tone RU have their allocation information in the HE-SIG-B1 field 4300-1, and the smaller number of users (two) of the left 484-tone RU have their allocation information in the HE-SIG-B2 field 4300-2. The RU Allocation D subfield 4306D includes an indication that the right 484-tone RU of the PPDU is an SU-MIMO RU having one user. The RU allocation B subfield 4306B and the RU allocation C subfield 4306C indicates no assignment.

In this embodiment, the RU Allocation A-D subfields, taken together, indicated that three per-STA info subfields 4308-1-1 to 4308-1-4 are included in the HE-SIG-B1 field 4300-1 (3 being indicated by the RU Allocation A subfield 4306A), and that three per-STA info subfields 4308-2-1 to 4308-2-3 are included in the HE-SIG-B2 field 4100-2 (2 being indicated by the RU Allocation A subfield 4306A and one being indicated by the RU Allocation D subfield 4306D.)

The user specific information in the three per-STA info subfields 4308-1-1 to 4308-1-4 of the HE-SIG-B1 field 4300-1 are ordered as STA1, STA2, and STA3, where STA1, STA2, and STA3 respectively correspond to the 1st, 2nd, and 3rd users in the MU-MIMO ordering for the left 484-tone RU having allocation information in the RU allocation A subfield 4306A. The user specific information in the three per-STA info subfields 4308-2-1 to 4308-2-3 of the HE-SIG-B2 field 4100-2 are ordered as STA4, STA5, and STA6, where STA4 and STA5 respectively correspond to the 4th and 5th users in the MU-MIMO ordering for the left 484-tone RU having allocation information in RU allocation A subfield 4306A and STA6 is allocated to the right 484-tone RU in the RU allocation C subfield 4106D.

In an embodiment, the no user assigned states shown for some RU allocation subfields in FIGS. 41A, 42, and 43 are indicated using an unused state of the 2×996-tone RU allocation. SU-MIMO transmission using 2×996-tone RU is an SU transmission and therefore a PPDU including a 2×996-tone RU allocation does not transmit HE-SIG-B OFDM symbols. Therefore, a state indicating an SU-MIMO allocation of the 2×996-tone RU is a state that is never used for that purpose in an OFDMA context, and may be used in an OFDMA context to indicate no assignment. An example of such use is shown in Table 18 of FIG. 44.

In another embodiment, which does not indicate 'no assignment' for RU allocations of 484-tone or 996-tone RUs in RU allocation subfields, the number of user specific information in an HE-SIG-B channel that correspond to a 484-tone or 996-tone RU using MU-MIMO is conveyed in the same HE-SIG-B channel. The number of user specific information may be from 0 to 7 users. 0 is used when the 484-tone or 996-tone RU is indicated by another RU allocation subfield as being in SU-MIMO. 1 to 7 is used when the 484-tone or 996-tone RU in MU-MIMO is utilizing user split mode.

FIGS. 45, 46, and 47 show Table 19, Table 20, and Table 21, respectively, which show examples of signaling, in each HE-SIG-B channel, the number of user specific information for an allocated 484-tone or 996-tone RU that are in that HE-SIG-B channel, according to such an embodiment.

Figure 48:
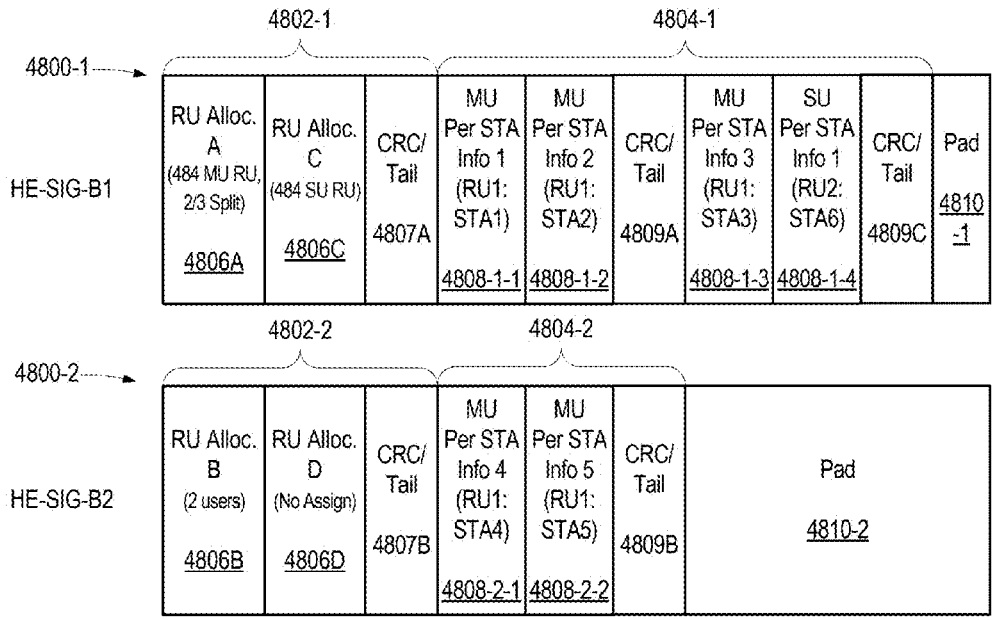
FIG. 48 illustrates an HE-SIG-B1 field and an HE-SIG-B2 field of a PPDU, according to an embodiment.
Figure 49:
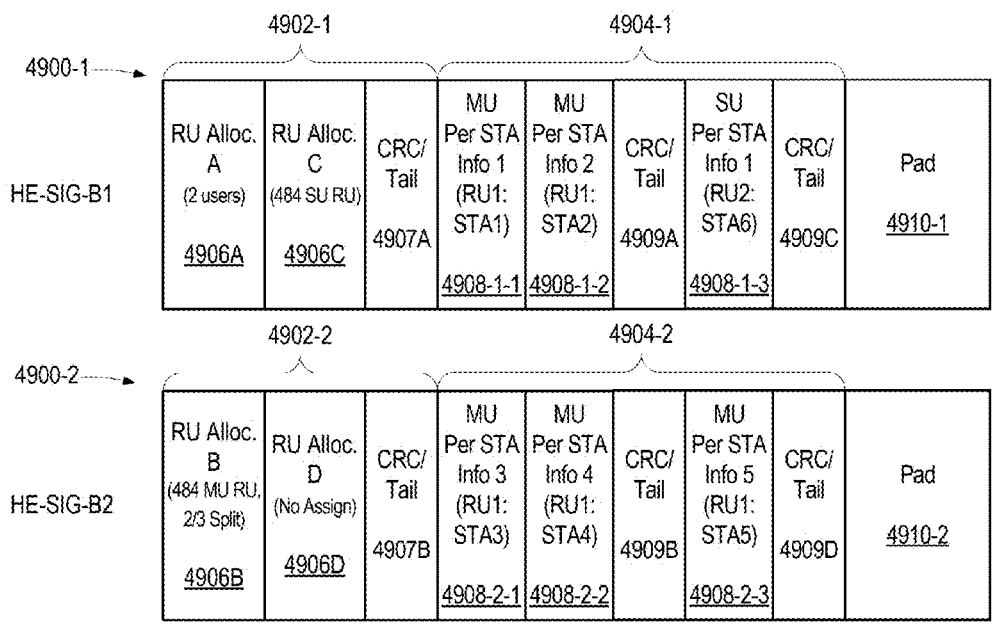
FIG. 49 illustrates an HE-SIG-B1 field and an HE-SIG-B2 field of a PPDU, according to an embodiment.
Figure 50:
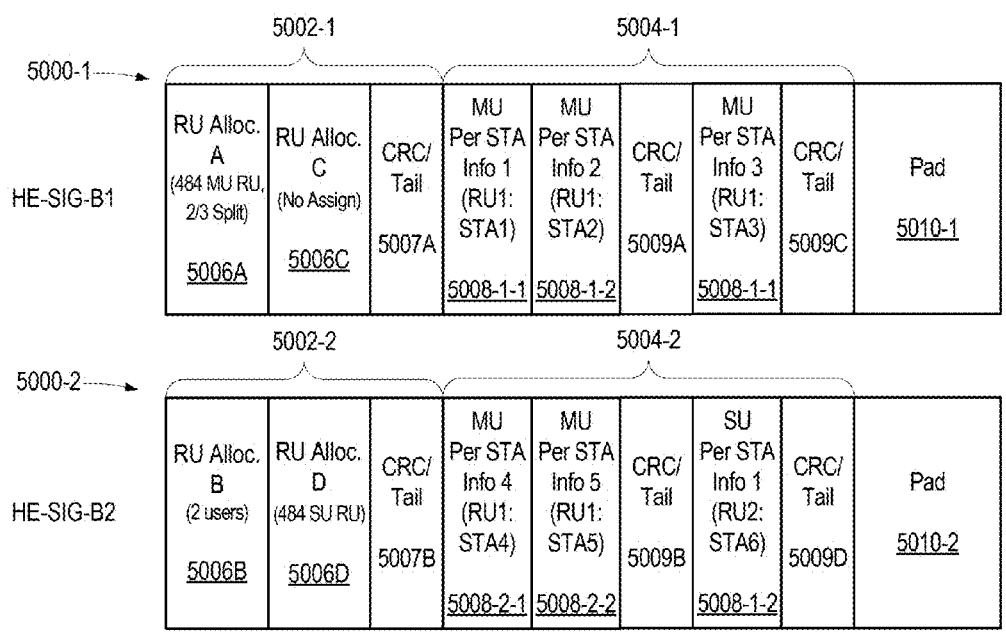
FIG. 50 illustrates an HE-SIG-B1 field and an HE-SIG-B2 field of a PPDU, according to an embodiment.

FIGS. 48, 49, and 50 illustrate embodiments that indicate, in an RU allocation subfield of one HE-SIG-B channel that corresponds to an RU allocation subfield indicating a user split of the other HE-SIG-B channel, a number of user specific information instead of no assignment in the RU allocation subfield, according to embodiments.

FIG. 48 illustrates an HE-SIG-B1 field 4800-1 and an HE-SIG-B2 field 4800-2 of an 80 MHz PPDU, according to an embodiment. The HE-SIG-B1 field 4800-1 and HE-SIG-B2 field 4800-2 produce the same allocation shown in FIG. 41B but using different signaling and positioning in the HE-SIG-B1 field 4800-1 and HE-SIG-B2 field 4800-2.

Like-numbered elements of FIG. 48 are similar to the corresponding elements of FIG. 41A; for example, similar to common field 4102-1 of the HE-SIG-B1 field 4100-1 of FIG. 41 that includes an RU allocation A subfield 4106A, an RU allocation C subfield 4106C, and a CRC and Tail bits block 4107A, the common field 4802-1 of the HE-SIG-B1 field 4800-1 of FIG. 48 includes an RU allocation A subfield 4806A, an RU allocation C subfield 4806C, and a CRC and Tail bits block 4807A. Therefore in the interest of brevity, descriptions that are common between FIG. 48 and FIG. 41A have been omitted.

FIG. 48 differs from FIG. 41A in that the RU allocation B subfield 4806B in the HE-SIG-B2 field 4800-2 indicate the number of user (per-STA info) fields (here, two) in the HE-SIG-B2 field 4800-2 that are for users of the left 484-tone RU that is being allocated for MU-MIMO. In contrast, the RU allocation B subfield 4106B shown in FIG. 41A indicates no assignment.

In the example of FIG. 48, the RU allocation A subfield 4806A indicates a 5 user MU-MIMO in a left 484-tone RU with a 2/3 user split. Because the user split is indicated in the HE-SIG-B1 field 4800-1, the HE-SIG-B1 field 4800-1 contains the larger number (3) of user specific information corresponding to the 5 user MU-MIMO, and the HE-SIG-B2 field 4800-2 contains the smaller number (2) of user information corresponding to the 5 user MU-MIMO. The RU allocation C subfield 4806C indicates 1 user SU-MIMO in a right 484-tone RU.

The RU allocation B subfield 4806B indicates 2 user assignment of a user split. However the RU allocation B subfield 4806B does not necessarily indicate whether the 2 user assignment is because of a 2/1, 2/6, 2/5, 2/4, 2/3, or 2/2 user split. The RU allocation D subfield 4806D indicates no assignment. Therefore, the HE-SIG-B1 field 4800-1 contains a total of 4 user specific information and the HE-SIG-B2 field 4800-2 contains a total of 2 user specific information.

The user specific information in the HE-SIG-B1 field 4800-1 is ordered as STA1, STA2, STA3, and STA 6, where STA1, STA2, and STA3 respectively correspond to the 1st, 2nd, and 3rd users of the MU-MIMO RU. The user specific information in the HE-SIG-B2 field 4800-2 is ordered as STA4 and STA5, where STA4 and STA5 respectively correspond to the 4th and 5th users of the MU-MIMO.

In another embodiment, the RU Allocation A subfield 4806A indicates that there are 3 user (per-STA info) subfields in the HE-SIG-B1 field 4800-1 that are related to the left 484-tone RU being allocated for MU-MIMO, but does not indicate a total number of users of the left 484-tone RU being allocated for MU-MIMO. In such an embodiment, a device may determine the total number of users of the left 484-tone RU being allocated for MU-MIMO by decoding both the RU Allocation A subfield 4806A and the RU Allocation B subfield 4806B.

FIG. 49 illustrates an HE-SIG-B1 field 4900-1 and an HE-SIG-B2 field 4900-2 of an 80 MHz PPDU, according to an embodiment. The HE-SIG-B1 field 4900-1 and HE-SIG-B2 field 4900-2 produce the same allocation shown in FIG. 41B but using different signaling and positioning in the HE-SIG-B1 field 4900-1 and HE-SIG-B2 field 4900-2.

As was described for FIGS. 48 and 41A, above, like-numbered elements of FIG. 49 are similar to the corresponding elements of FIG. 42. Therefore in the interest of brevity, descriptions that are common between FIG. 49 and FIG. 42 have been omitted.

FIG. 49 differs from FIG. 42 in that the RU allocation A subfield 4806A in the HE-SIG-B1 field 4900-1 indicate the number of user (per-STA info) fields (here, two) in the HE-SIG-B1 field 4900-1 that are for users of the left 484-tone RU that is being allocated for MU-MIMO. In contrast, the RU allocation A subfield 4206A shown in FIG. 42 indicates no assignment.

In the example of FIG. 49, the RU allocation B subfield 4906B indicates a 5 user MU-MIMO in a left 484-tone RU with a 2/3 user split. Because the user split is indicated in the HE-SIG-B2 field 4900-2, the HE-SIG-B2 field 4900-2 contains the larger number (3) of user specific information corresponding to the 5 user MU-MIMO, and the HE-SIG-B1 field 4900-1 contains the smaller number (2) of user information corresponding to the 5 user MU-MIMO. The RU allocation D subfield 4906D indicates no assignment.

The RU allocation A subfield 4906A indicates 2 user assignment of a user split. However the RU allocation A subfield 4906A does not necessarily indicate whether the 2 user assignment is because of a 2/1, 2/6, 2/5, 2/4, 2/3, or 2/2 user split. The RU allocation C subfield 4806C indicates 1 user SU-MIMO in a right 484-tone RU. Therefore, the HE-SIG-B1 field 4900-1 contains a total of 3 user specific information and the HE-SIG-B2 field 4900-2 contains a total of 3 user specific information.

The user specific information in the HE-SIG-B1 field 4900-1 is ordered as STA1, STA2, and STA 6, where STA1 and STA2 respectively correspond to the 1st and 2nd users of the MU-MIMO RU. The user specific information in the HE-SIG-B2 field 4900-2 is ordered as STA3, STA4, and STA5, where STA3, STA4, and STA5 respectively correspond to the 3rd, 4th, and 5th users of the MU-MIMO.

FIG. 50 illustrates an HE-SIG-B1 field 5000-1 and an HE-SIG-B2 field 5000-2 of an 80 MHz PPDU, according to an embodiment. The HE-SIG-B1 field 5000-1 and an HE-SIG-B2 field 5000-2 produce the same allocation shown in FIG. 41B but using different signaling and positioning in the HE-SIG-B1 field 5000-1 and HE-SIG-B2 field 5000-2.

Like-numbered elements of FIG. 50 are similar to the corresponding elements of FIG. 43. Therefore in the interest of brevity, descriptions that are common between FIG. 50 and FIG. 43 have been omitted.

FIG. 50 differs from FIG. 43 in that the RU allocation B subfield 4806B in the HE-SIG-B2 field 5000-2 indicate the number of user (per-STA info) fields (here, two) in the HE-SIG-B2 field 5000-2 that are for users of the left 484-tone RU that is being allocated for MU-MIMO. In contrast, the RU allocation B subfield 4206B shown in FIG. 43 indicates no assignment.

In the example of FIG. 50, the RU allocation A subfield 5006A indicates a 5 user MU-MIMO in a left 484-tone RU with a 2/3 user split. Because the user split is indicated in the HE-SIG-B1 field 5000-1, the HE-SIG-B1 field 5000-1 contains the larger number (3) of user specific information corresponding to the 5 user MU-MIMO, and the HE-SIG-B2 field 5000-2 contains the smaller number (2) of user information corresponding to the 5 user MU-MIMO. The RU allocation C subfield 5006C indicates no assignment.

The RU allocation B subfield 5006B indicates 2 user assignment of a user split. However the RU allocation B subfield 5006B does not necessarily indicate whether the 2 user assignment is because of a 2/1, 2/6, 2/5, 2/4, 2/3, or 2/2 user split. The RU allocation D subfield 4806D indicates 1 user SU-MIMO in a right 484-tone RU. Therefore, the HE-SIG-B1 field 5000-1 contains a total of 3 user specific information and the HE-SIG-B2 field 5000-2 contains a total of 3 user specific information.

The user specific information in the HE-SIG-B1 field 5000-1 is ordered as STA1, STA2, and STA3, where STA1, STA2, and STA3 respectively correspond to the 1st, 2nd, and 3rd users of the MU-MIMO RU. The user specific information in the HE-SIG-B2 field 5000-2 is ordered as STA4, STA5, and STA6 where STA4 and STA5 respectively correspond to the 4th and 5th users of the MU-MIMO.

FIGS. 51, 52, and 53 show Tables 22, Table 22, and Table 24, respectively. Tables 22, Table 22, and Table 24 are examples of the 16 states of the user split mode indication of a 484-tone or 996-tone RU in the RU allocation subfield according to various embodiments.

Table 22 shows user splits where the HE-SIG-B channel containing the RU allocation subfield that has indicated the user split mode contains the smaller split portion of the user specific information, according to an embodiment. For example, if the user split was 3/5, then the HE-SIG-B channel that contains the RU allocation subfield indicating the user split mode will have 3 user specific information for the allocated MU-MIMO RU, and the other HE-SIG-B channel will have 5 user specific information for the allocated MU-MIMO RU.

Table 23 show user splits where the HE-SIG-B channel containing the RU allocation subfield that has indicated the user split mode contains the larger split portion of the user specific information, according to an embodiment. For example, if the user split was 3/5, then the HE-SIG-B channel that contains the RU allocation subfield indicating the user split mode will have 5 user specific information for the allocated MU-MIMO RU, and the other HE-SIG-B channel will have 3 user specific information for the allocated MU-MIMO RU.

In bother Table 22 and Table 23, the user specific information for the lower ordered users in the MU-MIMO ordering for the allocated RU are always in the HE-SIG-B1 field.

Table 24 show user splits where the HE-SIG-B channel containing the RU allocation subfield that has indicated the user split mode contains the larger split portion of the user specific information, according to an embodiment. In addition, the user specific information for the lower ordered users in the MU-MIMO ordering for the allocated RU are always in the HE-SIG-B channel containing the RU allocation subfield that has indicated the user split mode. For example, if the user split was 3/5, then the HE-SIG-B channel that contains the RU allocation subfield indicating the user split mode will have 5 user specific information for the allocated MU-MIMO RU, the other HE-SIG-B channel will have 3 user specific information for the allocated MU-MIMO RU, and the user specific information for the lower ordered users in the MU-MIMO ordering for the allocated RU are in the HE-SIG-B channel that contains the RU allocation subfield.

In embodiments, instead of indicating a number of user specific information in RU allocation subfields corresponding to an RUs with an MU-MIMO user split, the user split is indicated in all applicable RU allocation subfields of both the HE-SIG-B1 field and the HE-SIG-B2 field.

In an embodiment, an RU allocation subfield can indicate any one of an {1/7, 2/6, 3/5, 4/4, 1/6, 2/5, 3/4, 1/5, 2/4, 3/3, 1/4, 2/3, 1/3, 2/2, 1/2, 1/1} user split between the HE-SIG-B1 and HE-SIG-B2 fields and a {7/1, 6/2, 5/3, 4/4, 6/1, 5/2, 4/3, 5/1, 4/2, 3/3, 4/1, 3/2, 3/1, 2/2, 2/1, 1/1} user split between the HE-SIG-B1 and HE-SIG-B2 fields. In an embodiment, a total of 32 states are used to indicate the above user splits for each of 484-tone RUs and 996-tone RUs. This is similar to the indications shown in Table 5 of FIG. 24, except that there may be redundant signaled states for evenly split users in the HE-SIG-B1 and HE-SIG-B2 fields.

Figure 54:
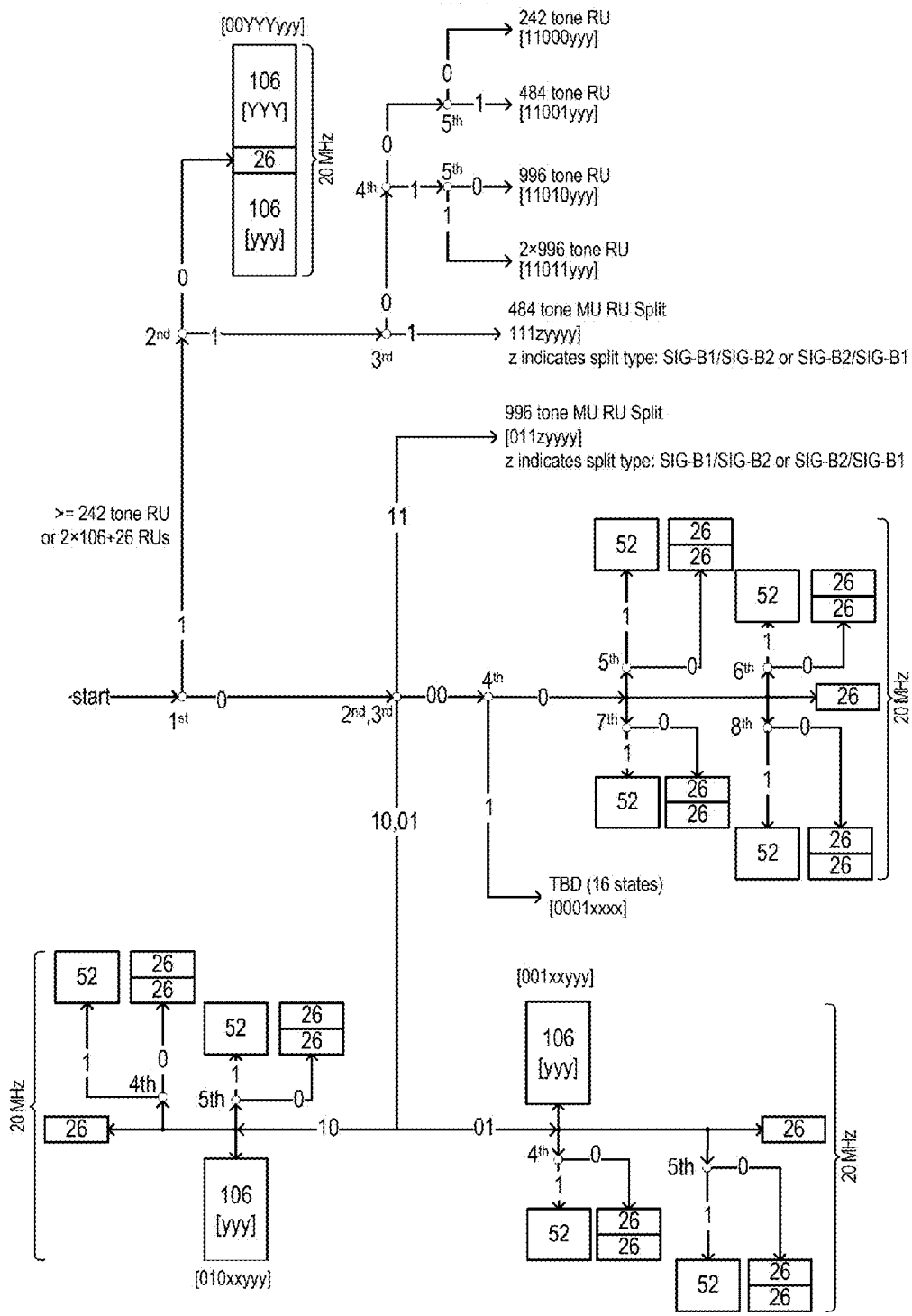
FIG. 54 illustrates a process for interpreting a value of an RU allocation subfield according to an RU allocation mapping table, according to an embodiment.

FIG. 54 illustrates, as a decision tree, a process for interpreting a value of an RU allocation subfield according to an RU allocation mapping table, according to an embodiment. Circles in FIG. 54 correspond to decisions based on one or more bits of the RU allocation subfield, the bits being indicated next to each circle. FIG. 54 is interpreted in the same general manner as described for FIG. 27.

In FIG. 54, an "yyy" or "YYY" field indicates a number of MU-MIMO users of an RU. In an embodiment, a value of '000' for 'yyy' or "YYY" indicates an SU-MIMO RU instead of an MU-MIMO RU.

A "yyyy" field indicates one of {1/7, 2/6, 3/5, 4/4, 1/6, 2/5, 3/4, 1/5, 2/4, 3/3, 1/4, 2/3, 1/3, 2/2, 1/2, 1/1, 7/1, 6/2, 5/3, 4/4, 6/1, 5/2, 4/3, 5/1, 4/2, 3/3, 4/1, 3/2, 3/1, 2/2, 2/1, 1/1} user split of an MU-MIMO RU. A "z" bit before the "yyyy" field indicates whether the split indicated by the "yyyy" field is an HE-SIG-B1/HE-SIG-B2 split or an HE-SIG-B2/HE-SIG-B1 split; that is, which of the HE-SIG-B channels the first and second numbers of the split correspond to.

FIG. 55 includes a Table 23 which shows 32 states of the user split mode which may be indicated in RU allocation subfield, according to an embodiment. The 32 states may correspond to values for the "zyyyy" fields of FIG. 54.

The benefit of this approach is that two 16 states of user split between the HE-SIG-B1 and HE-SIG-B2 fields can be differentiated by a single MSB bit. The bit can indicate the user split type, whether the split between HE-SIG-B1 and HE-SIG-B2 is {1/7, 2/6, 3/5, 4/4, 1/6, 2/5, 3/4, 1/5, 2/4, 3/3, 1/4, 2/3, 1/3, 2/2, 1/2, 1/1} or {7/1, 6/2, 5/3, 4/4, 6/1, 5/2, 4/3, 5/1, 4/2, 3/3, 4/1, 3/2, 3/1, 2/2, 2/1, 1/1}. Because of this all applicable RU allocations of HE-SIG-B1 and HE-SIG-B2 can indicate the same information for 484-tone and 996-tone RU MU-MIMO. The signaling in this embodiment allows an RU allocation field to uniquely identify the user split ratio between the HE-SIG-B1 and HE-SIG-B2 fields whether or not the RU allocation field is in the HE-SIG-B1 field or the HE-SIG-B2 field.

Embodiments include processes to resolve user specific (i.e., per-STA info) subfield format type ambiguity and to provide efficient signaling mechanisms for supporting MU-MIMO along with OFDMA.

FIG. 56 shows a flow chart illustrating an operation 5600 of an AP, according to an embodiment.

At S5601, an AP station generates a DL MU PPDU including a HE-SIG-B field. The HE-SIG-B field may have one of formats described above.

At S5603, the AP station transmits the DL MU PPDU.

The HE-SIG-B field includes a first channel and a second channel as shown in FIG. 13, FIG. 14, and FIG. 15. The first channel of the HE-SIG-B field includes a first RU allocation subfield including resource information for a first frequency area. The second channel of the HE-SIG-B field includes a second RU allocation subfield including resource information for a second frequency area. In PPDUs having 80 MHz, 80+80 MHz or 160 MHz bandwidths, the first channel of the HE-SIG-B field further includes a third RU allocation subfield including resource information for a third frequency area, and the second channel of the HE-SIG-B field further includes a fourth RU allocation subfield including resource information for a fourth frequency area.

The first and the second RU allocation subfields may indicate the same RU. In this case, the size of the same RU is greater than 242 subcarriers (i.e., equal to or greater than 484 subcarriers).

In PPDUs having 80 MHz, 80+80 MHz or 160 MHz bandwidths, the third and the fourth RU allocation subfields may indicate the same RU. In this case, the size of the same RU is greater than 242 subcarriers (i.e., equal to or greater than 484 subcarriers).

When the first and the second RU allocation subfields indicate the same RU whose size is greater than 242 subcarriers (i.e., equal to or greater than 484 subcarriers), the first and the second RU allocation subfields may indicate a total number of users allocated to the same RU.

In an embodiment, the first RU allocation subfield may indicate a first number N1 of user fields included in a user specific field of the first channel that correspond to the same RU. And the second RU allocation subfield may indicate a second number N2 of user fields included in a user specific field of the second channel that correspond to the same RU. A sum of the first and second numbers N1 and N2 may indicate the total number of users allocated to the same RU.

In an embodiment, each of the first RU allocation subfield and the second RU allocation subfield may separately indicate the total number of users allocated to the same RU. That is, not only the first RU allocation subfield but also the second RU allocation subfield indicate the total number of users allocated to the same RU.

One or more user fields that are included in the first and second channels and correspond to the same RU are of the SU type or of the MU type.

In an embodiment, when the total number of users allocated to a same RU is greater than 1, user fields corresponding to the same RU are of a MU type. When the total number is equal to 1, a single user field corresponding to the same RU is of an SU type. For example, when the first number N1 is equal to one and the second number N2 is equal to zero, or when the first number N1 is equal to zero and the second number N2 is equal to one, there is a single user field corresponding to the same RU, and the single user field is of the SU type. When the first number N1 is greater than one and the second number N2 is equal to zero, or when the first number N1 is equal to zero and the second number N2 is greater than one, or when the first number N1 is not equal to zero and the second number N2 is not equal to zero, there are a plurality of user fields corresponding to the same RU, and the user fields are of the MU type.

The first RU allocation subfield indicating a "zero assigned user" state may indicate that the first number N1 of user fields included in the first channel that correspond to an RU indicated by the first RU allocation subfield is equal to zero. The first RU allocation subfield indicating a "zero user 484 RU" state may indicate that an RU indicated by the first RU allocation subfield is a 484-tone RU and the first number N1 of user fields included in the first channel that correspond to the RU indicated by the first RU allocation subfield is equal to zero. The first RU allocation subfield indicating a "zero user 996 RU" state may indicate that an RU indicated by the first RU allocation subfield is a 996-tone RU and the first number N1 of user fields included in the first channel that correspond to the RU indicated by the first RU allocation subfield is equal to zero.

The second RU allocation subfield indicating the "zero assigned user" state may indicate that the second number N2 of user fields included in the second channel that correspond to an RU indicated by the second RU allocation subfield is equal to zero. The second RU allocation subfield indicating the "zero user 484 RU" state may indicate that an RU indicated by the second RU allocation subfield is a 484-tone RU and the second number N2 of user fields included in the second channel that correspond to the RU indicated by the second RU allocation subfield is equal to zero. The second RU allocation subfield indicating the "zero user 996 RU" state may indicate that an RU indicated by the second RU allocation subfield is a 996-tone RU and the second number N2 of user fields included in the second channel that correspond to the RU indicated by the second RU allocation subfield is equal to zero.

In an embodiment, the total number indicated by the first RU allocation subfield may indicate whether one or more user fields that are included in the first channel and correspond to the same RU are of the SU type or of the MU type. When the total number indicated by the first RU allocation subfield is greater than 1, one or more user fields that are included in the first channel and correspond to the same RU are of the MU type. When the total number indicated by the first RU allocation subfield is equal to 1, one or more user fields that are included in the first channel and correspond to the same RU are of the SU type. The total number indicated by the second RU allocation subfield may indicate whether one or more user fields that are included in the second channel and correspond to the same RU are of the SU type or of the MU type. When the total number indicated by the second RU allocation subfield is greater than 1, one or more user fields that are included in the second channel and correspond to the same RU are of the MU type. When the total number indicated by the second RU allocation subfield is equal to 1, one or more user fields that are included in the second channel and correspond to the same RU are of the SU type.

When the single user field corresponding to the same RU is of the SU type, the single user field includes a SU type of subfields. The SU type of subfields include an identifier of the station (STA-ID), a Number of Spatial Streams ($N_{STS}$), a MCS indication, a BeamForming (BF) indication, and a Coding indication.

When the plurality of user fields corresponding to the same RU are of the MU type, each of the plurality of user fields includes a MU type of subfields. The MU type of subfields include an identifier of the station (STA-ID), an indication of the spatial configuration, an MCS indication, a BF indication, and a Coding indication.

When the total number of users allocated to the same RU is greater than 1, the user fields included in the first channel that correspond to the same RU indicated by the first and the second RU allocation subfields are sequentially ordered in the first user specific field based on spatial stream indices corresponding to the user fields. The user fields included in the second channel that correspond to the same RU indicated by the first and the second RU allocation subfields are sequentially ordered in the second user specific field based on spatial stream indices corresponding to the user fields. The orders of the user fields included in the first channel precede orders of the user fields included in the second channel.

FIG. 57 shows a flow chart illustrating an operation 5700 of a non-AP station according to an embodiment.

At S5701, a non-AP station receives a DL MU PPDU including a HE-SIG-B field. The HE-SIG-B field may have one of formats described above.

At S5703, the non-AP station obtains, from a first channel of the HE-SIG-B field, a first RU allocation subfield including resource information for a first frequency area.

At S5705, the non-AP station obtains, from a second channel of the HE-SIG-B field, a second RU allocation subfield including resource information for a second frequency area.

In PPDUs having 80 MHz, 80+80 MHz or 160 MHz bandwidths, the non-AP station may obtain, from a first channel of the HE-SIG-B field, a third RU allocation subfield including resource information for a third frequency area, and the non-AP station may obtain, from a second channel of the HE-SIG-B field, a fourth RU allocation subfield including resource information for a fourth frequency area.

At S5707, the non-AP station determines whether or not the first and second RU allocation subfields indicate the same RU. In this case, the size of the same RU is greater than 242 subcarriers (i.e., equal to or greater than 484 subcarriers). When the first and the second RU allocation subfields do not indicate a same RU, the process 5700 ends. When the first and the second RU allocation subfields do indicate a same RU, at S5707 the process 5700 proceeds to S5709.

At S5709, when the first and the second RU allocation subfields indicate the same RU whose size is greater than 242 subcarriers (equal to or greater than 484 subcarriers), the non-AP station determines a total number of users allocated to the same RU.

In an embodiment, the non-AP station may determine, using both the first RU allocation subfield and the second first RU allocation subfield, a total number of users allocated to the same RU. The non-AP station may i) obtain, from the first RU allocation subfield, a first number N1 of user fields included in the first channel that correspond to the same RU, ii) obtain, from the second RU allocation subfield, a second number N2 of user fields included in the second channel that correspond to the same RU, and iii) determine a sum of the first and second numbers N1 and N2 as the total number of users allocated to the same RU.

In an embodiment, the non-AP station may obtain, from each of the first RU allocation subfield and the second RU allocation subfield, the total number of users allocated to the same RU. This is because not only the first RU allocation subfield but also the second RU allocation subfield indicate the total number of users allocated to the same RU.

At S5711, the non-AP station determines whether one or more user fields that are included in the first and second channels and correspond to the same RU are of the SU type or of the MU type.

In an embodiment, the non-AP station may determine whether the total number of users allocated to the same RU is greater than 1. When the total number is greater than 1, the non-AP station determines that user fields corresponding to the same RU are of the MU type. When the total number is equal to 1, the non-AP station determines that a single user field corresponding to the same RU is of the SU type. For example, when the first number N1 is equal to one and the second number N2 is equal to zero, or when the first number N1 is equal to zero and the second number N2 is equal to one, there is a single user field corresponding to the same RU, and the single user field is of the SU type. When the first number N1 is greater than one and the second number N2 is equal to zero, or when the first number N1 is equal to zero and the second number N2 is greater than one, or when the first number N1 is not equal to zero and the second number N2 is not equal to zero, there are a plurality of user fields corresponding to the same RU, and the user fields are of the MU type.

The first RU allocation subfield indicating a "zero assigned user" state may indicate that the first number N1 of user fields included in the first channel that correspond to an RU indicated by the first RU allocation subfield is equal to zero. The first RU allocation subfield indicating a "zero user 484 RU" state may indicate that the RU indicated by the first RU allocation subfield is a 484-tone RU and the first number N1 of user fields included in the first channel that correspond to the RU indicated by the first RU allocation subfield is equal to zero. The first RU allocation subfield indicating a "zero user 996 RU" state may indicate that the RU indicated by the first RU allocation subfield is a 996-tone RU and the first number N1 of user fields included in the first channel that correspond to the RU indicated by the first RU allocation subfield is equal to zero.

The second RU allocation subfield indicating the "zero assigned user" state may indicate that the second number N2 of user fields included in the second channel that correspond to an RU indicated by the second RU allocation subfield is equal to zero. The second RU allocation subfield indicating the "zero user 484 RU" state may indicate that the RU indicated by the second RU allocation subfield is the 484-tone RU and the second number N2 of user fields included in the second channel that correspond to an RU indicated by the second RU allocation subfield is equal to zero. The second RU allocation subfield indicating the "zero user 996 RU" state may indicate that the RU indicated by the second RU allocation subfield is the 996-tone RU and the second number N2 of user fields included in the second channel that correspond to the RU indicated by the second RU allocation subfield is equal to zero.

In an embodiment, the non-AP station may determine, based on the total number indicated by the first RU allocation subfield, whether one or more user fields that are included in the first channel and correspond to the same RU are of the SU type or of the MU type. When the total number indicated by the first RU allocation subfield is greater than 1, one or more user fields that are included in the first channel and correspond to the same RU are of the MU type. When the total number indicated by the first RU allocation subfield is equal to 1, one or more user fields that are included in the first channel and correspond to the same RU are of the SU type. The non-AP station may determine, based on the total number indicated by the second RU allocation subfield, whether one or more user fields that are included in the second channel and correspond to the same RU are of the SU type or of the MU type. When the total number indicated by the second RU allocation subfield is greater than 1, one or more user fields that are included in the second channel and correspond to the same RU are of the MU type. When the total number indicated by the second RU allocation subfield is equal to 1, one or more user fields that are included in the second channel and correspond to the same RU are of the SU type.

At S5713, when the single user field corresponding to the same RU is of the SU type, if the single user field corresponding to the same RU belongs to the non-AP station, the non-AP station parses the single user field based on the SU type to obtaining a SU type of subfields. The SU type of subfields include an identifier of the station (STA-ID), a Number of Spatial Streams (NSTS), a MCS indication, a BeamForming (BF) indication, and a Coding indication.

At S5715, when the plurality of user fields corresponding to the same RU are of the MU type, and when one of the plurality of user fields corresponding to the same RU belongs to the non-AP station, the non-AP station parses the user field for the non-AP station based on the MU type to obtaining a MU type of subfields. The MU type of subfields include an identifier of the station (STA-ID), an indication of the spatial configuration, an MCS indication, a BF indication, and a Coding indication.

At S5717, when the plurality of user fields corresponding to the same RU are of the MU type, and when one of the plurality of user fields corresponding to the same RU belongs to the non-AP station, the non-AP station determines a spatial stream index for the non-AP station.

In an embodiment, the user fields included in the first channel that correspond to the same RU indicated by the first and the second RU allocation subfields are sequentially ordered in the first user specific field based on spatial stream indices corresponding to the user fields. The user fields included in the second channel that correspond to the same RU indicated by the first and the second RU allocation subfields are sequentially ordered in the second user specific field based on spatial stream indices corresponding to the user fields. The orders of the user fields included in the first channel precede orders of the user fields included in the second channel. The non-AP station may determine a spatial stream index for the non-AP station based on an order of the user field of the non-AP station within the user fields included in the first channel and the second channel.

The solutions provided herein have been described with reference to a wireless LAN system; however, it should be understood that these solutions are also applicable to other network environments, such as cellular telecommunication networks, wired networks, etc.

The above explanation and figures are applied to an HE station, an HE frame, an HE PPDU, an HE-SIG field and the like of the IEEE 802.11ax amendment, but they can also applied to a receiver, a frame, PPDU, a SIG field, and the like of another future amendment of IEEE 802.11.

Embodiments of the present disclosure include electronic devices configured to perform one or more of the operations described herein. However, embodiments are not limited thereto.

Embodiments of the present disclosure may further include systems configured to operate using the processes described herein. The systems may include basic service sets (BSSs) such as the BSSs 100 of FIG. 1, but embodiments are not limited thereto.

Embodiments of the present disclosure may be implemented in the form of program instructions executable through various computer means, such as a processor or microcontroller, and recorded in a non-transitory computer-readable medium. The non-transitory computer-readable medium may include one or more of program instructions, data files, data structures, and the like. The program instructions may be adapted to execute the processes and to generate and decode the frames described herein when executed on a device such as the wireless devices shown in FIG. 1.

In an embodiment, the non-transitory computer-readable medium may include a read only memory (ROM), a random access memory (RAM), or a flash memory. In an embodiment, the non-transitory computer-readable medium may include a magnetic, optical, or magneto-optical disc such as a hard disk drive, a floppy disc, a CD-ROM, and the like.

In some cases, an embodiment of the invention may be an apparatus (e.g., an AP station, a non-AP station, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A method implemented by a wireless device, the method comprising:
    receiving, by the wireless device, a frame, the frame including:
        a first Resource Unit (RU) allocation subfield in a first channel, the first RU allocation subfield including resource information for a first frequency area and indicating a first number of user fields in the first channel that correspond to the first frequency area, and
        a second RU allocation subfield in a second channel, the second RU allocation subfield including resource information for a second frequency area and indicating a second number of user fields in the second channel that correspond to the second frequency area; and
    when the first frequency area and the second frequency area are the same RU, determining, using both the first RU allocation subfield and the second RU allocation subfield, a number of users allocated to the same RU, wherein frequencies used by the first channel are disjoint from frequencies used by the second channel, and wherein determining the number of users allocated to the same RU comprises:
        determining, using the first RU allocation subfield, the first number of user fields in the first channel that correspond to the same RU;
        determining, using the second RU allocation subfield, the second number of user fields in the second channel that correspond to the same RU; and
        determining a sum of the first number and the second number as the number of users allocated to the same RU.

2. The method of claim 1, further comprising:
    when the number of users allocated to the same RU is equal to 1, determining that a single user field corresponding to the same RU is of a single user (SU) type, and
    when the number of users allocated to the same RU is greater than 1, determining that each of a plurality of user fields corresponding to the same RU is of a multi user (MU) type.

3. The method of claim 2, further comprising:
    when the first RU allocation subfield indicates a first predetermined state indicating that there is one user field in the first channel that correspond to the same RU, and the second RU allocation subfield indicates a second predetermined state indicating that there is no user field in the second channel that correspond to the same RU, determining that the single user field corresponding to the same RU is of the SU type.

4. The method of claim 3, wherein the same RU is a 484-tone resource unit, the first predetermined state indicates that there is one user field in the first channel that correspond to the 484-tone resource unit, and the second predetermined state indicates that there is no user field in the second channel that correspond to the 484-tone resource unit.

5. The method of claim 3, wherein the same RU is a 996-tone resource unit, the first predetermined state indicates that there is one user field in the first channel that correspond to the 996-tone resource unit, and the second predetermined state indicates that there is no user field in the second channel that correspond to the 996-tone resource unit.

6. The method of claim 2, further comprising:
    when the number of users allocated to the same RU is equal to 1, determining that the single user field corresponding to the same RU includes the SU type of subfields; and
    when the number of users allocated to the same RU is greater than 1, determining that each of user fields corresponding to the same RU include the MU type of subfields,
    wherein the MU type of subfields are different from the SU type of subfields.

7. The method of claim 6, wherein the SU type of subfields includes a station identifier, a number of spatial streams, a use of beamforming, a Modulation and coding scheme, and a coding scheme, and
    wherein the MU type of subfields includes a station identifier, a spatial configuration, a Modulation and coding scheme, and a coding scheme.

8. The method of claim 1, wherein a size of the same RU is greater than 242 subcarriers.

9. The method of claim 1, wherein the first channel is a first HE-SIG-B channel and the second channel is a second HE-SIG-B channel.

10. The method of claim 1, wherein user fields in the first channel that correspond to the same RU are sequentially ordered based on spatial stream indices,
wherein user fields in the second channel that correspond to the same RU are sequentially ordered based on spatial stream indices, and
wherein orders of user fields in the first channel that correspond to the same RU precedes orders of user fields in the second channel that correspond to the same RU.

11. The method of claim 10, further comprising:
determining a spatial stream index for the wireless device based on an order of a user field of the non-AP station within user fields included in the first channel and the second channel that correspond to the same RU.

12. A method implemented by a wireless device, the method comprising:
determining a first number of user fields in a first channel that correspond to a first frequency area;
determining a second number of user fields in a second channel that correspond to a second frequency area;
generating, by the wireless device, a frame, the frame including:
a first Resource Unit (RU) allocation subfield in a first channel, the first RU allocation field including resource information for the first frequency area and indicating the first number of user fields in the first channel that correspond to the first frequency area, and
a second RU allocation subfield in a second channel, the second RU allocation field including resource information for the second frequency area and indicating of the second number of user fields in the second channel that correspond to the second frequency area; and
transmitting the frame,
wherein when the first frequency area and the second frequency area are a same RU, both the first RU allocation subfield and the second RU allocation subfield are used to indicate a number of users allocated to the same RU,
wherein frequencies used by the first channel are disjoint from frequencies used by the second channel, and
wherein a sum of the first number and the second number is used to indicate a number of users allocated to the same RU.

13. The method of claim 12, wherein, when the number of users allocated to the same RU is equal to 1, a single user field corresponding to the same RU is of a SU type, and
when the number of users allocated to the same RU is greater than 1, each of user fields corresponding to the same RU is of a MU type.

14. The method of claim 13, wherein, when the first RU allocation subfield indicates a first predetermined state indicating that there is one user field in the first channel that correspond to the same RU, and the second RU allocation subfield indicates a second predetermined state indicating that there is no user field in the second channel that correspond to the same RU, the single user field corresponding to the same RU is of the SU type.

15. The method of claim 14, wherein the same RU is a 484-tone resource unit, the first predetermined state indicates that there is one user field in the first channel that correspond to the 484-tone resource unit, and the second predetermined state indicates that there is no user field in the second channel that correspond to the 484-tone resource unit.

16. The method of claim 14, wherein the same RU is a 996-tone resource unit, the first predetermined state indicates that there is one user field in the first channel that correspond to the 996-tone resource unit, and the second predetermined state indicates that there is no user field in the second channel that correspond to the 996-tone resource unit.

17. The method of claim 13, wherein, when the number of users allocated to the same RU is equal to 1, the single user field corresponding to the same RU includes the SU type of subfields,
when the number of users allocated to the same RU is greater than 1, each of user fields corresponding to the same RU include includes the MU type of subfields, and
wherein the MU type of subfields are different from the SU type of subfields.

18. The method of claim 12, wherein user fields in the first channel that correspond to the same RU are sequentially ordered based on spatial stream indices,
wherein user fields in the second channel that correspond to the same RU are sequentially ordered based on spatial stream indices, and
wherein orders of user fields in the first channel that correspond to the same RU precedes orders of user fields in the second channel that correspond to the same RU.

* * * * *